(12) United States Patent
Rosewarne et al.

(10) Patent No.: US 12,556,703 B2
(45) Date of Patent: Feb. 17, 2026

(54) METHOD, APPARATUS AND SYSTEM FOR ENCODING AND DECODING A TENSOR

(71) Applicant: CANON KABUSHIKI KAISHA, Tokyo (JP)

(72) Inventors: Christopher James Rosewarne, Concord (AU); Thi Hong Nhung Nguyen, Gladesville (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/856,017

(22) PCT Filed: Apr. 11, 2023

(86) PCT No.: PCT/AU2023/050291
§ 371 (c)(1),
(2) Date: Oct. 10, 2024

(87) PCT Pub. No.: WO2023/197031
PCT Pub. Date: Oct. 19, 2023

(65) Prior Publication Data
US 2025/0254307 A1   Aug. 7, 2025

(30) Foreign Application Priority Data
Apr. 13, 2022   (AU) .............................. 2022202471

(51) Int. Cl.
*H04N 19/124* (2014.01)
*H04N 19/184* (2014.01)

(52) U.S. Cl.
CPC ......... *H04N 19/124* (2014.11); *H04N 19/184* (2014.11)

(58) Field of Classification Search
CPC .... H04N 19/124; H04N 19/184; H04N 19/18; H04N 19/46; H04N 19/169;
(Continued)

(56) References Cited

U.S. PATENT DOCUMENTS

| 2003/0108099 A1* | 6/2003 | Nagumo | G06T 9/20 |
| | | | 375/E7.199 |
| 2021/0241026 A1* | 8/2021 | Deng | G01S 7/497 |

(Continued)

FOREIGN PATENT DOCUMENTS

| JP | 2025016813 A | * | 2/2025 | ............. H04N 19/85 |
| WO | 2021003210 A1 | | 1/2021 | |
| WO | 2021254855 A1 | | 12/2021 | |

OTHER PUBLICATIONS

Aidini, A. et al., Tensor Decomposition Learning for Compression of Multidimensional Signals, IEEE Journal of Selected Topics in Signal Processing, vol. 15, No. 3, Apr. 2021.
(Continued)

*Primary Examiner* — Joseph Suh
(74) *Attorney, Agent, or Firm* — Canon U.S.A., Inc. IP Division

(57) ABSTRACT

A system and method of encoding a tensor into a bitstream, the tensor having a channel dimension. The method comprises generating a mean feature of the tensor, the mean feature being an average of the tensor over the channel dimension; quantising the generated mean feature to generate a quantised mean feature map; and inverse-quantising a reconstruction of the quantised mean feature map to generate a second representation of the mean feature. The method further comprises determining mean feature coefficients using the second representation of the mean feature map and the channel dimension of the tensor; and encoding at least the quantised mean feature map and a quantised version of the mean feature coefficients into the bitstream.

14 Claims, 25 Drawing Sheets

(58) Field of Classification Search
CPC .... H04N 19/172; H04N 19/159; H04N 19/50; H04N 19/91; H04N 19/96; G06N 3/09; G06N 3/0464; G06N 20/10
See application file for complete search history.

(56) References Cited

U.S. PATENT DOCUMENTS

2021/0397876 A1* 12/2021 Hemani ............... G06V 10/761
2022/0092827 A1*  3/2022 Do ........................ G06T 3/4046
2022/0167000 A1*  5/2022 Kwon .................... H04N 19/50

OTHER PUBLICATIONS

Minhun Lee, et al., [VCM track 1] Advanced feature map compression based on optimal transformation with VVC and DeepCABAC, International Organisation For Standardisation, ISO/IEC JTC 1/SC 29/WG 2, MPEG Technical Requirements, Jan. 2022, Doc. No. m58787.

Minhun Lee, et al., [VCM track 1] Advanced feature map compression based on optimal transformation with VVC and DeepCABAC, presentation, Kwangwoon University, Jan. 2022.

* cited by examiner

METHOD, APPARATUS AND SYSTEM FOR ENCODING AND DECODING A TENSOR

REFERENCE TO RELATED APPLICATION(S)

This application is the National Phase application of PCT/AU2023/050291, filed on Apr. 11, 2023. This application claims the benefit under 35 U.S.C. § 119 of the filing date of Australian Patent Application No. 2022202471, filed Apr. 13, 2022, hereby incorporated by reference in its entirety as if fully set forth herein.

TECHNICAL FIELD present invention relates generally to digital video signal processing and, in particular, to a method, apparatus and system for encoding and decoding tensors from a convolutional neural network. The present invention also relates to a computer program product including a computer readable medium having recorded thereon a computer program for encoding and decoding tensors from a convolutional neural network using video compression technology.

BACKGROUND

Video compression is a ubiquitous technology used to support many applications, including applications for transmission and storage of video data. Many video coding standards have been developed and others are currently in development. Recent developments in video coding standardisation have led to the formation of a group called the "Joint Video Experts Team" (JVET). The Joint Video Experts Team (VET) includes members of two Standards Setting Organisations (SSOs), namely: Study Group 16, Question 6 (SG16/Q6) of the Telecommunication Standardisation Sector (ITU-T) of the International Telecommunication Union (ITU), also known as the "Video Coding Experts Group" (VCEG) and the International Organisation for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) has developed a video compression standard, named 'versatile video coding' (VVC).

Convolutional neural networks (CNNs) are an emerging technology addressing, among other things, use cases involving machine vision. CNNs typically include many layers, such as convolutional layers, including fully connected layers, with data passing from one layer to the next in the form of 'tensors'. Weights for each of the layers are determined in a training stage, where a very large amount of training data is passed through the CNN and a determined result is compared to ground truth associated with the training data. A process for updating network weights, such as stochastic gradient descent, is applied to iteratively refine the network weights until the network performs at a desired level of accuracy. Where a convolution stage has a 'stride' greater than one, an output tensor from the convolution has a lower spatial resolution than a corresponding input tensor. Operations such as 'max pooling' (or 'Maxpool') also reduce spatial size of the output tensor compared to the input tensor. Max pooling produces an output tensor by dividing the input tensor into groups of data samples (e.g., a 2×2 group of data samples), and from each group selecting a maximum value as output for a corresponding value in the output tensor. The process of executing a CNN with an input and progressively transforming the input into an output is commonly referred to as 'inferencing'.

Generally, a tensor has four dimensions, namely: batch, channels, height and width. The first dimension, 'batch', of size 'one' when inferencing on video data indicates that one frame is passed through a CNN at a time. When training a network, the value of the batch dimension may be increased so that multiple frames are passed through the network before the network weights are updated, according to a predetermined 'batch size'. A multi-frame video may be passed through as a single tensor with the batch dimension increased in size according to the number of frames of a given video. However, for practical considerations relating to memory consumption and access, inferencing on video data is typically performed on a frame-wise basis. The 'channels' dimension indicates the number of concurrent 'feature maps' for a given tensor. The height and width dimensions indicate the size of the feature maps at the particular stage of the CNN. Channel count varies through a CNN according to the network architecture. Feature map size also varies, depending on subsampling occurring in specific network layers.

Input to the first layer of a CNN is an image or video frame, typically resized for compatibility with the dimensionality of the tensor input to the first layer. The dimensionality of tensors is dependent on the CNN architecture, generally having some dimensions relating to input width and height and a further 'channel' dimension.

Slicing a tensor based on the channel dimension results in a set of 'feature maps', so-called because each slice of the tensor has some relationship to the corresponding input image, capturing properties such as various edge types. At layers further from the input to the network, the property can be more abstract. The 'task performance' of a CNN is measured by comparing the result of the CNN in performing a task using specific input with a provided ground truth, generally prepared by humans and deemed to indicate a 'correct' result.

Once a network topology is decided, the network weights may be updated over time as more training data becomes available. It is also possible to retrain a portion of a CNN, leaving weights in other portion(s) of the network unchanged. The overall complexity of the CNN tends to be high, with relatively large numbers of multiply-accumulate operations being performed and numerous intermediate tensors being written to and read from memory. In some applications, the CNN is implemented entirely in the 'cloud', resulting in a need for high and costly processing power. In other applications, the CNN is implemented in an edge device, such as a camera or mobile phone, resulting in less flexibility but a more distributed processing load. An emerging architecture involves splitting a network into portions, one of which is run in an edge device and another of which is run in the cloud. Such a distributed network architecture may be referred to as 'collaborative intelligence'. Collaborative intelligence offers benefits such as re-using a partial result from a first portion of the network with several different second portions, perhaps each portion being optimised for a different task. Collaborative intelligence architectures introduce a need for efficient compression of tensor data, for transmission over a network such as a WAN. Tensor data may be stored in compressed form on servers in the cloud, or within a device as partially processed data to be used later for various tasks.

VVC is anticipated to address ongoing demand for ever-higher compression performance, especially as video formats increase in capability (e.g., with higher resolution and higher frame rate) and to address increasing market demand for service delivery over WANs, where bandwidth costs are relatively high. VVC is implementable in contemporary silicon processes and offers an acceptable trade-off between achieved performance versus implementation cost. The implementation cost may be considered for example, in terms of one or more of silicon area, CPU processor load, memory utilisation and bandwidth. Part of the versatility of the VVC standard is in the wide selection of tools available for compressing video data, as well as the wide range of applications for which VVC is suitable.

Video data includes a sequence of frames of image data, each frame including one or more colour channels. Generally, one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, the RGB colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Due to the use of a decorrelated YCbCr signal, the statistics of the luma channel differ markedly from those of the chroma channels. A primary difference is that after quantisation, the chroma channels contain relatively few significant coefficients for a given block compared to the coefficients for a corresponding luma channel block. Moreover, the Cb and Cr channels may be sampled spatially at a lower rate (subsampled) compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. When only luma samples are present, the resulting monochrome frames are said to use a "4:0:0 chroma format".

The VVC standard specifies a 'block based' architecture, in which frames are firstly divided into a square array of regions known as 'coding tree units' (CTUs). CTUs generally occupy a relatively large area, such as 128×128 luma samples. Other possible CTU sizes when using the VVC standard are 32×32 and 64×64. However, CTUs at the right and bottom edge of each frame may be smaller in area, with implicit splitting occurring the ensure the CBs remain in the frame. Associated with each CTU is a 'coding tree' either for both the luma channel and the chroma channels (a 'shared tree') or a separate tree each for the luma channel and the chroma channels. A coding tree defines a decomposition of the area of the CTU into a set of blocks, also referred to as 'coding blocks' (CBs). When a shared tree is in use a single coding tree specifies blocks both for the luma channel and the chroma channels, in which case the collections of collocated coding blocks are referred to as 'coding units' (CUs) (i.e., each CU having a coding block for each colour channel). The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example, the above-mentioned CUs, as well as 'prediction units' (PUs), and 'transform units' (TUs). A single tree with CUs spanning the colour channels of 4:2:0 chroma format video data result in chroma blocks half the width and height of the corresponding luma blocks. When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU, a prediction unit (PU) of the contents (sample values) of the corresponding area of frame data is generated (a 'prediction unit'). Further, a representation of the difference (or 'spatial domain' residual) between the prediction and the contents of the area as seen at input to the encoder is formed. The difference in each colour channel may be transformed and coded as a sequence of residual coefficients, forming one or more TUs for a given CU. The applied transform may be a Discrete Cosine Transform (DCT) or other transform, applied to each block of residual values. The transform is applied separably, (i.e. the two-dimensional transform is performed in two passes). The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

VVC features intra-frame prediction and inter-frame prediction. Intra-frame prediction involves the use of previously processed samples in a frame being used to generate a prediction of a current block of data samples in the frame. Inter-frame prediction involves generating a prediction of a current block of samples in a frame using a block of samples obtained from a previously decoded frame. The block of samples obtained from a previously decoded frame is offset from the spatial location of the current block according to a motion vector, which often has filtering applied. Intra-frame prediction blocks can be (i) a uniform sample value ("DC intra prediction"), (ii) a plane having an offset and horizontal and vertical gradient ("planar intra prediction"), (iii) a population of the block with neighbouring samples applied in a particular direction ("angular intra prediction") or (iv) the result of a matrix multiplication using neighbouring samples and selected matrix coefficients. Further discrepancy between a predicted block and the corresponding input samples may be corrected to an extent by encoding a 'residual' into the bitstream. The residual is generally transformed from the spatial domain to the frequency domain to form residual coefficients in a 'primary transform domain, which may be further transformed by application of a 'secondary transform' to produce residual coefficients in a 'secondary transform domain'. Residual coefficients are quantised according to a quantisation parameter, resulting in a loss of accuracy of the reconstruction of the samples produced at the decoder but with a reduction in bitrate in the bitstream. Sequences of pictures may be encoded according to a specified structure of pictures using intra-prediction and pictures using intra- or inter-prediction, and specified dependencies on preceding pictures in coding order, which may differ from display or delivery order. A 'random access' configuration results in periodic intra-pictures, forming entry points at which a decoder and commence decoding a bitstream. Other pictures in a random-access configuration generally use inter-prediction to predict their content from pictures preceding and following a current picture in display or delivery order, according to a hierarchical structure of specified depth. The use of pictures after a current picture in display order for predicting a current picture requires a degree of picture buffering and delay between the decoding of a given picture and the display (and removal from the buffer) of the given picture.

SUMMARY

It is an object of the present invention to substantially overcome, or at least ameliorate, one or more disadvantages of existing arrangements.

An aspect of the present disclosure provides method of encoding a tensor into a bitstream, the tensor having a channel dimension, the method comprising: generating a mean feature of the tensor, the mean feature being an average of the tensor over the channel dimension; quantising the generated mean feature to generate a quantised mean feature map; inverse-quantising a reconstruction of the quantised mean feature map to generate a second representation of the mean feature; determining mean feature coefficients using the second representation of the mean feature map and the channel dimension of the tensor; and encoding at least the quantised mean feature map and a quantised version of the mean feature coefficients into the bitstream.

Another aspect of the present disclosure provides a method of decoding a feature map from a bitstream, the bitstream encoded using a quantisation function, the method comprising: decoding a quantised mean feature from the bitstream, the quantised mean feature generated using the quantisation function; inverse-quantising the quantised mean feature to derive an inverse-quantised mean feature, the inverse-quantised mean feature generated using an inverse of the quantisation function used to encode the bitstream; decoding a mean feature coefficient from the bitstream; and decoding the feature map using at least the inverse-quantised mean feature and the mean feature coefficients.

Another aspect of the present disclosure provides a method of encoding a feature map into a bitstream, the tensor having a channel dimension, the method comprising: quantising a set of basis vectors to generate quantised basis vectors; inverse-quantising a reconstruction of the quantised basis vectors to generate a second representation of the basis vectors; determining basis vector coefficients using the second representation of the basis vectors and the channel dimension of the tensor; and encoding at least the basis vector coefficients and a quantised version of the basis vectors into the bitstream.

Another aspect of the present disclosure provides a method of decoding a feature map from a bitstream, the bitstream encoded using a quantisation function, the method comprising: decoding a set of quantised basis vectors from the bitstream, the quantised basis vectors generated using the quantisation function; inverse-quantising the quantised basis vectors to derive inverse-quantised basis vectors, the inverse-quantised mean feature generated using an inverse of the quantisation function used to encode the bitstream; decoding a basis vector coefficients from the bitstream; and decoding the feature map using at least the inverse-quantised basis vectors and the basis vector coefficients.

Another aspect of the present disclosure provides an encoder for encoding a tensor into a bitstream, the tensor having a channel dimension, the encoder configured to: generate a mean feature of the tensor, the mean feature being an average of the tensor over the channel dimension; quantise the generated mean feature to generate a quantised mean feature map; inverse-quantise a reconstruction of the quantised mean feature map to generate a second representation of the mean feature; determine mean feature coefficients using the second representation of the mean feature map and the channel dimension of the tensor; and encode at least the quantised mean feature map and a quantised version of the mean feature coefficients into the bitstream.

Another aspect of the present disclosure provides a non-transitory computer-readable storage medium which stores a program for executing a method of encoding a tensor into a bitstream, the method comprising: quantising a set of basis vectors to generate quantised basis vectors; inverse-quantising a reconstruction of the quantised basis vectors to generate a second representation of the basis vectors; determining basis vector coefficients using the second representation of the basis vectors and the channel dimension of the tensor; and encoding at least the basis vector coefficients and a quantised version of the basis vectors into the bitstream.

Another aspect of the present disclosure provides a system comprising: a memory; and a processor, wherein the processor is configured to execute code stored on the memory for implementing a method of encoding a tensor into a bitstream, the tensor having a channel dimension, the method comprising: generating a mean feature of the tensor, the mean feature being an average of the tensor over the channel dimension; quantising the generated mean feature to generate a quantised mean feature map; inverse-quantising a reconstruction of the quantised mean feature map to generate a second representation of the mean feature; determining mean feature coefficients using the second representation of the mean feature map and the channel dimension of the tensor; and encoding at least the quantised mean feature map and a quantised version of the mean feature coefficients into the bitstream.

Another aspect of the present disclosure provides a decoder for decoding a feature map from a bitstream, the bitstream encoded using a quantisation function, the decoder configured to: decode a quantised mean feature from the bitstream, the quantised mean feature generated using the quantisation function; inverse-quantise the quantised mean feature to derive an inverse-quantised mean feature, the inverse-quantised mean feature generated using an inverse of the quantisation function used to encode the bitstream; decode a mean feature coefficient from the bitstream; and decode the feature map using at least the inverse-quantised mean feature and the mean feature coefficients.

Another aspect of the present disclosure provides a non-transitory computer-readable storage medium which stores a program for executing a method of decoding a feature map from a bitstream, the bitstream encoded using a quantisation function, the method comprising: decoding a set of quantised basis vectors from the bitstream, the quantised basis vectors generated using the quantisation function; inverse-quantising the quantised basis vectors to derive inverse-quantised basis vectors, the inverse-quantised mean feature generated using an inverse of the quantisation function used to encode the bitstream; decoding a basis vector coefficients from the bitstream; and decoding the feature map using at least the inverse-quantised basis vectors and the basis vector coefficients.

Another aspect of the present disclosure provides a system comprising: a memory; and a processor, wherein the processor is configured to execute code stored on the memory for implementing a method of decoding a feature map from a bitstream, the bitstream encoded using a quantisation function, the method comprising: decoding a quantised mean feature from the bitstream, the quantised mean feature generated using the quantisation function; inverse-quantising the quantised mean feature to derive an inverse-quantised mean feature, the inverse-quantised mean feature generated using an inverse of the quantisation function used to encode the bitstream; decoding a mean feature coefficient from the bitstream; and decoding the feature map using at least the inverse-quantised mean feature and the mean feature coefficients Other aspects are also disclosed.

BRIEF DESCRIPTION OF THE DRAWINGS

At least one embodiment of the present invention will now be described with reference to the following drawings and an appendix, in which.

DETAILED DESCRIPTION INCLUDING BEST MODE

Figure 1:
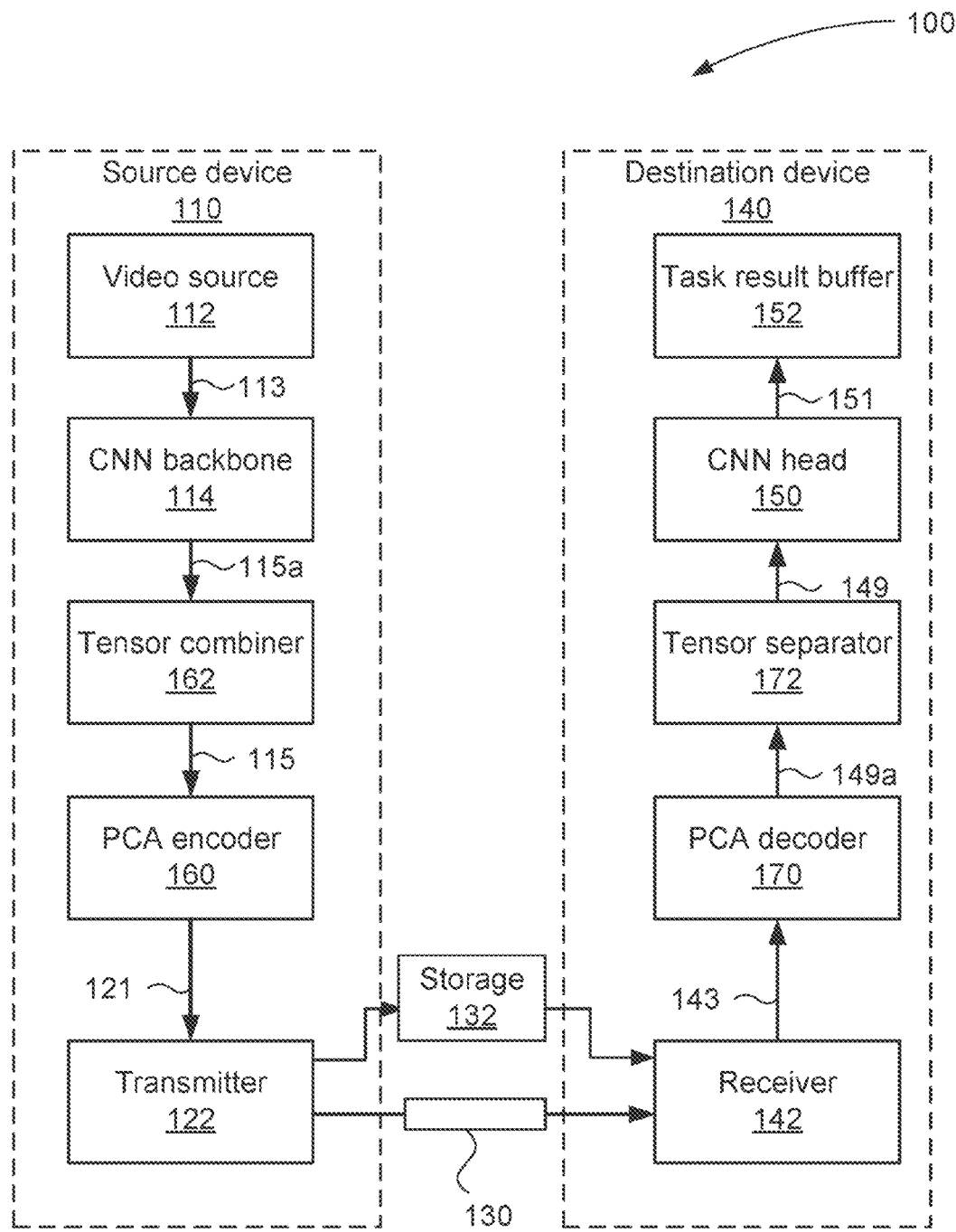
FIG. 1 is a schematic block diagram showing a distributed machine task system.

Where reference is made in any one or more of the accompanying drawings to steps and/or features, which have the same reference numerals, those steps and/or features have for the purposes of this description the same function (s) or operation(s), unless the contrary intention appears.

A distributed machine task system may include an edge device, such as a network camera or smartphone producing intermediate compressed data. The distributed machine task system may also include a final device, such as a server farm based ('cloud') application, operating on the intermediate compressed data to produce a task result. Examples of task result include mAP (mean average precision), used to show performance of object detection and instance segmentation tasks, and MOTA (multiple object tracking accuracy), used to measure the accuracy of tracking objects over multiple video frames. Examples of other task results include human pose estimation and action recognition. Additionally, the edge device functionality may be embodied in the cloud and the intermediate compressed data may be stored for later processing, potentially for multiple different tasks depending on need.

A convenient form of intermediate compressed data is a compressed video bitstream, owing to the availability of high-performing compression standards and implementations thereof. Video compression standards typically operate on integer samples of some given bit depth, such as 10 bits, arranged in planar arrays. Colour video has three planar arrays, corresponding, for example, to colour components Y, Cb, Cr, or R, G, B, depending on application. CNNs typically operate on floating point data in the form of tensors. Tensors generally have a relatively smaller spatial dimensionality compared to incoming video data upon which the CNN operates. Tensors generally have more channels than the three channels typical of colour video data.

Tensors typically have the following dimensions: frames, channels, height, and width. For example, a tensor of dimensions [1, 256, 76, 136] would be said to contain two-hundred and fifty-six (256) feature maps (channels), each of size 136×76. For video data, inferencing is typically performed one frame at a time (frame value of 1), rather than using tensors containing multiple frames.

VVC supports a division of a picture into multiple subpictures, each of which may be independently encoded and independently decoded. In one approach, each subpicture is coded as one 'slice', or contiguous sequence of coded CTUs. A 'tile' mechanism is also available to divide a picture into a number of independently decodeable regions. Subpictures may be specified in a somewhat flexible manner, with various rectangular sets of CTUs coded as respective subpictures. Flexible definition of subpicture dimensions allows efficiently holding types of data requiring different areas in one picture, avoiding large 'unused' areas, i.e., areas of a frame that are not used for reconstruction of tensor data.

FIG. 1 is a schematic block diagram showing functional modules of a distributed machine task system 100. The notion of distributing a machine task across multiple systems is sometimes referred to as 'collaborative intelligence' (CI). The division of a particular neural network into two portions requires specifying a 'split point' in the network. Layers in the network from the input layer up to the split point are performed in a first device and the resulting intermediate tensor(s) are compressed. Layers from the split point up to the end of the network are performed, using decompressed tensor(s) from the first device. At the split point there may be one or more tensors that need to be compressed. The dimensionality of the tensors may be the same, or may differ. Where a 'feature pyramid network' (FPN) is in use, it is common for layers to be related in width and height such that a given layer is half the width and height of the previous layer. FPN architectures may also define the width and height halving to occur on every alternate layer. In some architectures, multiple tensors of the same width and height are seen. The channel count between layers may vary or may be the same. Compression methods applicable to the various network topologies used in contemporary CNNs are therefore beneficial for application to a wide range of scenarios.

The system 100 may be used for implementing methods for decorrelating, packing and quantising feature maps into planar frames for encoding and decoding feature maps from encoded data. The system 100 can be used such that computational burden of associated overhead data is acceptable and task performance on the decoded feature maps is resilient to changing bitrate of the bitstream. The system 100 can also be used such that the quantised representation of the tensors does not needlessly consume bits where the bits do not provide a commensurate benefit in terms of task performance.

The system 100 includes a source device 110 for generating encoded tensor data 115a from a CNN backbone 114 in the form of encoded video bitstream 121. The system 100 also includes a destination device 140 for decoding tensor data in the form of an encoded video bitstream 143. A communication channel 130 is used to communicate the encoded video bitstream 121 from the source device 110 to the destination device 140. In some arrangements, the source device 110 and destination device 140 may either or both comprise respective mobile telephone handsets (e.g., "smartphones") or network cameras and cloud applications. The communication channel 130 may be a wired connection, such as Ethernet, or a wireless connection, such as WiFi or 5G, including connections across a Wide Area Network (WAN) or across ad-hoc connections. Moreover, the source device 110 and the destination device 140 may comprise applications where encoded video data is captured on some computer-readable storage medium, such as a hard disk drive in a file server or memory.

As shown in FIG. 1, the source device 110 includes a video source 112, the CNN backbone 114, a tensor combiner 162, a principal component analysis (PCA) encoder 160, and a transmitter 122. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example, displaying the video output of an operating system and various applications executing upon a computing device (e.g., a tablet computer). Examples of source devices 110 that may include an image capture sensor as the video source 112 include smart-phones, video camcorders, professional video cameras, and network video cameras. The video source 112 may produce independent images or may produce temporally sequential images, i.e., a video.

The CNN backbone 114 receives the video frame data 113 and performs specific layers of an overall CNN, such as layers corresponding to the 'backbone' of the CNN, outputting tensors 115a. The backbone layers of the CNN may produce multiple tensors as output, for example, corresponding to different spatial scales of an input image represented by the video frame data 113. The different spatial scales may be referred to as a 'feature pyramid network' (FPN) architecture. An FPN may result in three tensors, corresponding to three layers, output from the backbone 114 as the tensors 115a, for example if a 'YOLOv3' network (used for object detection) is performed by the system 100, with varying spatial resolution and channel count. When the system 100 is performing networks such as 'Faster RCNN X101-FPN" (used for object detection) or "Mask RCNN X101-FPN" (used for instance segmentation) the tensors 115a include tensors for five layers P2-P5. A tensor combiner 162 may combine two layers by resampling the tensor for one layer and concatenating the resulting tensor with the tensor of another layer, e.g., and adjacent layer in the FPN, producing combined tensors 115. The PCA encoder 160 receives tensors 115, output from the tensor combiner 162. The combining of layers is suitable when sufficient inter-layer correlation exists for the combined layer to be represented using fewer basis vectors than would be required were the layers to be separately decorrelated. The degree of inter-layer correlation is a property of the network itself and the provided input data. The degree of inter-layer correlation permits a reduction in the total number of basis vectors for the combined tensor compared to the sum of the number of basis vectors were tensors of each layer separately decorrelated. For example, if ordinarily using 25 basis vectors per layer, and concatenating two layers, the number of basis vectors needed by the concatenated layers may be set at less than 50. Arrangements where the number of basis vectors used is adaptive to the explained variance of basis vectors are able to achieve a reduction in basis vector count by exploiting such inter-layer correlation and are discussed with reference to FIGS. 21 and 22. To the extent that inter-layer correlation is influenced by the input data the tensor, combiner 162 may select to combine layers or not such that basis vector area is minimised. Where the network is understood to have a degree of inter-layer correlation, a fixed configuration may be applied, for example to downsample the least decomposed layer of the FPN and combine the result with the second least decomposed layer of the FPN for the decorrelation step (i.e., 1480). If combining of layers is not suitable or required, the tensor combiner 162 does not perform any operation and the tensors 115 equal the tensors 115a.

The PCA encoder 160 acts to encode one or more internal layers of the overall CNN, the internal layers output by the CNN backbone 114. The PCA encoder 160 first decorrelates a DC-normalised version of the tensor across the channels of the respective tensors using methods such as principal component analysis (PCA). The DC-normalised version of the tensor is produced by removing a 'mean feature' from each channel of the tensor. The mean feature may be removed (subtracted) uniformly from all channels of the tensor, or the mean feature may be removed in a channel-dependent manner by application of a forward transform, resulting in a corresponding 'mean coefficient' for each channel of the tensor. A subset of the eigenvectors resulting from the PCA are used as 'basis vectors' (or, interchangeably, the term 'components' may be used to refer to basis vectors) to represent the channels of the tensor being encoded. Each channel of the tensor is transformed using the basis vectors to produce coefficients. Basis vectors, a mean feature map, and associated coefficients are quantised and packed into a video frame. The video frame is encoded using a video encoder and output as the bitstream 121. The bitstream 121 is supplied to the transmitter 122 for transmission over the communications channel 130 or the bitstream 121 is written to storage 132 for later use.

The source device 110 supports a particular network for the CNN backbone 114. However, the destination device 140 may use one of several networks for a head CNN 150. In using one of several networks for the head CNN 150, partially processed data in the form of packed feature maps may be stored for later use in performing various tasks without needing to again perform the operation of the CNN backbone 114.

The bitstream 121 is transmitted by the transmitter 122 over the communication channel 130 as encoded video data (or "encoded video information"). The bitstream 121 can in some implementations be stored in a storage memory 132, where the storage 132 is a non-transitory storage device such as a "Flash" memory or a hard disk drive, until later being transmitted over the communication channel 130 (or in-lieu of transmission over the communication channel 130). For example, encoded video data may be served upon demand to customers over a wide area network (WAN) for a video analytics application.

The destination device 140 includes a receiver 142, a PCA decoder 170, a tensor separator 172, a CNN head 150, and a CNN task result buffer 152. The receiver 142 receives encoded video data from the communication channel 130 and passes the video bitstream 143 to the PCA decoder 170. The PCA decoder 170 outputs decoded tensors 149a, which are supplied to a tensor separator 172. The tensor separator performs the inverse operation of the tensor combiner 162, to produce extracted tensors 149. The extracted tensors 149 are passed to the CNN head 150. In architectures where combining of layers is not suitable or required, the tensor separator 172 does not perform any operation and the tensors 149 equal the tensors 149a. The CNN head 150 performs the later layers of the task that began with the CNN backbone 114 to produce a task result 151. The task result 151 is stored in the task result buffer 152. The contents of the task result buffer 152 may be presented to the user, e.g. via a graphical user interface, or provided to an analytics application where some action is decided based on the task result, which may include summary level presentation of aggregated task results to a user. It is also possible for the functionality of each of the source device 110 and the destination device 140 to be embodied in a single device, examples of which include mobile telephone handsets and tablet computers and cloud applications.

Figure 2A:
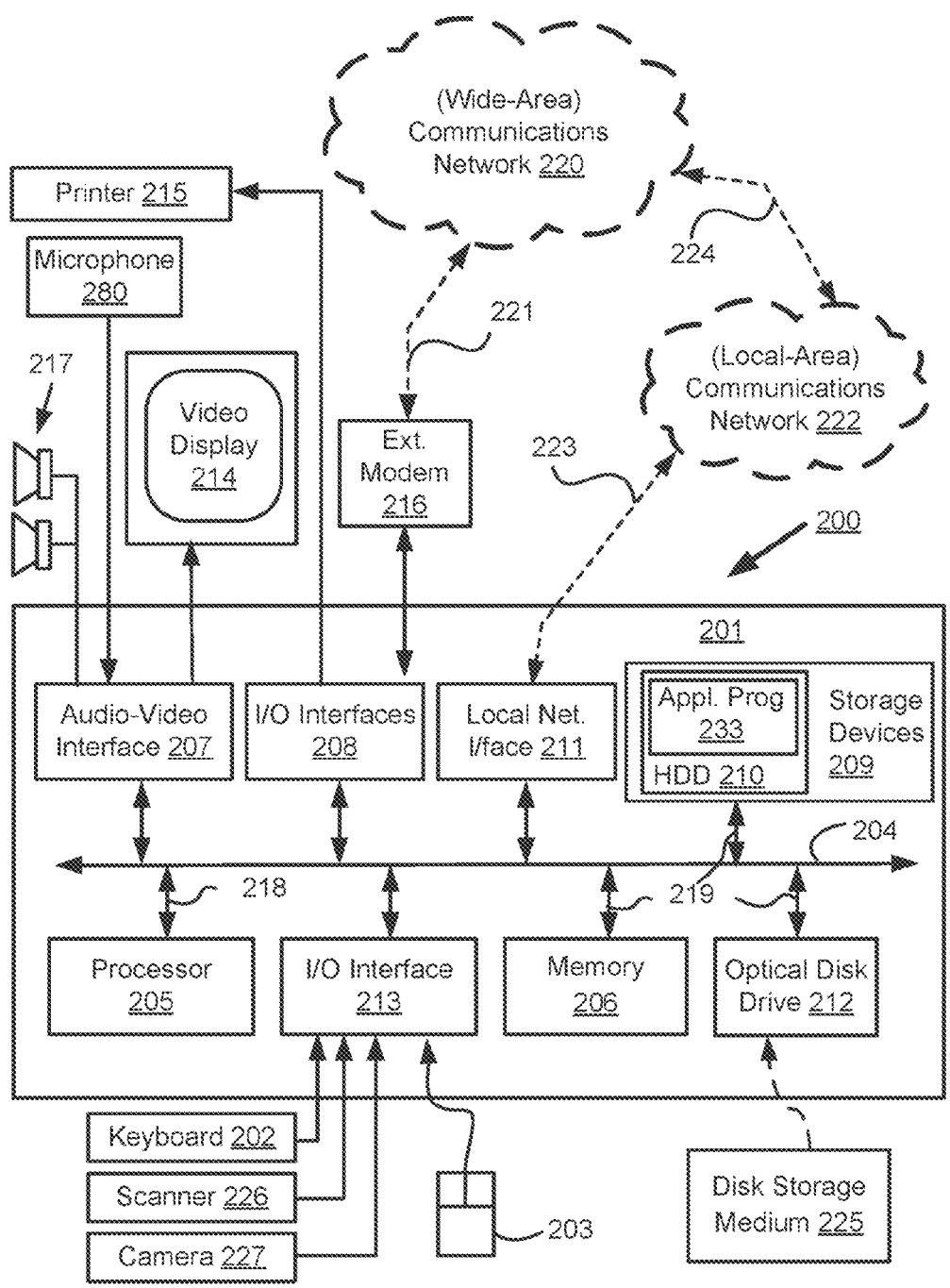
FIGS. 2A and 2B form a schematic block diagram of a general-purpose computer system upon which the distributed machine task system of FIG. 1 may be practiced.

Notwithstanding the example devices mentioned above, each of the source device 110 and destination device 140 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220, which may represent the communication channel 130, may be a (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 122 and the receiver 142 and the communication channel 130 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 122 and the receiver 142 and communication channel 130 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 140 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the PCA encoder 160 and the PCA decoder 170, as well as methods described below, may be implemented using the computer system 200. In particular, the PCA encoder 160, the PCA decoder 170 and methods to be described, may be implemented as one or more software application programs 233 executable within the computer system 200. In particular, the PCA encoder 160, the PCA decoder 170 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the source device 110 and the destination device 140 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 201 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
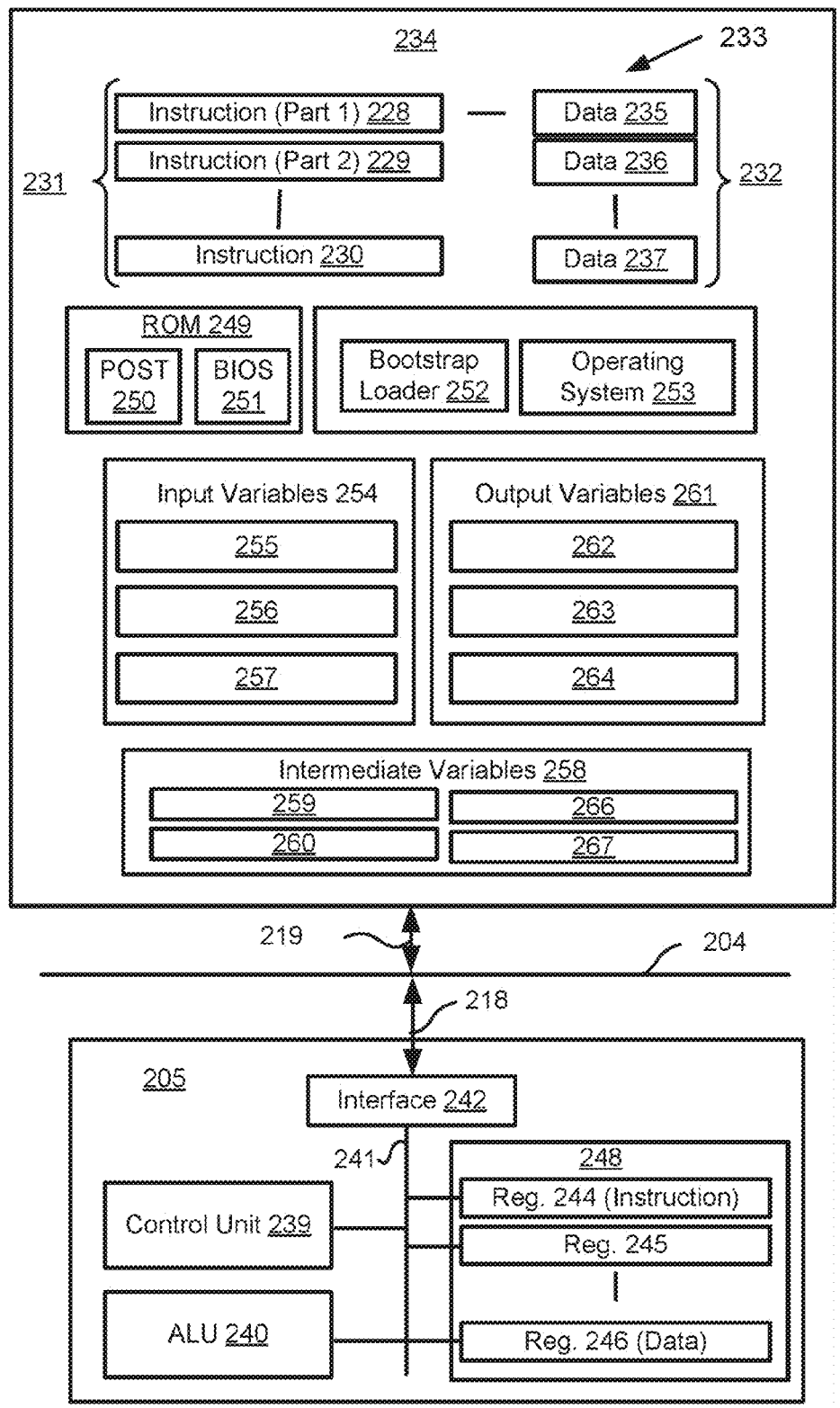

FIG. 2B is a detailed schematic block diagram of the processor 205 and a "memory" 234. The memory 234 represents a logical aggregation of all the memory modules (including the storage devices 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A need to be used properly so that each process can run effectively. Accordingly, the aggregated memory 234 is not intended to illustrate how particular segments of memory are allocated (unless otherwise stated), but rather to provide a general view of the memory accessible by the computer system 200 and how such memory is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using the connection 218. The memory 234 is coupled to the bus 204 using the connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The PCA encoder 160, the PCA decoder 170 and the described methods may use input variables 254, which are stored in the memory 234 in corresponding memory locations 255, 256, 257. The PCA encoder 160, the PCA decoder 170 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:
  a fetch operation, which fetches or reads an instruction 231 from a memory location 228, 229, 230;
  a decode operation in which the control unit 239 determines which instruction has been fetched; and
  an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the methods of FIGS. 15 to 22, to be described, is associated with one or more segments of the program 233 and is typically performed by the register section 244, 245, 246, the ALU 240, and the control unit 239 in the processor 205 working together to perform the fetch, decode, and execute cycles for every instruction in the instruction set for the noted segments of the program 233.

Figure 3A:
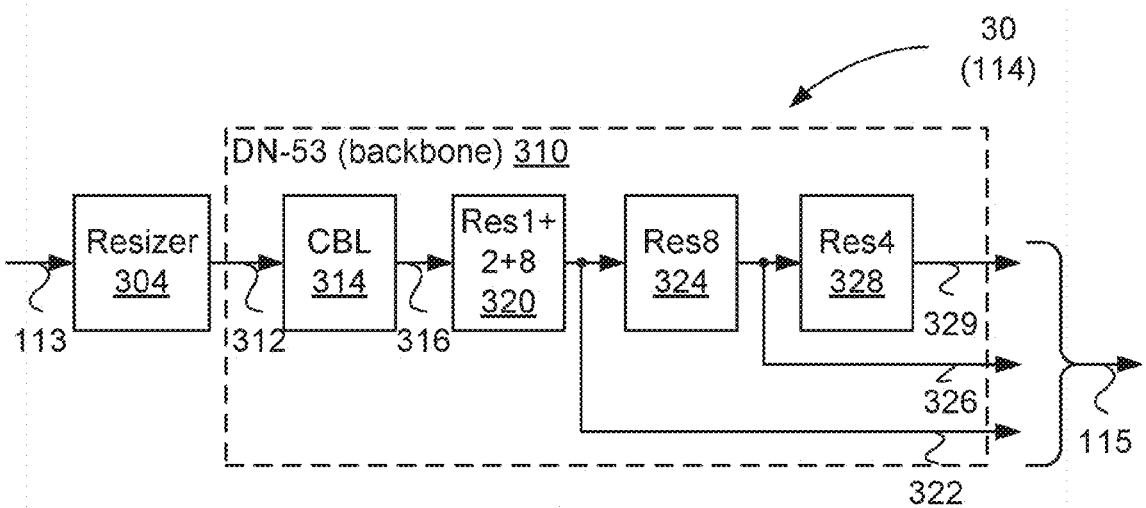
FIG. 3A is a schematic block diagram showing functional modules of a backbone portion of a CNN.

FIG. 3A is a schematic block diagram 300 showing functional modules of a backbone portion 310 of a CNN, which may serve as an implementation of the CNN backbone 114. The backbone portion 114 is sometimes referred to as 'DarkNet-53', although different backbones are also possible, resulting in a different number of and dimensionality of layers of the tensors 115 for each frame.

As shown in FIG. 3A, the video data 113 is passed to a resizer module 304. The resizer module 304 resizes each frame of the video data 113 to a resolution suitable for processing by the CNN backbone 310, producing a resized frame data 312. If the resolution of the video data 113 is already suitable for the CNN backbone 310, operation of the resizer module 304 is not needed. The resized frame data 312 is passed to a convolutional batch normalisation leaky rectified linear (CBL) module 314 to produce tensors 316. The CBL 314 contains modules as described with reference to a CBL module 360 as shown in FIG. 3D.

The CBL module 360 takes as input a tensor 361 of the resized frame data 312. The tensor 361 is passed to a convolutional layer 362 to produce tensor 363. If the convolutional layer 362 has a stride of one, the tensor 363 has the same spatial dimensions as the tensor 361. If the convolution layer 362 has a larger stride, such as two, the tensor 363 has smaller spatial dimensions compared to the tensor 361, for example, halved in width and height for the stride of two. Regardless of the stride, the size of channel dimension of the tensor 363 may vary compared to the channel dimension of the tensor 361 for a particular CBL block. The tensor 363 is passed to a batch normalisation module 364, which outputs a tensor 365. The batch normalisation module 364 normalises the input tensor 363 and applies a scaling factor and an offset value to produce the output tensor 365. The scaling factor and offset value are derived from a training process. The tensor 365 is passed to a leaky rectified linear activation ("LeakyReLU") module 366 to produce a tensor 367. The module 366 provides a 'leaky' activation function whereby positive values in the tensor are passed through and negative values are severely reduced in magnitude, for example, to 0.1× their former value.

The tensor 316 is passed from the CBL block 314 to a residual block module 320, such as a 1+2+8 module containing a concatenation of 1 residual unit, 2 residual units, and 8 residual units internally.

Figure 3B:
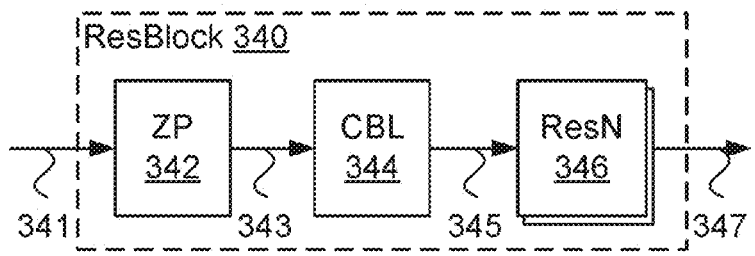
FIG. 3B is a schematic block diagram showing a residual block of FIG. 3A.

A residual block is described with reference to a ResBlock 340 as shown in FIG. 3B. The ResBlock 340 receives a tensor 341. The tensor 341 is zero-padded by a zero-padding module 342 to produce a tensor 343. The tensor 343 is passed to a CBL module 344 to produce a tensor 345. The tensor 345 is passed to a residual unit 346. The residual unit 346 contains a series of concatenated residual units. The last residual unit of the residual units 346 outputs a tensor 347.

Figure 3C:
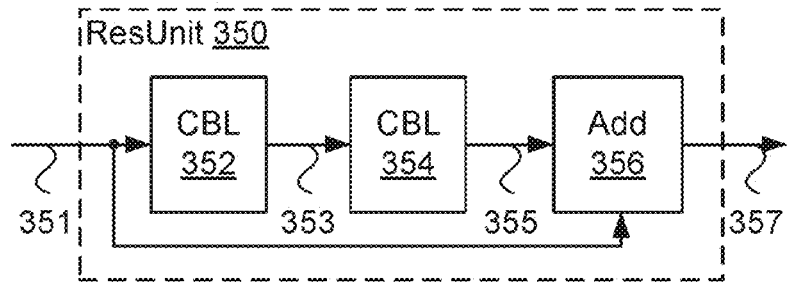
FIG. 3C is a schematic block diagram showing a residual unit of FIG. 3A.
Figure 3D:
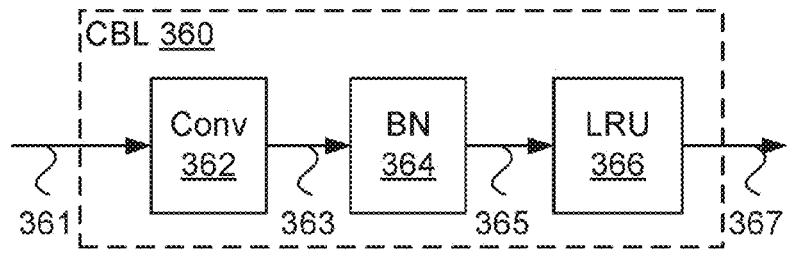
FIG. 3D is a schematic block diagram showing a CBL module of FIG. 3A.

A residual unit is described with reference to a ResUnit 350 as shown in FIG. 3C. The ResUnit 350 takes a tensor 351 as input. The tensor 351 is passed to a CBL module 352 to produce a tensor 353. The tensor 353 is passed to a second CBL unit 354 to produce a tensor 355. An add module 356 sums the tensor 355 with the tensor 351 to produce a tensor 357. The add module 356 may also be referred to as a 'shortcut' as the input tensor 351 substantially influences the output tensor 357. For an untrained network, ResUnit 350 acts to pass-through tensors. As training is performed, the CBL modules 352 and 354 act to deviate the tensor 357 away from the tensor 351 in accordance with training data and ground truth data.

Returning to FIG. 3A, the Res11 module 320 outputs a tensor 322. The tensor 322 is output from the backbone module 310 as one of the layers and also provided to a Res8 module 324. The Res8 module 324 is a residual block (i.e., 340), which includes eight residual units (i.e. 350). The Res8 module 324 produces a tensor 326. The tensor 326 is passed to a Res4 module 328 and output from the backbone module 310 as one of the layers. The Res4 module is a residual block (i.e., 340), which includes four residual units (i.e., 350). The Res4 module 328 produces a tensor 329. The tensor 329 is output from the backbone module 310 as one of the layers. Collectively, the layer tensors 322, 326, and 329 are output as the tensors 115. The backbone CNN 310 may take as input a video frame of resolution 1088×608 and produce three tensors, corresponding to three layers, with the following dimensions: [1, 256, 76, 136], [1, 512, 38, 68], [1, 1024, 19, 34]. Another example of the three tensors 115 corresponding to three layers may be [1, 512, 34, 19], [1, 256, 68, 38], [1, 128, 136, 76] which are respectively separated at 75th feature map, 90th feature map, and 105th feature map in the CNN 310. The separating points depend on the CNN 310.

Each of the Res11 320, Res8 324 and Res4 328 operates in a similar manner to ResBlock 340. Each of the CBL 314, the CBL 344 and the CBL 354 operate in a similar manner to the CBL 360.

Figure 4:
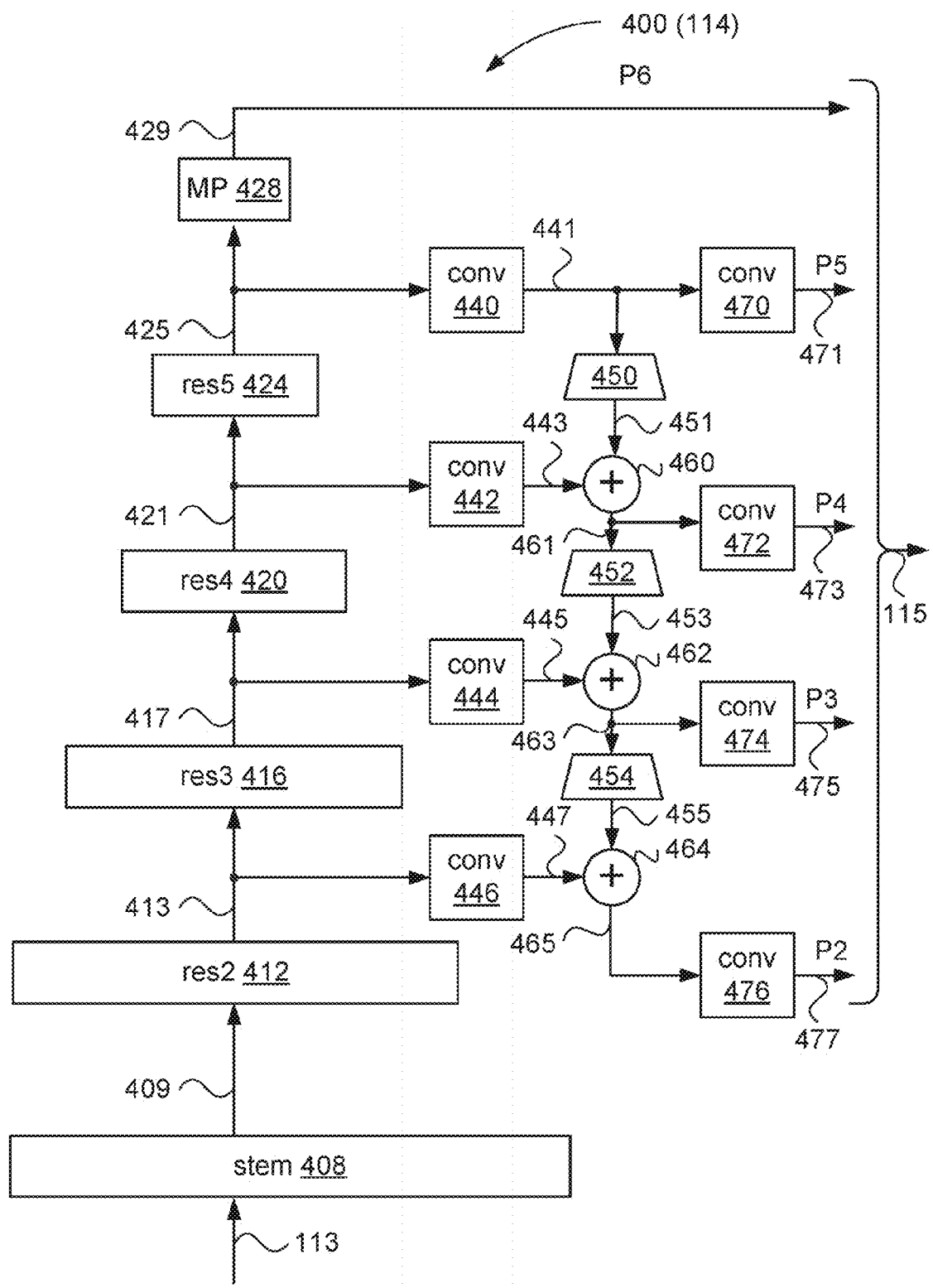
FIG. 4 is a schematic block diagram showing functional modules of an alternative backbone portion of a CNN.

FIG. 4 is a schematic block diagram showing functional modules of an alternative backbone portion 400 of a CNN, which may serve as an implementation of the CNN backbone 114. The backbone portion 400 implements a residual network with feature pyramid network ('ResNet FPN') and is an alternative version of the CNN backbone 114. Frame data 113 is input and passes through a stem network 408, a res2 module 412, a res3 module 416, a res4 module 420, a res5 module 424, and a max pool module 428 via tensors 409, 413, 417, 421, 425, with the max pool module 428 producing P6 tensor 429 as output.

The stem network 408 includes a 7×7 convolution with a stride of two (2) and a max pooling operation. The res2 module 412, the res3 module 416, the res4 module 420 and the res5 module 424 perform convolution operations, such as LeakyReLU activations. Each module 412, 416, 420 and 424 also performs one halving of the resolution of the processed tensors via a stride setting of two. Each of the tensors 413, 417, 421 and 425 are passed to one of 1×1 lateral convolution modules 446, 444, 442, and 440 respectively. The modules 446, 444, 442, and 440 produce tensors 447, 445, 443, 441 respectively. The tensor 441 is passed to a 3×3 output convolution module 470, which produces an output tensor P5 471. The tensor 441 is also passed to upsampler module 450 to produce an upsampled tensor 451. A summation module 460 sums the tensors 443 and 451 to produce a tensor 461, which is passed to an upsampler module 452 and a 3×3 lateral convolution module 472. The module 472 outputs a P4 tensor 473. The upsampler module 452 produces an upsampled tensor 453. A summation module 462 sums tensors 445 and 453 to produce a tensor 463, which is passed to a 3×3 lateral convolution module 474 and an upsampler module 454. The module 474 outputs a P3 tensor 475. The upsampler module 454 outputs an upsampled tensor 455. A summation module 464 sums the tensors 447 and 455 to produce tensor 465, which is passed to a 3×3 lateral convolution module 476. The module 476 outputs a P2 tensor 477. The upsampler modules 450, 452, and 454 use nearest neighbour interpolation for low computational complexity. The tensors 429, 471, 473, 475, and 477 form the output tensor 115 of the CNN backbone 400. Although FIG. 4 shows a particular backbone portion of the Faster RCNN network architecture (a 'P-layer split point'), different divisions into backbone and head are possible. Splitting the network at tensors 413, 417, 421, and 425 results is termed a 'res' split point. Splitting the network at tensor 409 is termed a 'stem' split point. Splitting the network at tensors 447, 445, 443, and 441 is termed a 'C-layer' split point.

Figure 5:
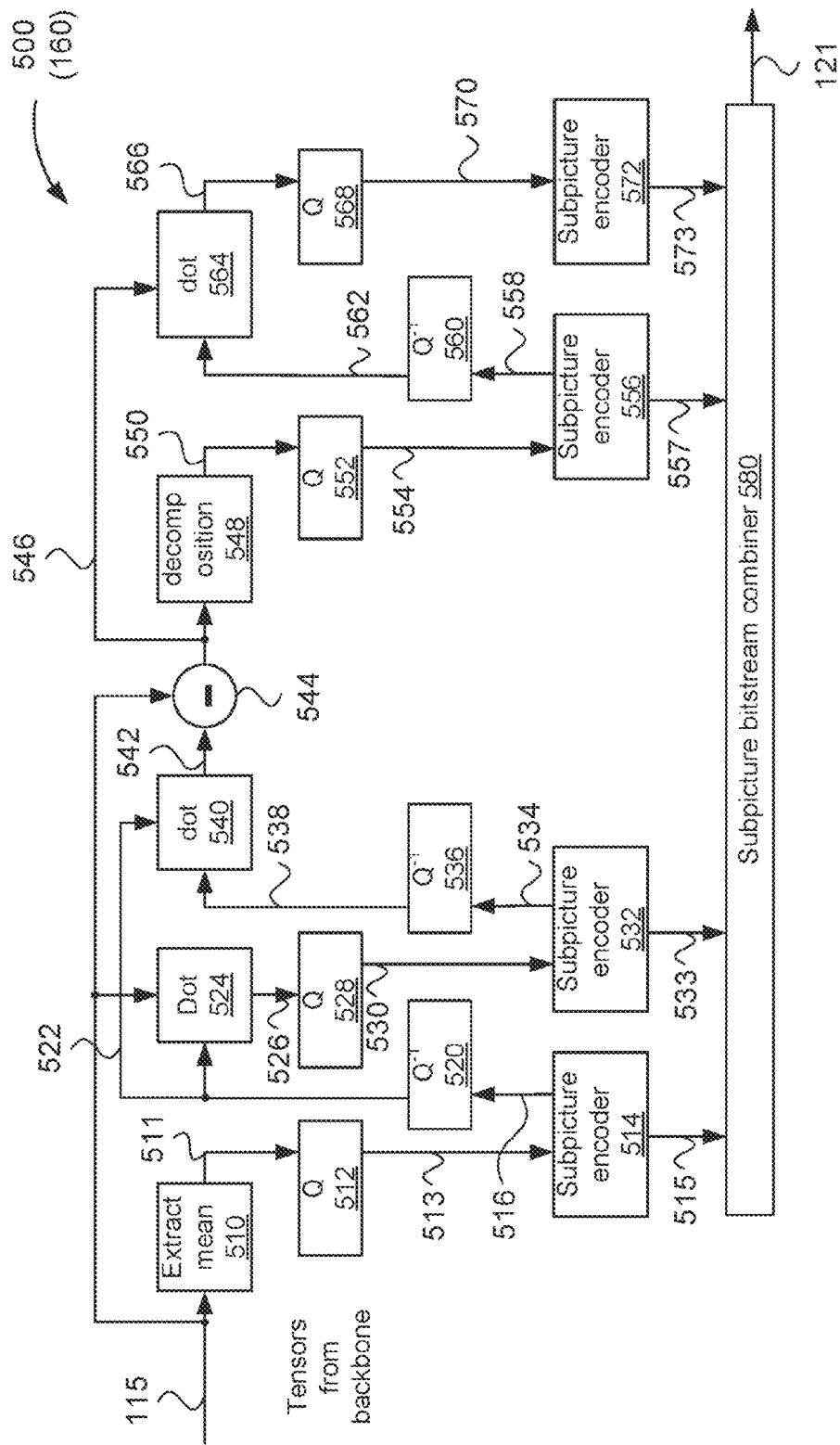
FIG. 5 is a schematic block diagram showing an inter-channel decorrelation-based tensor encoder as part of a distributed machine task system.

FIG. 5 is a schematic block diagram 500 showing an inter-channel decorrelation-based tensor encoder corresponding to an implementation of the encoder 160 (or 'PCA encoder') as part of a distributed machine task system 100. The PCA encoder 160 operates to reduce the dimensionality of the input tensor 115 such that a reconstructed version of the input tensor can be produced with minimal loss of fidelity by the PCA decoder 170. Compared to the frame data 113, the tensor 115 has lower spatial resolution but many more channels. For example, the frame data 113 in RGB or YCbCr format has 3 channels whereas the tensors may have 256 channels. As a consequence, directly packing the channels of the tensors 115 into a video frame results in a relatively large-sized frame that needs to be encoded. The channels of the tensor, although varied in content, to exhibit a degree of inter-channel correlation. When packed into a frame, the inter-channel correlation is difficult to exploit using a video encoder as the packing format results in specific spatial offsets between feature maps, which the video encoder generally is unable to exploit. Moreover, even were a video encoder to uncover inter-channel correlation for exploitation, the use of inter prediction or intra block copy to do so would correspond to prediction of one channel from another channel. The correspondence between channels would be repeated to the extent that correlations between pairs of channels could be discovered in the video encoder when testing prediction modes and searching for motion vectors or block vectors.

An approach of inter-channel decorrelation using principal component analysis (PCA) or equivalent methods is used in the PCA encoder 160. The PCA produces a set of vectors, ('principal components' or 'eigenvectors') defining an 'eigenspace'. The output of the PCA is a one-dimensional vector. In the arrangements described the output one-dimensional vector is understood to be converted into a two-dimensional form corresponding to the dimensionality of the width and height of the tensor upon which the PCA is being performed. Each eigenvector is orthogonal with respect to the other eigenvectors defining the eigenspace. The orthogonality means there is no redundancy in the contribution each eigenvector makes in expressing a feature map. Derivation of such a set of vectors from an input tensor may be referred to as 'decomposition' or dimensionality reduction, if the set of vectors is smaller than the input tensor. The eigenspace is a space in which channels of a tensor can be expressed as scalar multiples of the principal components. The ordering of principal components is such that the maximum amount of variance in a component captures the maximum amount of remaining unexplained variance in the tensor that has not been captured by preceding components. Accordingly, selecting the first N components of the set of vectors, where N is less than the channel count of the tensor, enables expressing the tensor in a reduced-dimensionality space with a minimum loss of precision when reconstructing (or 'projecting') the tensor at the decoder, compared to the original tensor. Transformation of a tensor from one space to another is achieved using a dot product operation, with the inputs suitably arranged as one-dimensional arrays and transposed as required.

Methods for principal component analysis include 'singular value decomposition' (SVD) and may serve as the decomposition function (described in relation to module 548 below) of the PCA encoder 160. Other methods of decomposition that may be used in the PCA encoder 160 at 548 include QR decomposition, which may be performed using a Gram-Schmidt process, Householder transformations, or Givens rotations, or LU (lower upper) decomposition, or Cholesky decomposition. A value N used in each decomposition method can be substantially less than the number of channels in the tensor 115. For example, with 256 channels in the tensor 115, using only the first 25 principal components the PCA decoder 170 can produce a reconstructed tensor of sufficiently high fidelity for the CNN head 150 to operate near losslessly, i.e., as if there were no or negligible lossy compression between the CNN backbone 114 and the CNN head 150.

The principal components or basis vectors are encoded using lossy compression, resulting in a need for the encoder to use the lossy representations of the basis vectors in some embodiments. Use of lossy representations of basis vectors in the encoder ensures that the forward transform used to generate coefficients is closer to invertible with respect to the backward transform used to project basis vectors back into channels of the decoded tensor. The decomposition module 548 also generally requires or benefits from operation on zero-centred data, producing more accurate basis vectors as a result. Since principal components or basis vectors are relative to the origin, the tensor being decomposed must also be centred around the origin, i.e., zero-centred. Use of a zero-centred tensor allows generation of basis vectors that are orthogonal and have a property that each successive basis vector accurately indicates the greatest amount of remaining unexplained variance in the tensor. When successive basis vectors each explain the greatest amount of remaining unexplained variance in the tensor, a reduced number of basis vectors are needed to explain the tensor to a given extent. In other words, decomposition of a zero-centred tensor allows the greatest degree of dimensionality reduction and hence the greatest compression efficiency.

The tensor encoder 500 receives the tensors 115 and inputs the tensors 115 to an extract mean module 510. To allow the decomposition module 548 to operate on zero-centred data, the extract mean module 510 operates to generate a mean feature map 511 by performing an average across the channel dimension of the tensor. A version of the mean feature map 511, lossy mean feature map 522, is forward transformed using derived lossy coefficients 538 by a dot product module 540 to produce per-channel mean feature maps 542. The dot product implemented at the module 240 is performed on a 'flattened' version of a feature map, i.e., reshaped from a two-dimensional array into a one-dimensional array. Where a dot product is performed on a feature map and a basis vector, both the feature map and the basis vector are flattened, one horizontally and the other vertically. For the remainder of this document, where a dot product is said to be performed on a (two-dimensional) feature map or other data, reshaping to and from a one-dimensional representation is understood to be implicit. The per-channel mean feature maps 542 are deducted from each channel in the tensor by a subtractor 544 to produce a DC-normalised tensor 546.

To account for discrepancy resulting from quantisation from the floating-point domain to/from the integer sample domain and the potential use of lossy coding in the sample domain, the PCA encoder 160 quantises, encodes, decodes, and inverse quantises the mean feature map 511 to produce the lossy mean feature map 522. The mean feature map 511 is quantised by a quantiser module 512 to produce an integer mean feature map 513. The integer mean feature map 513 is passed to a subpicture encoder 514. The subpicture encoder 514 packs the feature map 513 into a subpicture. The subpicture is encoded as a bitstream portion 515. The bitstream portion 515 corresponds to a compressed representation of the mean feature map 511, averaged across channels of the tensor. The subpicture encoder 514 also outputs a reconstructed integer mean feature map 516, which corresponds to an unpacked decoded mean feature map 844 produced in the PCA decoder 170, both being lossy representations of the mean feature map 511. The reconstructed integer mean feature map 516 is converted back to floating-point domain by an inverse quantiser module 520 to produce the lossy mean feature map 522. The lossy mean feature map 522 provides a floating-point representation of the integer mean feature map 516.

As amplitude varies from channel to channel in the tensor 115, the degree to which the mean feature map 522 is removed may be varied using a 'mean coefficient', produced by a dot product module 524 performing a dot product of the lossy mean feature map 522 and each respective channel of the tensor 115. The dot product module generates a set of mean coefficients 526, comprising one mean coefficient per channel of the tensor 115. The mean coefficients 526 are quantised into the sample domain by a quantiser module 528 to produce integer mean coefficients 530. The mean coefficients 530 are packed into a subpicture and encoded by a subpicture encoder 532 to produce a bitstream portion 533 and a lossy subpicture representation 534. The bitstream portion 533 corresponds to the coefficients 526 related to the average tensor value 511. The lossy subpicture representation 534, representing decoded mean coefficients, is supplied to an inverse quantiser module 536. The inverse quantiser module 536 outputs reconstructed mean coefficients 538, i.e., lossy floating-point versions of the mean coefficients 526. Accordingly, the zero-averaged tensor 546 corresponds to a zero-averaged tensor 852 derived in the PCA decoder 170.

Sources of loss include from quantisation and from lossy coding. Due to the sensitivity of generation of per-channel mean feature maps 542 on any loss regarding the mean coefficients, the subpicture encoder 532 operates at a higher quality level (smaller quantisation step size or lower quantisation parameter) than needed for subpicture encoder 514. The subpicture encoder 532 may be operated in a lossless mode for higher quality, at the expense of more bits being spent in the bitstream portion 533. Standards such as HEVC provide a 'transform quantisation bypass' mode for CUs, as a means for providing lossless operation locally by bypassing the transform and quantisation processes. Standards such as VVC instead use a sufficiently low QP that the quantisation process becomes a lossless process and transform skip mode can be independently selected to avoid losses from the transform. Such local application of lossless coding allows for 'mixed' lossy/lossless coding, with lossless coding used in highly sensitive portions of the picture, such as for regions of subpictures containing packed coefficients. The result of the mean or DC removal is a zero-centred tensor, i.e., the DC-normalised tensor 546, more amenable to basis vector derivation in the decomposition module 548.

The decomposition module operates to perform a decomposition function across channels of the tensor 546 to produce basis vectors, the basis vectors being components capable of representing tensor with an acceptable trade-off between the number of components and the accuracy of the representation. Various mechanisms for the decomposition may be used in the decomposition module 548. Singular value decomposition (SVD) is one popular and computationally fast method of decomposition suitable for use in the decomposition module 548. Notwithstanding that lossy coding may be used for different types of data (mean feature, coefficients, basis vectors) that need to be conveyed from the source device 110 to the destination device 140, use of a sample representation of the data requires quantisation from a floating-point domain to an integer domain, the range of which is constrained by the bit depth of the video encoding and decoding processes. To produce a single coherent container for the quantised data, an image frame may be comprised of multiple subpictures, each of is the subpictures being independently encoded and a reconstructed version (i.e., a version of the subpicture as produced in the corresponding decoder) made available in the PCA encoder 160. An arrangement of subpictures is described with reference to FIGS. 13A and 13B hereafter. As a consequence of using inverse quantisation modules 520 and 536, compression loss due to lossy coding is taken into account in the tensor encoding process implemented by the system 500.

The decomposition module 548 produces a set of basis vectors 550. The size of the set of basis vectors 550 is generally a fraction of the number of channels of the tensor 115. The basis vectors 550 define a new subspace in which the tensor 115 can be approximately expressed with a minimum loss of fidelity. Producing fewer basis vectors than there are channels when decomposing a tensor is referred to as 'dimensionality reduction'. Dimensionality reduction provides a means to achieve lossy compression by discarding or not generating basis vectors that make the least significant contribution to expressing the channels of the tensor 115. For example, approximately 10% of the input channel count of 255 or 25 basis vectors can be produced by the decomposition module 548. The basis vectors form an eigenspace capable of representing feature maps in the tensor 115 with considerable reduction in dimensionality and hence coded area in a picture or subpicture. The basis vectors 550 are quantised by a quantiser 552 to produce an integer basis vector tensor 554. The quantiser 552 operates to generate (integer) coefficients for the tensor using the basis vectors 550. The integer basis vector tensor 554 is packed into a subpicture and encoded by a subpicture encoder 556. The subpicture encoder 556 outputs a bitstream portion 557 and, as a result of unpacking a reconstructed subpicture, outputs a reconstructed integer tensor 558. The bitstream portion 557 corresponds to the components 550 generated by decomposition of the tensor 546 by the module 548. Inverse quantiser module 560 inverse quantises the reconstructed integer tensor 558 to produce a reconstructed basis vector tensor 562.

A forward transform is performed by a dot product module 564, generating a dot product of each channel of the zero-averaged tensor 546 and each of the basis vectors in the reconstructed basis vector tensor 562 to produce a set of coefficients 566. With 256 channels in the zero-averaged tensor 546 and 25 (twenty-five) components in the tensor 562, there are 256×25=6400 coefficients output as the set 566. The coefficients 566 are quantised from the floating-point domain to the integer domain by a quantiser module 568. The quantiser module 568 outputs a set of coefficient samples 570. The coefficient samples 570 are packed into a subpicture and encoded into a bitstream portion 573 by a subpicture encoder 572. The bitstream portion 573 corresponds to the coefficients 566 related to the components 550. The bitstream portions 515, 533, 557, and 573 correspond to four subpictures and are combined by a subpicture bitstream combiner 580 to produce an encoded bitstream 121. Due to the sensitivity of task performance on the fidelity of reconstructed coefficients 818 seen in the PCA decoder 170, the quality level used in the subpicture encoder 572 is relatively higher than the quality level used for encoding basis vectors, i.e., by subpicture encoder 556.

In an arrangement of the PCA encoder 160 the decomposition module 548 is operable to output a variable number of basis vectors 550, such that at least a minimum amount of variance of the tensor 115 is expressed by the basis vectors 550, up to a limit of a maximum number of components M, e.g., 25 for a tensor having 256 channels. An 'eigenvalue' is associated with each vector in the basis vectors 550, indicating how much variance is accommodated or 'explained' by using the respective basis vector. As each successive basis vector explains the greatest amount of remaining unexplained variance in the tensors 115, the eigenvalues for the basis vectors 550 are decreasing in magnitude when progressing over vectors in the basis vectors 550. A minimum variance threshold may be established, such as 85%, 90%, or 95%, 98% or other value. The largest value N may be selected where the cumulative sum of the first Nth eigenvalues is less than the minimum variance threshold and N is less than or equal to the number of basis vectors generated by the decomposition module 548. Alternatively, the smallest value N may be selected where the cumulative sum of the first Nth eigenvalues is greater than the minimum variance threshold and N is less than or equal to the number of basis vectors generated by the decomposition module 548. The subset of N basis vectors is output as the basis vectors 550. The modules 552, 556 for packing basis vectors 550 into a subpicture 1216 (as described in relation to FIG. 12A) and encoding into bitstream portion 557 may in some arrangements encode the first N basis vectors, omitting remaining vectors (if any) from being used for forward transform, packing into the subpicture 1216. For tensors 115 with less variance therein, the selected value N may be lower than the fixed threshold, such as 25. As a result of selecting N basis vectors, the area of basis vectors to pack in subpicture 1216 and number of coefficients to pack in subpicture 1214 (as described in relation to FIG. 12A) may be reduced, leading to a reduction in the coded size of the bitstream 121. Where the split-point of the network contains multiple tensors, e.g., where an FPN is used, the value N may be derived independently for each layer in the FPN, allowing for adaptation to differences in complexity (and hence variance) contained in tensors produced for each layer of the FPN from the CNN backbone 114. The value N determined for each tensor being compressed is encoded in the bitstream 121 by the PCA encoder 160 to enable the PCA decoder 170 to unpack the correct number of basis vectors from the decoded picture. The PCA decoder 170 uses the unpacked number of basis vectors N to determine the basis vector tensor count, and uses the worst case basis vector count M to establish packing positions in the subpicture 1216. The PCA decoder 170 can use the decoded value N for the current and subsequent frames, updating N when a new value N is decoded, to unpack basis vectors at the first N positions as decoded basis vectors from the bitstream 143.

To reduce loss, sensitive data such as the mean coefficients 530 and the coefficient samples 570 may be coded losslessly. The mean coefficients 530 and the coefficient samples 570 may be coded using a different coded to VVC. Instead of packing 530 and 570 into respective subpictures for coding as video samples they may be coded using an alternative general scheme for lists of numbers. One scheme is 'DeepCABAC', whereby sequences of numbers having magnitudes clustered at low magnitudes and many zero-valued numbers (e.g., Gaussian or similar distribution) are efficiently coded using context-adaptive binary arithmetic coding along with a binarization scheme similar to that used for residual samples in standards such as VVC or HEVC. Regardless of use of lossless or lossy coding for coefficients in the integer domain, the conversion from the floating-point domain to the integer domain introduces some loss that is otherwise unavoidable (unless floating-point values are represented in the bitstream 121, which is less efficient). Where coefficients 530 and 570 are represented in the bitstream 121 using a separate scheme to VVC, such as DeepCABAC, the DeepCABAC bitstream may be associated with a frame using an SEI message, such as the 'user data SEI message' or other dedicated SEI message. For each picture encoding basis vectors, an associated SEI message accompanies the picture to enable reconstruction of feature maps from the coefficients and basis vectors.

The quantisers 512, 528, 552, and 568 generally all quantise floating-point values into an integer samples range corresponding to that afforded by the bit-depth of a video frame, for example, 0-1023 when 10-bit coding is used. Quantising to samples implies quantising to a closed range of values whereas if alternative compression schemes to VVC are used, quantisation to an open (unrestricted) range is possible. For example if subpicture encoders 532 and 572 use an algorithm such as DeepCABAC then there is no need to fit the integer values into a range of values. When fitting floating-point values into a sample range, the quantisers 512, 528, 552, and 568 each operate using a respective 'quantisation range', which may be set at various granularities. The quantisation range of each respective quantiser may be determined each time a tensor is quantised. Each determined quantisation range needs to be signalled in the bitstream 121 so the PCA decoder 170 can inverse quantise the integer values back into the correct range in the floating-point domain.

The bitstream 115 is obtained from a stage in the neural network formed by the CNN backbone 114 and the CNN head 150. The tensor 546 is accordingly also from a stage in the neural network formed by the CNN backbone 114 and the CNN head 150. Although FIG. 5 shows PCA-based compression of one tensor 115, when the CNN is separated at a point where a feature pyramid network exists, there exists a plurality of tensors requiring compression. When an FPN is used, the PCA encoder 160 operates on each tensor of the FPN. The subpicture encoders 514, 532, 556, and 572 may be shared among the tensors of the FPN, with the packing and unpacking capable of reserving area in the respective subpictures for data corresponding to each tensor in the FPN. Where an FPN is used, separate quantisation ranges may be used for the quantisers 512, 528, 552, and 568 and the inverse quantisers 520, 536, 560 when processing each layer of the FPN. The separate quantisation ranges are coded in the bitstream 121 for use by the PCA decoder 170 in an SEI message, described with reference to FIG. 13.

In another arrangement of the PCA encoder 160 the quantisation ranges determined by the quantisers 512, 528, 552, and 568 are set to the previous quantisation range of the respective quantiser and increased as necessary to accommodate the range of the data (data 511, 526, 550, and 566) being quantised for the current PCA encoding operation. The setting of quantisation ranges results in a memory effect from picture to picture that causes quantisation ranges to 'grow' over a sequence of tensor compression operations. Quantisation ranges that grow over a sequence of tensors result in less sensitivity to outlier values seen in particular tensors that would alter the sample values for large portions of data such as basis vectors. Quantisation ranges that grow over a sequence of tensors can suppress a 'flickering' effect that can be observed when the packed pictures of successive tensor compression operations are viewed as a video sequence. Suppression of flickering in packed pictures facilitates compression using the video encoder (for example encoders 514, 532, 556 and 572) by reducing brightness shifts, which are difficult for the encoder to detect and represent efficiently in compressed form. Where the video encoder uses a periodic refresh, such as intra-pictures in a random-access configuration, the quantisation range can be determined from only the current tensor for such pictures. For random access sequences, the non-intra pictures may use inter-prediction coding tools to predict content, such as basis vectors, from previous pictures, achieving higher compression efficiency due to the relative stability of the distribution of sample values used to represent the basis vectors in successive frames.

In another arrangement of the PCA encoder 160 and the PCA decoder 170, when a FPN is used, a relationship is established between the quantisation range (QR) for coefficients for basis vectors between layers. Where the CNN backbone 114 and the CNN head 150 form a Faster RCNN or Mask RCNN network, the QR for basis vector coefficients for layer N is set to twice the QR for layer N+1 and so on. Setting the QR to twice that for the previous layer includes the case when two layers are concatenated into a single layer for the purpose of tensor compression, e.g., when downsampled P2 and P3 are concatenated to form layer N and P4 forms layer N+1. If one QR is signalled for basis vector coefficients, the QR for each layer is derived based on layer index. When the CNN backbone 114 and the CNN head 150 form a YOLOv3 network or similar, the resolution-based ordering is reversed such that layer N+1 has twice the QR of layer N. Signalling in the bitstream 121 indicates which ordering is to be used in the PCA decoder 170 for inverse quantisation of coefficients for basis vectors when a FPN is in use.

Figure 6:
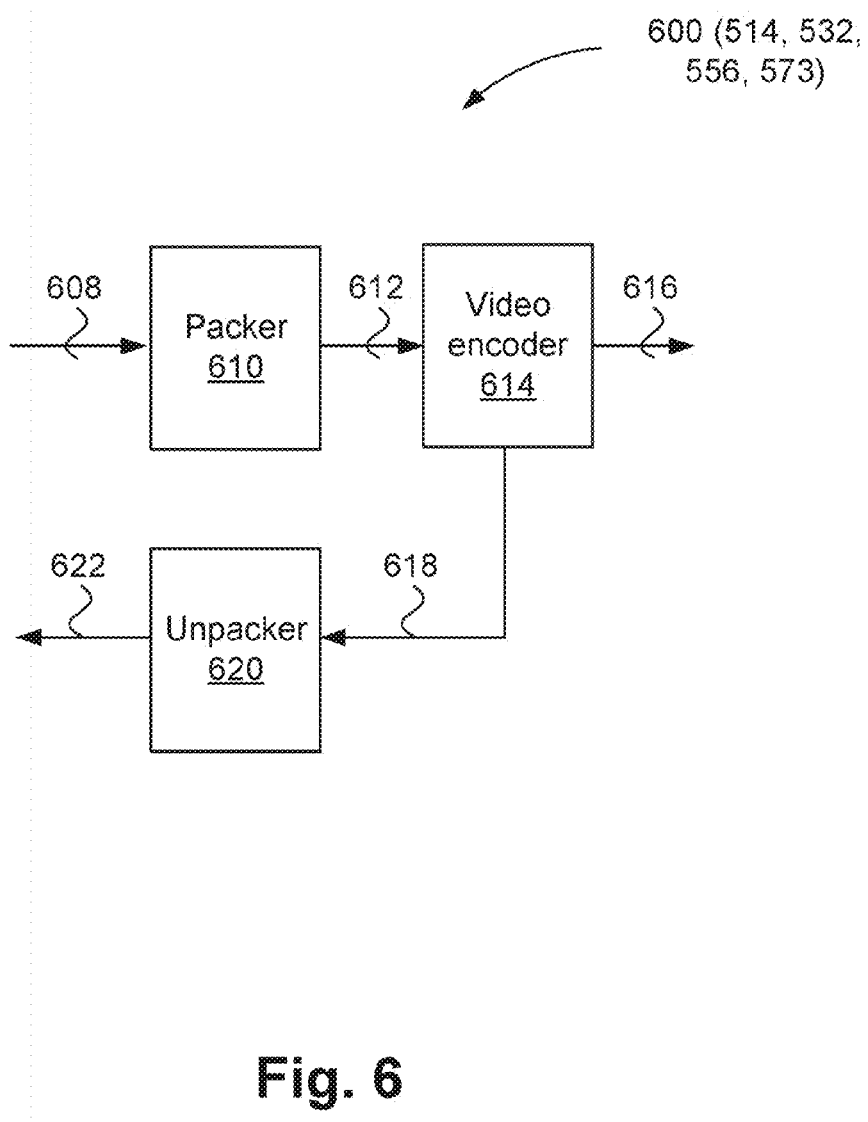
FIG. 6 is a schematic block diagram showing a feature map packer, packed frame encoder, and unpacker as part of an inter-channel decorrelation-based tensor encoder.

FIG. 6 is a schematic block diagram 600 of an encoder architecture. The encoder architecture 600 includes a feature map packer 610, a packed frame encoder 614, and an unpacker 620. Subpicture encoders 514, 532, 556, and 572 are implemented as instances of the architecture 600. The packer 610 receives a tensor 608 having a given channel count, width and height dimensions and containing integer values, i.e., already quantised, For example, the subpicture encoder 514 receives the integer mean feature map 513. The packer 610 packs the received tensor into a 2D planar array of samples. Generally, in the arrangements described, feature maps of the respective channels of the tensor 608 are stored in a subpicture frame 612, in a left-to-right and top-to-bottom manner. The subpicture frame 612 needs to be of sufficient size to hold the channels of the tensor 608, including allowance for gaps in packing due to mismatch between feature map size and subpicture frame 612 dimensions. The packed frame encoder 614, generally implemented as a VVC encoder, is described with reference to FIG. 7. The encoder 614 produces an encoded bitstream portion 616, corresponding to a respective subpicture. For example, the subpicture encoder 514 outputs an encoded bitstream portion 515. The encoder 614 also outputs a reconstructed frame 618, corresponding to the lossy version reproduced when decoding the bitstream portion 616. The reconstructed frame 618 represents a reconstruction of the mean feature map 513, in which losses invoked due to encoding are modelled or represented. The losses reflect encoding losses such as those incurred by the particular encoding method used at the encoder 614. In the example described in FIG. 7, the encoder 614 is a VVC encoder. In another implementation, the encoder 614 can be HEVC encoder, which will incur different coding losses. Lossless codecs may be used for the encoder 614, such as JPEG LS or DeepCABAC, in which case the reconstructed frame 618 is equal to the subpicture frame 612. If HEVC or VVC are used for the encoder 614, they may be configured to perform lossless coding for the coefficients.

The reconstructed frame 618 is passed to the unpacker 620 The unpacker 620 extracts feature maps to produce a reconstructed tensor 622 having the same dimensionality as the tensor 608. As a result of operation of the module 600, the PCA encoder 160 is allowed to use versions of feature maps (or coefficients) that correspond to the versions seen in the PCA decoder 170 and hence operate at a higher level of fidelity than if the source of loss not taken into account. Subpicture encoders 514, 532, 556, and 572 are configured to disable loop filtering both internally and across subpicture boundaries, as loop filtering is generally optimised for human consumption of decoded pictures. The system 100 uses video compression as a means to efficiently represent data resulting from the dimensional reduction performed on the intermediate tensor data that needs to be propagated from the CNN backbone 114 to the CNN head 150.

Figure 7:
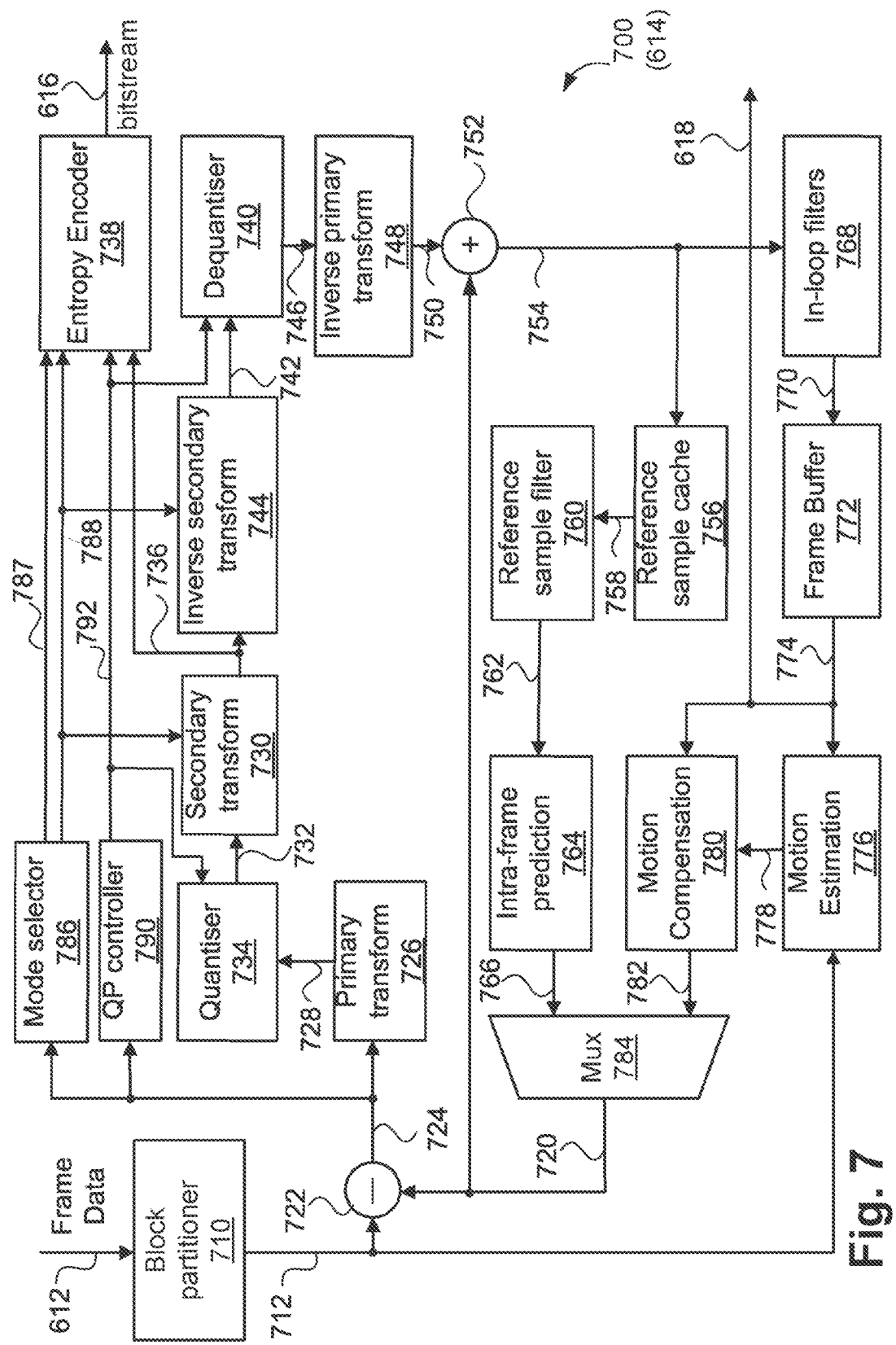
FIG. 7 is a schematic block diagram showing functional modules of a video encoder.

FIG. 7 is a schematic block diagram 700 showing functional modules of the video encoder 614. The video encoder 614 encodes one subpicture amongst a set of subpictures that define an overall picture. While it is possible for all subpictures to be encoded as one picture in one encoding pass, use of one encoding pass means that feedback in the PCA encoder 160 to account for lossy coding in the pipeline is not possible. Generally, data passes between functional modules within the video encoder 614 in groups of samples or coefficients, such as divisions of blocks into sub-blocks of a fixed size, or as arrays. The video encoder 614 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively, the video encoder 614 may be implemented by a combination of dedicated hardware and software executable within the computer system 200. The video encoder 614 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 614 comprises modules 710-790 which may each be implemented as one or more software code modules of the software application program 233.

Although the video encoder 614 of FIG. 7 is an example of a versatile video coding (VVC) video encoding pipeline, other video codecs may also be used to perform the processing stages described herein. For example, HEVC may be used. The examples described generate a bitstream of encoded data. If other codecs were used, some implementations may pack data into a different format such as a frame format or the like. The video encoder 614 receives subpicture frame data 612, such as a series of frames of subpictures, each frame including one or more colour channels. The frame data 612 may be in any chroma format and bit depth supported by the profile in use, for example 4:0:0, 4:2:0 for the "Main 10" profile of the VVC standard, at eight (8) to ten (10) bits in sample precision. A block partitioner 710 firstly divides the frame data 612 into CTUs, generally square in shape and configured such that a particular size for the CTUs is used. The maximum enabled size of the CTUs may be 32×32, 64×64, or 128×128 luma samples for example, configured by a 'sps_log_2_ctu_size_minus5' syntax element present in the 'sequence parameter set'. The CTU size also provides a maximum CU size, as a CTU with no further splitting will contain one CU. The block partitioner 710 further divides each CTU into one or more CBs according to a luma coding tree and a chroma coding tree. The luma channel may also be referred to as a primary colour channel. Each chroma channel may also be referred to as a secondary colour channel. The CBs have a variety of sizes, and may include both square and non-square aspect ratios. However, in the VVC standard, CBs, CUs, PUs, and TUs always have side lengths that are powers of two. Thus, a current CB, represented as 712, is output from the block partitioner 710, progressing in accordance with an iteration over the one or more blocks of the CTU, in accordance with the luma coding tree and the chroma coding tree of the CTU.

The CTUs resulting from the first division of the frame data 614 may be scanned in raster scan order and may be grouped into one or more 'slices'. A slice may be an 'intra' (or 'I') slice. An intra slice (I slice) indicates that every CU in the slice is intra predicted. Generally, the first picture in a coded layer video sequence (CLVS) contains only I slices, and is referred to as an 'intra picture'. The CLVS may contain periodic intra pictures, forming 'random access points' (i.e., intermediate frames in a video sequence upon which decoding can commence). Alternatively, a slice may be uni- or bi-predicted ('P' or 'B' slice, respectively), indicating additional availability of uni- and bi-prediction in the slice, respectively.

The video encoder 614 encodes sequences of pictures according to a picture structure. One picture structure is 'low delay', in which case pictures using inter-prediction may only reference pictures occurring previously in the sequence. Low delay enables each picture to be output as soon as it is decoded, in addition to being stored for possible reference by a subsequent picture. Another picture structure is 'random access', whereby the coding order of pictures differs from the display order. Random access allows inter-predicted pictures to reference other pictures that, although decoded, have not yet been output. A degree of picture buffering is needed so the reference pictures in the future in terms of display order are present in the decoded picture buffer, resulting in a latency of multiple frame.

When a chroma format other than 4:0:0 is in use, in an I slice, the coding tree of each CTU may diverge below the 64×64 level into two separate coding trees, one for luma and another for chroma. Use of separate trees allows different block structure to exist between luma and chroma within a luma 64×64 area of a CTU. For example, a large chroma CB may be collocated with numerous smaller luma CBs and vice versa. In a P or B slice, a single coding tree of a CTU defines a block structure common to luma and chroma. The resulting blocks of the single tree may be intra predicted or inter predicted.

In addition to a division of pictures into slices, pictures may also be divided into 'tiles'. A tile is a sequence of CTUs covering a rectangular region of a picture. CTU scanning occurs in a raster-scan manner within each tile and progresses from one tile to the next. A slice can be either an integer number of tiles, or an integer number of consecutive rows of CTUs within a given tile.

For each CTU, the video encoder 614 operates in two stages. In the first stage (referred to as a 'search' stage), the block partitioner 710 tests various potential configurations of a coding tree. Each potential configuration of a coding tree has associated 'candidate' CBs. The first stage involves testing various candidate CBs to select CBs providing relatively high compression efficiency with relatively low distortion. The testing generally involves a Lagrangian optimisation whereby a candidate CB is evaluated based on a weighted combination of rate (i.e., coding cost) and distortion (i.e., error with respect to the input frame data 612). 'Best' candidate CBs (i.e., the CBs with the lowest evaluated rate/distortion) are selected for subsequent encoding into the bitstream 616. Included in evaluation of candidate CBs is an option to use a CB for a given area or to further split the area according to various splitting options and code each of the smaller resulting areas with further CBs, or split the areas even further. As a consequence, both the coding tree and the CBs themselves are selected in the search stage.

The video encoder 614 produces a prediction block (PB), indicated by an arrow 720, for each CB, for example, CB 712. The PB 720 is a prediction of the contents of the associated CB 712. A subtracter module 722 produces a difference, indicated as 724 (or 'residual', referring to the difference being in the spatial domain), between the PB 720 and the CB 712. The difference 724 is a block-size difference between corresponding samples in the PB 720 and the CB 712. The difference 724 is transformed, quantised and represented as a transform block (TB), indicated by an arrow 736. The PB 720 and associated TB 736 are typically chosen from one of many possible candidate CBs, for example, based on evaluated cost or distortion.

A candidate coding block (CB) is a CB resulting from one of the prediction modes available to the video encoder 614 for the associated PB and the resulting residual. When combined with the predicted PB in the video encoder 614, the TB 736 reduces the difference between a decoded CB and the original CB 712 at the expense of additional signalling in a bitstream.

Each candidate coding block (CB), that is prediction block (PB) in combination with a transform block (TB), thus has an associated coding cost (or 'rate') and an associated difference (or 'distortion'). The distortion of the CB is typically estimated as a difference in sample values, such as a sum of absolute differences (SAD), a sum of squared differences (SSD) or a Hadamard transform applied to the differences. The estimate resulting from each candidate PB may be determined by a mode selector 786 using the difference 724 to determine a prediction mode 787. The prediction mode 787 indicates the decision to use a particular prediction mode for the current CB, for example, intra-frame prediction or inter-frame prediction. Estimation of the coding costs associated with each candidate prediction mode and corresponding residual coding may be performed at significantly lower cost than entropy coding of the residual. Accordingly, a number of candidate modes may be evaluated to determine an optimum mode in a rate-distortion sense even in a real-time video encoder.

Determining an optimum mode in terms of rate-distortion is typically achieved using a variation of Lagrangian optimisation.

Lagrangian or similar optimisation processing can be employed to both select an optimal partitioning of a CTU into CBs (by the block partitioner 710) as well as the selection of a best prediction mode from a plurality of possibilities. Through application of a Lagrangian optimisation process of the candidate modes in the mode selector module 786, the intra prediction mode with the lowest cost measurement is selected as the 'best' mode. The lowest cost mode includes a selected secondary transform index 788, which is also encoded in the bitstream 614 by an entropy encoder 738.

In the second stage of operation of the video encoder 614 (referred to as a 'coding' stage), an iteration over the determined coding tree(s) of each CTU is performed in the video encoder 614. For a CTU using separate trees, for each 64×64 luma region of the CTU, a luma coding tree is firstly encoded followed by a chroma coding tree. Within the luma coding tree, only luma CBs are encoded and within the chroma coding tree only chroma CBs are encoded. For a CTU using a shared tree, a single tree describes the CUs (i.e., the luma CBs and the chroma CBs) according to the common block structure of the shared tree.

The entropy encoder 738 supports bitwise coding of syntax elements using variable-length and fixed-length codewords, and an arithmetic coding mode for syntax elements. Portions of the bitstream such as 'parameter sets', for example, sequence parameter set (SPS) and picture parameter set (PPS) use a combination of fixed-length codewords and variable-length codewords. Slices, also referred to as contiguous portions, have a slice header that uses variable length coding followed by slice data, which uses arithmetic coding. The slice header defines parameters specific to the current slice, such as slice-level quantisation parameter offsets. The slice data includes the syntax elements of each CTU in the slice. Use of variable length coding and arithmetic coding requires sequential parsing within each portion of the bitstream. The portions may be delineated with a start code to form 'network abstraction layer units' or 'NAL units'. Arithmetic coding is supported using a context-adaptive binary arithmetic coding process.

Arithmetically coded syntax elements consist of sequences of one or more 'bins'. Bins, like bits, have a value of '0' or '1'. However, bins are not encoded in the bitstream 614 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits in the bitstream 614, including costs that amount to less than one discrete bit. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (i.e., a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context may be dependent on earlier bins in the syntax element, the bin values of neighbouring syntax elements (i.e., those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the entropy encoder 738 are bins that lack a context, referred to as "bypass bins". Bypass bins are coded assuming an equiprobable distribution between a '0' and a '1'. Thus, each bin has a coding cost of one bit in the bitstream 614. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

A QP controller 790 determines a quantisation parameter 792, used to establish a quantisation step size for use by the quantiser 734 and the dequantiser 740. A larger quantisation step size results in the primary transform coefficients 728 being quantised into smaller values, reducing bit-rate of the bitstream 121 at the expense of a reduction in the fidelity of inverse transform coefficients 746.

The entropy encoder 738 encodes the quantisation parameter 792 and, if in use for the current CB, the LFNST index 788, using a combination of context-coded and bypass-coded bins. The quantisation parameter 792 is encoded at the beginning of each slice and changes in the quantisation parameter 792 within a slice are coded using a 'delta QP' syntax element. The delta QP syntax element is signalled at most once in each area known as a 'quantisation group'. The quantisation parameter 792 is applied to residual coefficients of the luma CB. An adjusted quantisation parameter is applied to the residual coefficients of collocated chroma CBs. The adjusted quantisation parameter may include mapping from the luma quantisation parameter 792 according to a mapping table and a CU-level offset, selected from a list of offsets. The secondary transform index 788 is signalled when the residual associated with the transform block includes significant residual coefficients only in those coefficient positions subject to transforming into primary coefficients by application of a secondary transform.

Residual coefficients of each TB associated with a CB are coded using a residual syntax. The residual syntax is designed to efficiently encode coefficients with low magnitudes, using mainly arithmetically coded bins to indicate significance of coefficients, along with lower-valued magnitudes and reserving bypass bins for higher magnitude residual coefficients. Accordingly, residual blocks comprising very low magnitude values and sparse placement of significant coefficients are efficiently compressed. Moreover, two residual coding schemes are present. A regular residual coding scheme is optimised for TBs with significant coefficients predominantly located in the upper-left corner of the TB, as is seen when a transform is applied. A transform-skip residual coding scheme is available for TBs where a transform is not performed and is able to efficiently encode residual coefficients regardless of their distribution throughout the TB.

A multiplexer module 784 outputs the PB 720 from an intra-frame prediction module 764 according to the determined best intra prediction mode, selected from the tested prediction mode of each candidate CB. The candidate prediction modes need not include every conceivable prediction mode supported by the video encoder 614. Intra prediction falls into three types, first, "DC intra prediction", which involves populating a PB with a single value representing the average of nearby reconstructed samples; second, "planar intra prediction", which involves populating a PB with samples according to a plane, with a DC offset and a vertical and horizontal gradient being derived from nearby reconstructed neighbouring samples. The nearby reconstructed samples typically include a row of reconstructed samples above the current PB, extending to the right of the PB to an extent and a column of reconstructed samples to the left of the current PB, extending downwards beyond the PB to an extent; and, third, "angular intra prediction", which involves populating a PB with reconstructed neighbouring samples filtered and propagated across the PB in a particular direction (or 'angle'). In VVC, sixty-five (65) angles are supported, with rectangular blocks able to utilise additional angles, not available to square blocks, to produce a total of eighty-seven (87) angles.

A fourth type of intra prediction is available to chroma PBs, whereby the PB is generated from collocated luma reconstructed samples according to a 'cross-component linear model' (CCLM) mode. Three different CCLM modes are available, each mode using a different model derived from the neighbouring luma and chroma samples. The derived model is used to generate a block of samples for the chroma PB from the collocated luma samples. Luma blocks may be intra predicted using a matrix multiplication of the reference samples using one matrix selected from a predefined set of matrices. This matrix intra prediction (MIP) achieves gain by using matrices trained on a large set of video data, with the matrices representing relationships between reference samples and a predicted block that are not easily captured in angular, planar, or DC intra prediction modes.

The module 764 may also produce a prediction unit by copying a block from nearby the current frame using an 'intra block copy' (IBC) method. The location of the reference block is constrained to an area equivalent to one CTU, divided into 64×64 regions known as VPDUs, with the area covering the processed VPDUs of the current CTU and VPDUs of the previous CTU(s) within each row or CTUs and within each slice or tile up to the area limit corresponding to one 128×128 luma samples, regardless of the configured CTU size for the bitstream. This area is known as an 'IBC virtual buffer' and limits the IBC reference area, thus limiting the required storage. The IBC buffer is populated with reconstructed samples 754 (i.e. prior to loop filtering), and so a separate buffer to the frame buffer 772 is needed. When the CTU size is 128×128 the virtual buffer includes samples only from the CTU adjacent and to the left of the current CTU. When the CTU size is 32×32 or 64×64 the virtual buffer includes CTUs from up to the four or sixteen CTUs to the left of the current CTU. Regardless of the CTU size, access to neighbouring CTUs for obtaining samples for IBC reference blocks is constrained by boundaries such as edges of pictures, slices, or tiles. Particularly for feature maps of FPN layers having smaller dimensions, use of a CTU size such as 32×32 or 64×64 results in a reference area more aligned to cover a set of previous feature maps. Where feature map placement is ordered based on SAD, SSE or other difference metric, access to similar feature maps for IBC prediction offers coding efficient advantage.

The residual for a predicted block when encoding feature map data is different to the residual seen for natural video. Natural video is typically captured by an image sensor, or screen content, as generally seen in operating system user interfaces and the like. Feature map residuals tend to contain much detail. The level of detail in feature map residuals is amenable to transform skip coding more than predominantly low-frequency coefficients of various transforms. Experiments by the inventors to measure the benefit of residual coding using DCT-2, MTS (DST-7, DCT-8 combinations horizontally and vertically), and LFNST (various trained non-separable transforms), show that the feature map residual has enough local similarity to benefit from transform coding. However, the distribution of feature map residual coefficients is not clustered towards the DC (top-left) coefficient of a transform block. In other words, sufficient correlation exists for a transform to show gain when encoding feature map data. Sufficient correlation also exists for when intra block copy is used to produce prediction blocks for the feature map data. Accordingly, a Hadamard cost estimate may be used when evaluating residuals resulting from candidate block vectors for intra block copy when encoding feature map data, instead of relying solely on a SAD or SSD cost estimate. SAD or SSD cost estimates tend to select block vectors with residuals more amenable to transform skip coding and may miss block vectors with residuals that would be compactly encoded using transforms. The multiple transform selection (MTS) tool of the VVC standard may be used when encoding feature map data so that, in addition to the DCT-2 transform, combinations of DST-7 and DCT-8 transforms are available horizontally and vertically for residual encoding.

An intra-predicted luma coding block may be partitioned into a set of equal-sized prediction blocks, either vertically or horizontally, which each block having a minimum area of sixteen (16) luma samples. This intra sub-partition (ISP) approach enables separate transform blocks to contribute to prediction block generation from one sub-partition to the next sub-partition in the luma coding block, improving compression efficiency.

Where previously reconstructed neighbouring samples are unavailable, for example at the edge of the frame, a default half-tone value of one half the range of the samples is used. For example, for 10-bit video a value of five-hundred and twelve (512) is used. As no previous samples are available for a CB located at the top-left position of a frame, angular and planar intra-prediction modes produce the same output as the DC prediction mode (i.e. a flat plane of samples having the half-tone value as magnitude).

For inter-frame prediction a prediction block 782 is produced using samples from one or two frames preceding the current frame in the coding order frames in the bitstream by a motion compensation module 780 and output as the PB 720 by the multiplexer module 784. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted.

Frames are typically coded using a 'group of pictures' structure, enabling a temporal hierarchy of frames. Frames may be divided into multiple slices, each of which encodes a portion of the frame. A temporal hierarchy of frames allows a frame to reference a preceding and a subsequent picture in the order of displaying the frames. The images are coded in the order necessary to ensure the dependencies for decoding each frame are met. An affine inter prediction mode is available where instead of using one or two motion vectors to select and filter reference sample blocks for a prediction unit, the prediction unit is divided into multiple smaller blocks and a motion field is produced so each smaller block has a distinct motion vector. The motion field uses the motion vectors of nearby points to the prediction unit as 'control points'. Affine prediction allows coding of motion different to translation with less need to use deeply split coding trees. A bi-prediction mode available to VVC performs a geometric blend of the two reference blocks along a selected axis, with angle and offset from the centre of the block signalled. This geometric partitioning mode ("GPM") allows larger coding units to be used along the boundary between two objects, with the geometry of the boundary coded for the coding unit as an angle and centre offset. Motion vector differences, instead of using cartesian (x, y) offset, may be coded as a direction (up/down/left/right) and a distance, with a set of power-of-two distances supported. The motion vector predictor is obtained from a neighbouring block ('merge mode') as if no offset is applied. The current block will share the same motion vector as the selected neighbouring block.

The samples are selected according to a motion vector 778 and reference picture index. The motion vector 778 and reference picture index applies to all colour channels and thus inter prediction is described primarily in terms of operation upon Pus rather than PBs. The decomposition of each CTU into one or more inter-predicted blocks is described with a single coding tree. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a pre-determined motion refinement process may be applied to generate dense motion estimates based on referenced sample blocks.

Having determined and selected the PB 720 and subtracted the PB 720 from the original sample block at the subtractor 722, a residual with lowest coding cost, represented as 724, is obtained and subjected to lossy compression. The lossy compression process comprises the steps of transformation, quantisation and entropy coding. A forward primary transform module 726 applies a forward transform to the difference 724, converting the difference 724 from the spatial domain to the frequency domain, and producing primary transform coefficients represented by an arrow 728. The largest primary transform size in one dimension is either a 32-point DCT-2 or a 64-point DCT-2 transform, configured by a 'sps_max_luma_transform_size_64_flag' in the sequence parameter set. If the CB being encoded is larger than the largest supported primary transform size expressed as a block size (e.g. 64×64 or 32×32), the primary transform 726 is applied in a tiled manner to transform all samples of the difference 724. Where a non-square CB is used, tiling is also performed using the largest available transform size in each dimension of the CB. For example, when a maximum transform size of thirty-two (32) is used, a 64×16 CB uses two 32×16 primary transforms arranged in a tiled manner. When a CB is larger in size than the maximum supported transform size, the CB is filled with TBs in a tiled manner. For example, a 128×128 CB with 64-pt transform maximum size is filled with four 64×64 TBs in a 2×2 arrangement. A 64×128 CB with a 32-pt transform maximum size is filled with eight 32×32 TBs in a 2×4 arrangement.

Application of the transform 726 results in multiple TBs for the CB. Where each application of the transform operates on a TB of the difference 724 larger than 32×32, e.g. 64×64, all resulting primary transform coefficients 728 outside of the upper-left 32×32 area of the TB are set to zero (i.e., discarded). The remaining primary transform coefficients 728 are passed to a quantiser module 734. The primary transform coefficients 728 are quantised according to a quantisation parameter 792 associated with the CB to produce primary transform coefficients 732. In addition to the quantisation parameter 792, the quantiser module 734 may also apply a 'scaling list' to allow non-uniform quantisation within the TB by further scaling residual coefficients according to their spatial position within the TB. The quantisation parameter 792 may differ for a luma CB versus each chroma CB. The primary transform coefficients 732 are passed to a forward secondary transform module 730 to produce transform coefficients represented by the arrow 736 by performing either a non-separable secondary transform (NSST) operation or bypassing the secondary transform. The forward primary transform 726 is typically separable, transforming a set of rows and then a set of columns of each TB. The forward primary transform module 726 uses either a type-II discrete cosine transform (DCT-2) in the horizontal and vertical directions, or bypass of the transform horizontally and vertically, or combinations of a type-VII discrete sine transform (DST-7) and a type-VIII discrete cosine transform (DCT-8) in either horizontal or vertical directions for luma TBs not exceeding 16 samples in width and height. Use of combinations of a DST-7 and DCT-8 is referred to as 'multi transform selection set' (MTS) in the VVC standard.

The forward secondary transform of the module 730 is generally a non-separable transform, which is only applied for the residual of intra-predicted CUs and may nonetheless also be bypassed. The forward secondary transform operates either on sixteen (16) samples (arranged as the upper-left 4×4 sub-block of the primary transform coefficients 728) or forty-eight (48) samples (arranged as three 4×4 sub-blocks in the upper-left 8×8 coefficients of the primary transform coefficients 728) to produce a set of secondary transform coefficients. The set of secondary transform coefficients may be fewer in number than the set of primary transform coefficients from which they are derived. Due to application of the secondary transform to only a set of coefficients adjacent to each other and including the DC coefficient, the secondary transform is referred to as a 'low frequency non-separable secondary transform' (LFNST). Such secondary transforms may be obtained through a training process and due to their non-separable nature and trained origin, exploit additional redundancy in the residual signal not able to be captured by separable transforms such as variants of DCT and DST. Moreover, when the LFNST is applied, all remaining coefficients in the TB are zero, both in the primary transform domain and the secondary transform domain.

The quantisation parameter 792 is constant for a given TB and thus results in a uniform scaling for the production of residual coefficients in the primary transform domain for a TB. The quantisation parameter 792 may vary periodically with a signalled 'delta quantisation parameter'. The delta quantisation parameter (delta QP) is signalled once for CUs contained within a given area, referred to as a 'quantisation group'. If a CU is larger than the quantisation group size, delta QP is signalled once with one of the TBs of the CU. That is, the delta QP is signalled by the entropy encoder 738 once for the first quantisation group of the CU and not signalled for any subsequent quantisation groups of the CU. A non-uniform scaling is also possible by application of a 'quantisation matrix', whereby the scaling factor applied for each residual coefficient is derived from a combination of the quantisation parameter 792 and the corresponding entry in a scaling matrix. The scaling matrix may have a size that is smaller than the size of the TB, and when applied to the TB a nearest neighbour approach is used to provide scaling values for each residual coefficient from a scaling matrix smaller in size than the TB size. The residual coefficients 736 are supplied to the entropy encoder 738 for encoding in the bitstream 614. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. The scan within each sub-block and the progression from one sub-block to the next typically follow a backward diagonal scan pattern. Additionally, the quantisation parameter 792 is encoded into the bitstream 614 using a delta QP syntax element, and a slice QP for the initial value in a given slice or subpicture and the secondary transform index 788 is encoded in the bitstream 614.

As described above, the video encoder 614 needs access to a frame representation corresponding to the decoded frame representation seen in the video decoder. Thus, the residual coefficients 736 are passed through an inverse secondary transform module 744, operating in accordance with the secondary transform index 788 to produce intermediate inverse transform coefficients, represented by an arrow 742. The intermediate inverse transform coefficients 742 are inverse quantised by a dequantiser module 640 according to the quantisation parameter 792 to produce inverse transform coefficients, represented by an arrow 746. A dequantiser module 740 may also perform an inverse non-uniform scaling of residual coefficients using a scaling list, corresponding to the forward scaling performed in the quantiser module 734. The inverse transform coefficients 746 are passed to an inverse primary transform module 748 to produce residual samples, represented by an arrow 750, of the TU. The inverse primary transform module 748 applies DCT-2 transforms horizontally and vertically, constrained by the maximum available transform size as described with reference to the forward primary transform module 726. The types of inverse transform performed by the inverse secondary transform module 744 correspond with the types of forward transform performed by the forward secondary transform module 730. The types of inverse transform performed by the inverse primary transform module 748 correspond with the types of primary transform performed by the primary transform module 726. A summation module 752 adds the residual samples 750 and the PU 720 to produce reconstructed samples (indicated by an arrow 754) of the CU.

The reconstructed samples 754 are passed to a reference sample cache 756 and an in-loop filters module 768. The reference sample cache 756, typically implemented using static RAM on an ASIC to avoid costly off-chip memory access, provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 756 supplies reference samples (represented by an arrow 758) to a reference sample filter 760. The sample filter 760 applies a smoothing operation to produce filtered reference samples (indicated by an arrow 762). The filtered reference samples 762 are used by the intra-frame prediction module 764 to produce an intra-predicted block of samples, represented by an arrow 766. For each candidate intra prediction mode the intra-frame prediction module 764 produces a block of samples, that is 766. The block of samples 766 is generated by the module 764 using techniques such as DC, planar or angular intra prediction. The block of samples 766 may also be produced using a matrix-multiplication approach with neighbouring reference sample as input and a matrix selected from a set of matrices by the video encoder 614, with the selected matrix signalled in the bitstream 614 using an index to identify which matrix of the set of matrices is to be used by the video decoder.

The in-loop filters module 768 applies several filtering stages to the reconstructed samples 754. The filtering stages include a 'deblocking filter' (DBF) which applies smoothing aligned to the CU boundaries to reduce artefacts resulting from discontinuities. Another filtering stage present in the in-loop filters module 768 is an 'adaptive loop filter' (ALF), which applies a Wiener-based adaptive filter to further reduce distortion. A further available filtering stage in the in-loop filters module 768 is a 'sample adaptive offset' (SAO) filter. The SAO filter operates by firstly classifying reconstructed samples into one or multiple categories and, according to the allocated category, applying an offset at the sample level.

Filtered samples, represented by an arrow 770, are output from the in-loop filters module 768. The filtered samples 770 are stored in a frame buffer 772. The frame buffer 772 typically has the capacity to store several (e.g., up to sixteen (16)) pictures and thus is stored in the memory 206. The frame buffer 772 is not typically stored using on-chip memory due to the large memory consumption required. As such, access to the frame buffer 772 is costly in terms of memory bandwidth. The frame buffer 772 provides reference frames (represented by an arrow 774) to a motion estimation module 776 and the motion compensation module 780. The reference frames 774 are output as the reconstructed frame 618 of the corresponding subpicture encoder module 600 (514, 532, 556, 572) and provided to the unpacker module 620. In the example of FIG. 7, the reconstructed frame is a result of operation of lossy VVC encoding, that is due to operation of the modules 726 to 748 and 752 to 754.

The motion estimation module 776 estimates a number of 'motion vectors' (indicated as 778), each being a Cartesian spatial offset from the location of the present CB, referencing a block in one of the reference frames in the frame buffer 772. A filtered block of reference samples (represented as 782) is produced for each motion vector. The filtered reference samples 782 form further candidate modes available for potential selection by the mode selector 786. Moreover, for a given CU, the PU 720 may be formed using one reference block ('uni-predicted') or may be formed using two reference blocks ('bi-predicted'). For the selected motion vector, the motion compensation module 780 produces the PB 720 in accordance with a filtering process supportive of sub-pixel accuracy in the motion vectors. As such, the motion estimation module 776 (which operates on many candidate motion vectors) may perform a simplified filtering process compared to that of the motion compensation module 780 (which operates on the selected candidate only) to achieve reduced computational complexity. When the video encoder 614 selects inter prediction for a CU the motion vector 778 is encoded into the bitstream 616.

Although the video encoder 614 of FIG. 7 is described with reference to versatile video coding (VVC), other video coding standards or implementations may also employ the processing stages of modules 710-790. The frame data 612 (and bitstream 616) may also be read from (or written to) memory 206, the hard disk drive 210, a CD-ROM, a Blu-ray Disk™ or other computer readable storage medium. Additionally, the frame data 612 (and bitstream 616) may be received from (or transmitted to) an external source, such as a server connected to the communications network 220 or a radio-frequency receiver. The communications network 220 may provide limited bandwidth, necessitating the use of rate control in the video encoder 120 to avoid saturating the network at times when the frame data 612 is difficult to compress.

The bitstream 616 may be constructed from one or more slices, representing spatial sections (collections of CTUs) of the frame data 612, produced by one or more instances of the video encoder 614, operating in a co-ordinated manner under control of the processor 205. The bitstream 616 may also contain one slice that corresponds to one subpicture to be output as a collection of subpictures forming one picture, each being independently encodable and independently decodable with respect to any of the other slices or subpictures in the picture. The ability to independently encode and decode any subpicture in the picture allows the affect of lossy compression on the packed feature maps or coefficients contained in any given subpicture to be taken into account in the PCA encoder 160 by using the lossy versions of the feature maps or coefficients in later stages of tensor compression.

Figure 8:
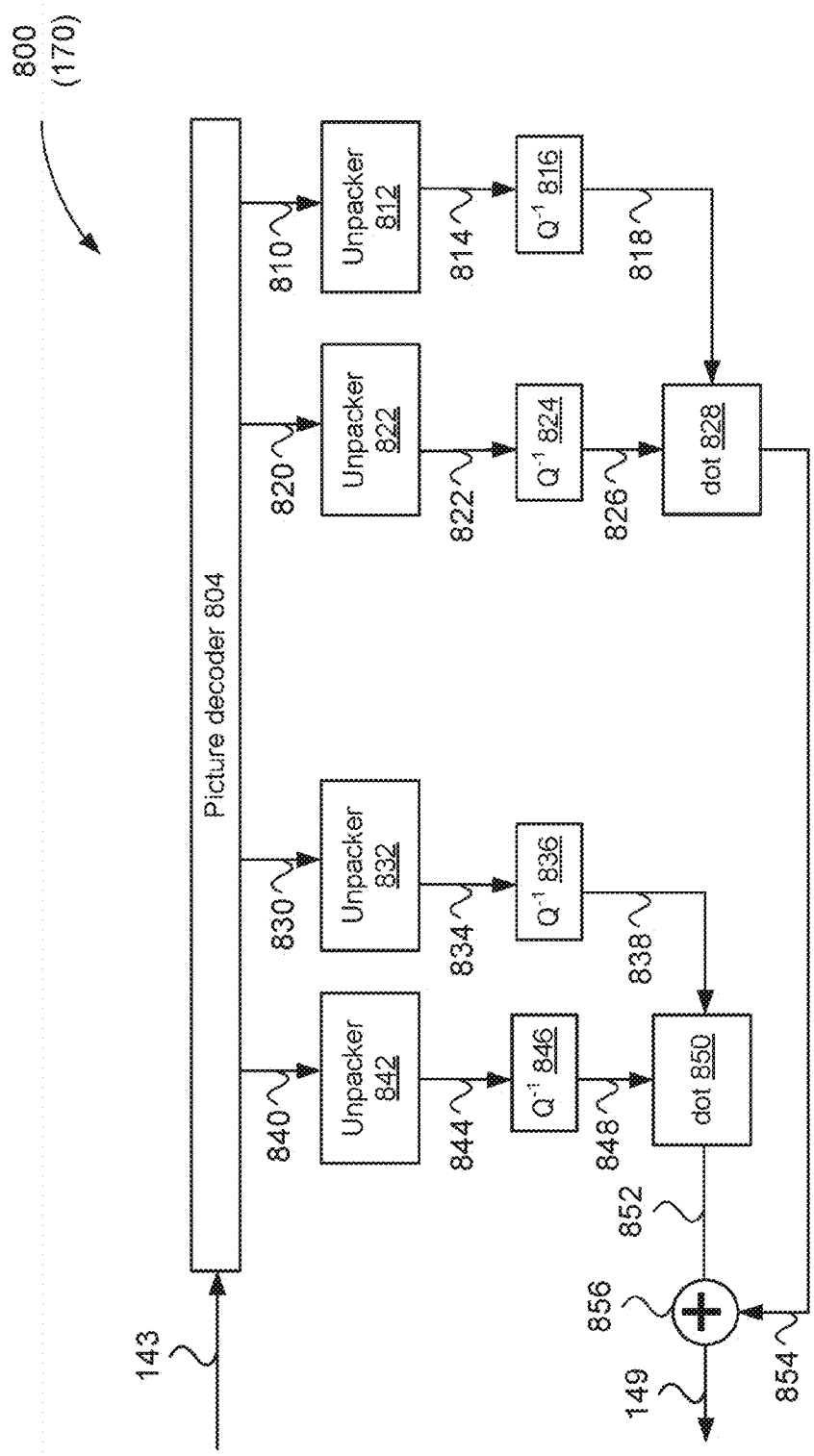
FIG. 8 is a schematic block diagram showing an inter-channel decorrelation-based tensor decoder as part of a distributed machine task system.

FIG. 8 is a schematic block diagram 800 showing an implementation of the inter-channel decorrelation-based tensor decoder 170 as part of a distributed machine task system 100. The video bitstream 143 is passed to a picture decoder 804, which implements a VVC video decoder and decodes a bitstream generated by the PCA encoder 160. The picture decoder 804 decodes subpictures present in the video bitstream 143, each subpicture corresponding to a different data type needed for reconstructing the tensor 149. Each decoded subpicture provides a unit of information for a decoded tensor, the units corresponding to one of the average tenors value 511, coefficients 526, basis vectors, 550 and coefficients 566. A mean feature subpicture 840 is output by the picture decoder 804 and passed to an unpacker 842. The unpacker 842 extracts an integer mean feature map 844 based on the width and height of the tensor 149. The integer mean feature map 844 is passed to an inverse quantiser 846 where conversion from sample domain to floating-point domain is performed, using a suitable quantisation range, for example obtained from the bitstream 143, resulting in a decoded mean feature map 848.

A mean coefficient subpicture 830 is also output by the picture decoder 804 and passed to an unpacker 832. The unpacker 832 extracts integer mean coefficients 834 based on the channel count of the tensor 149. The integer mean coefficients 834 are passed to an inverse quantiser 836. The inverse quantiser 836 converts from the mean coefficients 834 from the integer domain to the floating-point domain using a quantisation range obtained from the bitstream 143, to output floating-point mean coefficients 838. A dot product module 850 produces a mean feature map 852 of each channel of the tensor 149 by performing a dot product of the mean feature 848 with the respective coefficient among the mean coefficients 838. The inverse quantisers 846, 836, 824 and 816 are the inverse of the corresponding quantisation functions (512, 528, 552 and 568) used in the implementation 500 to encode the bitstream.

A subpicture 820 containing packed basis vectors that, prior to quantisation and lossy compression, were generated by the decomposition module 548 (e.g., performing PCA) is also output by the picture decoder 804 and passed to an unpacker 822. The unpacker 822 extracts integer basis vectors 823 as a series of feature maps placed in a non-overlapping manner in the subpicture 820. The integer basis vectors 823 are passed to an inverse quantiser 824. The inverse quantiser 824 constructs floating-point basis vectors 826, applying a quantisation range obtained from the bitstream 143.

A subpicture 810 containing coefficients, with one coefficient per basis vector per feature map of the tensor 143, is also output by the picture decoder 804 and passed to an unpacker 812. The unpacker 812 extracts each coefficient from the subpicture 810 based on the dimensionality of the tensor 149. One coefficient is needed per basis vector per feature map or channel and represents the contribution of each basis vector in reconstructing a given feature map or channel, collectively forming integer coefficients 814 output from the unpacker 812. An inverse quantiser 816 converts the integer coefficients 814 from the integer domain to the floating-point domain according to a quantisation range obtained from the bitstream 143, outputting floating-point coefficients 818. A zero-centred tensor 854 is produced by a dot product module 828 that performs a dot product on the coefficients 818 and the basis vectors 826. A summation module 856 adds the zero-centred tensor 854 with the mean feature map 848 to produce the tensor 149 as output from the PCA decoder 170. The flow of operations in the PCA decoder 170 restores the dimensionality of a compressed tensor back to the original dimensionality, allowing the tensor 149 to be passed to the CNN head 150 for performance of a given machine task.

Figure 12A:
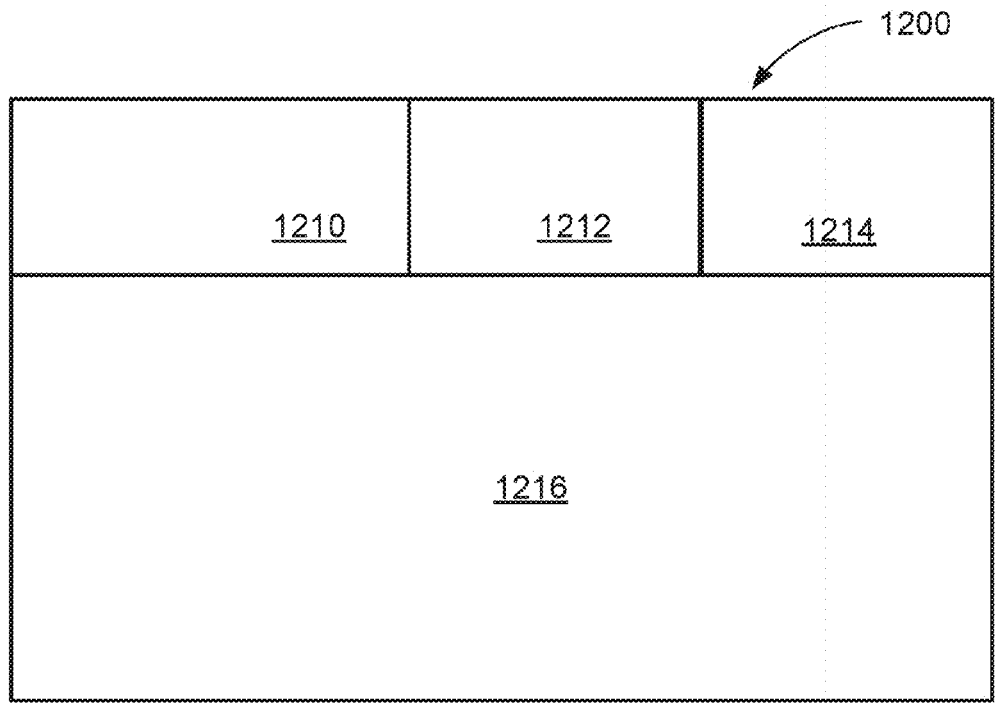
FIGS. 12A & 12B are schematic block diagrams showing an arrangement of subpictures for holding inter-channel decorrelated tensor data.
Figure 12B:
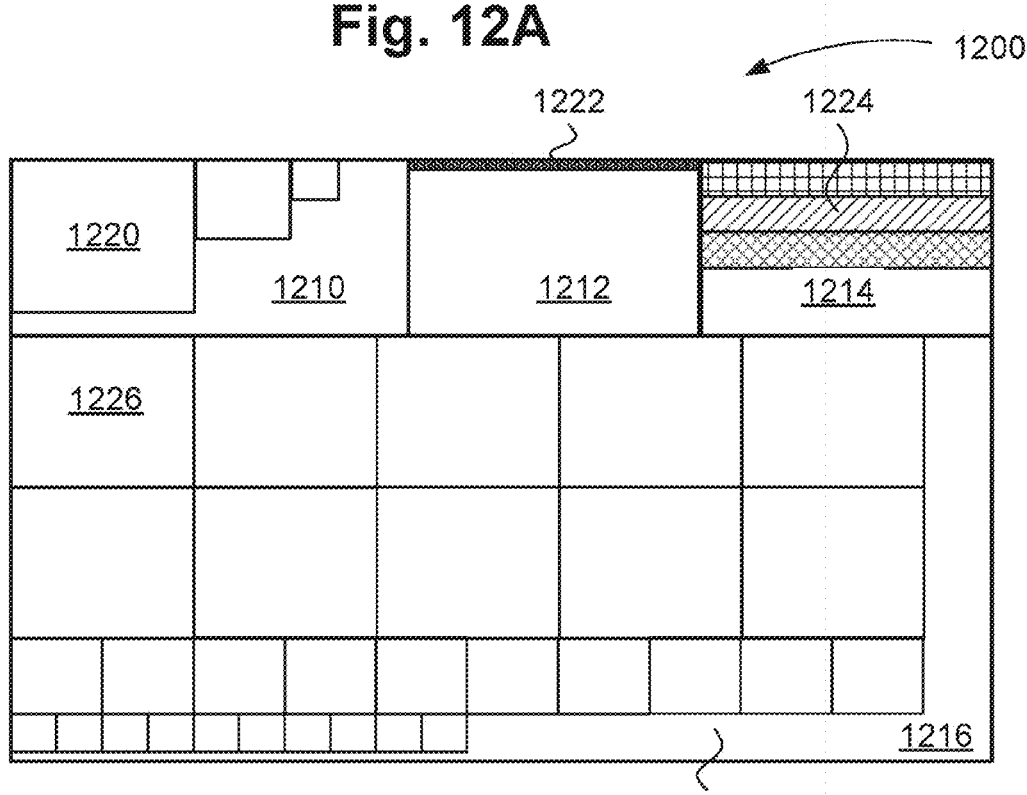

As described hereafter in relation to FIGS. 12A and 12B, information in each decoded picture 840, 830, 820 and 810 is arranged in a plurality of two-dimensional arrays of samples. Each of the decoded pictures 840, 830, 820 and 810 are independently decodable in the example described in relation to FIG. 8 above. In other implementations, depending on how outputs of the quantisers 512, 528, 552 and 568 are packed and encoded into bitstreams, at least one of the decoded pictures 840, 830, 820 and 810 is independently decodable with respect to the others. For example, independent and/or concurrent decoding of the decoded pictures 840, 830, 820, and 810 may be performed to facilitate operation at higher frame rates than achievable by a single decoder sequentially decoding decoded pictures 840, 830, 820, and 810. For example, when the destination device 140 is implemented in servers in the cloud, decoding performance may benefit from being distributed over multiple cores in the processor 205, especially when hardware modules are not available to offload more computationally demanding operations.

The reduced-dimensionality representation of the tensor 149 in the form of various basis vectors (820) and associated coefficients (830 and 810) enables a reduced area when packing the vectors and coefficients on a channel-wise basis into a picture or subpicture. A reduced area of packed data results in a more efficient compressed representation compared to attempting to directly compressing a frame containing packed feature maps or channels of the tensor 115.

Figure 9:
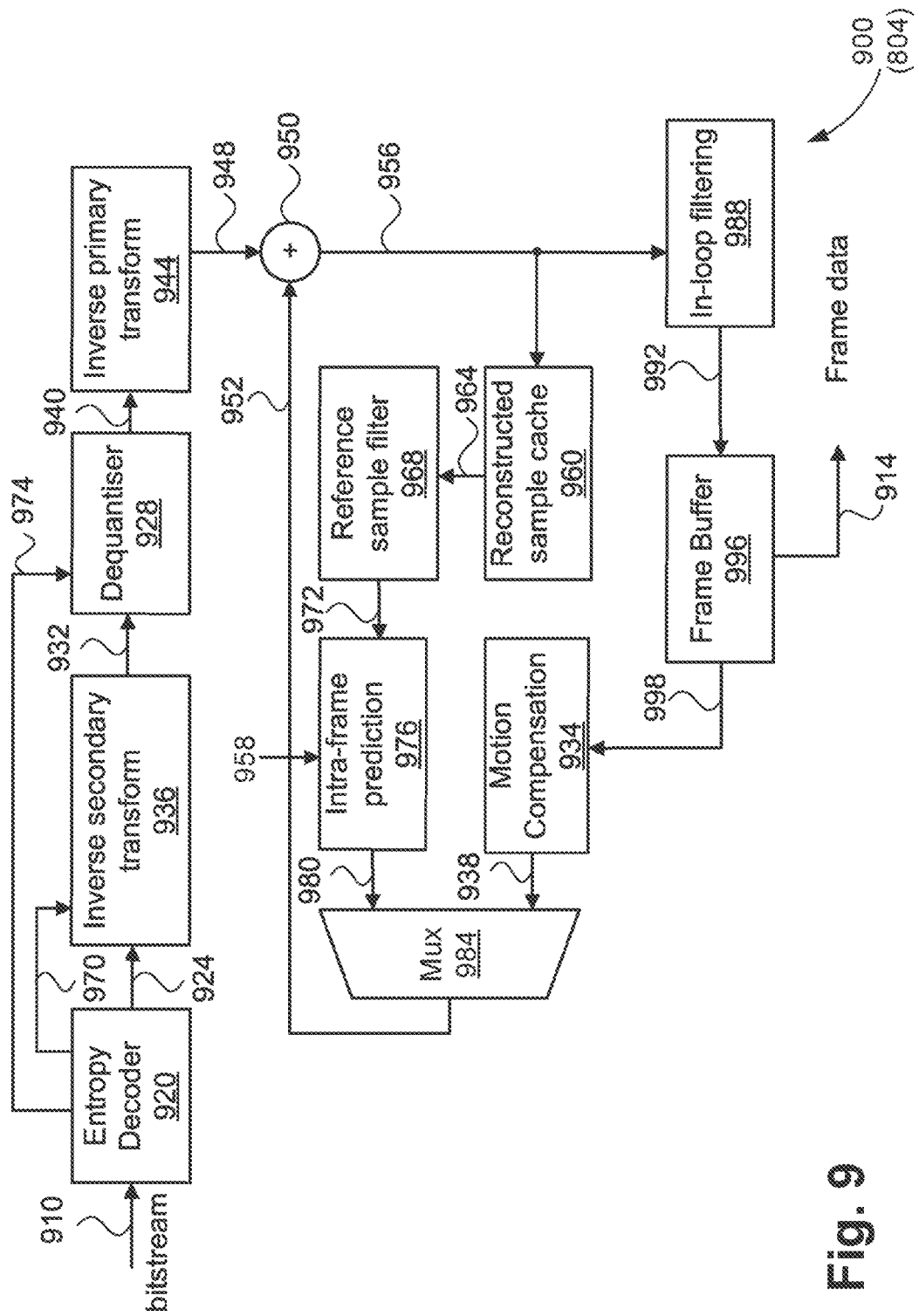
FIG. 9 is a schematic block diagram showing functional modules of a video decoder.

An example implementation 900 of the picture decoder 804, also referred to as a video decoder, is shown in FIG. 9. Although the video decoder 804 of FIG. 9 is an example of a versatile video coding (VVC) video decoding pipeline, other video codecs may also be used to perform the processing stages described herein, for example HEVC and the like. As shown in FIG. 9, a bitstream 910 (corresponding to the bitstream 143) is input to the video decoder 804. The bitstream 143 may be read from memory 206, the hard disk drive 210, a CD-ROM, a Blu-ray Disk™ or other non-transitory computer readable storage medium and provided as the bitstream 910 to the implementation 900. Alternatively, the bitstream 910 may be received from an external source such as a server connected to the communications network 220 or a radio-frequency receiver. The bitstream 143 contains encoded syntax elements representing the captured frame data to be decoded. Where subpictures are independently decoded, portions of the bitstream 143 corresponding to each subpicture may be supplied to separate instances of the implementation 900. Separate instances of the implementation 910 for each subpicture allows parallel decoding of subpictures for improved throughput.

The bitstream 910 is input to an entropy decoder module 920. The entropy decoder module 920 extracts syntax elements from the bitstream 910 by decoding sequences of 'bins' and passes the values of the syntax elements to other modules in the video decoder 804. The entropy decoder module 920 uses variable-length and fixed length decoding to decode SPS, PPS or slice header an arithmetic decoding engine to decode syntax elements of the slice data as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin. The process of decoding bins forms a sequential feedback loop, thus each slice may be decoded in the slice's entirety by a given entropy decoder 920 instance. A single (or few) high-performing entropy decoder 920 instances may decode all slices or subpictures for a frame or picture from the bitstream 910 multiple lower-performing entropy decoder 920 instances may concurrently decode the slices for a frame from the bitstream 910.

The entropy decoder module 920 applies an arithmetic coding algorithm, for example 'context adaptive binary arithmetic coding' (CABAC), to decode syntax elements from the bitstream 910. The decoded syntax elements are used to reconstruct parameters within the video decoder 804. Parameters include residual coefficients (represented by an arrow 924), a quantisation parameter 974, a secondary transform index 970, and mode selection information such as an intra prediction mode (represented by an arrow 958). The mode selection information also includes information such as motion vectors, and the partitioning of each CTU into one or more CBs. Parameters are used to generate PBs, typically in combination with sample data from previously decoded CBs.

The residual coefficients 924 are passed to an inverse secondary transform module 936 where either a secondary transform is applied or no operation is performed (bypass) according to a secondary transform index. The inverse secondary transform module 936 produces reconstructed transform coefficients 932, that is primary transform domain coefficients, from secondary transform domain coefficients. The reconstructed transform coefficients 932 are input to a dequantiser module 928. The dequantiser module 928 performs inverse quantisation (or 'scaling') on the residual coefficients 932, that is, in the primary transform coefficient domain, to create reconstructed intermediate transform coefficients, represented by an arrow 940, according to the quantisation parameter 974. The dequantiser module 928 may also apply a scaling matrix to provide non-uniform dequantization within the TB, corresponding to operation of the dequantiser module 740. Should use of a non-uniform inverse quantisation matrix be indicated in the bitstream 143, the video decoder 804 reads a quantisation matrix from the bitstream 143 as a sequence of scaling factors and arranges the scaling factors into a matrix. The inverse scaling uses the quantisation matrix in combination with the quantisation parameter to create the reconstructed intermediate transform coefficients 940.

The reconstructed transform coefficients 940 are passed to an inverse primary transform module 944. The module 944 transforms the coefficients 940 from the frequency domain back to the spatial domain. The inverse primary transform module 944 applies inverse DCT-2 transforms horizontally and vertically, constrained by the maximum available transform size as described with reference to the forward primary transform module 726. The result of operation of the module 944 is a block of residual samples, represented by an arrow 948. The block of residual samples 948 is equal in size to the corresponding CB. The residual samples 948 are supplied to a summation module 950.

At the summation module 950 the residual samples 948 are added to a decoded PB (represented as 952) to produce a block of reconstructed samples, represented by an arrow 956. The reconstructed samples 956 are supplied to a reconstructed sample cache 960 and an in-loop filtering module 988. The in-loop filtering module 988 produces reconstructed blocks of frame samples, represented as 992. The frame samples 992 are written to a frame buffer 996. The frame buffer 996 outputs image or video frames 914 corresponding to the tensors 149 of FIG. 1.

The reconstructed sample cache 960 operates similarly to the reconstructed sample cache 756 of the video encoder 614. The reconstructed sample cache 960 provides storage for reconstructed samples needed to intra predict subsequent CBs without the memory 206 (e.g., by using the data 232 instead, which is typically on-chip memory). Reference samples, represented by an arrow 964, are obtained from the reconstructed sample cache 960 and supplied to a reference sample filter 968 to produce filtered reference samples indicated by arrow 972. The filtered reference samples 972 are supplied to an intra-frame prediction module 976. The module 976 produces a block of intra-predicted samples, represented by an arrow 980, in accordance with the intra prediction mode parameter 958 signalled in the bitstream 910 and decoded by the entropy decoder 920. The intra prediction module 976 supports the modes of the encoder-side module 764, including IBC and MIP. The block of samples 980 is generated using modes such as DC, planar or angular intra prediction.

When the prediction mode of a CB is indicated to use intra prediction in the bitstream 143, the intra-predicted samples 980 form the decoded PB 952 via a multiplexor module 984. Intra prediction produces a prediction block (PB) of samples, which is a block in one colour component, derived using 'neighbouring samples' in the same colour component. The neighbouring samples are samples adjacent to the current block and by virtue of being preceding in the block decoding order have already been reconstructed. Where luma and chroma blocks are collocated, the luma and chroma blocks may use different intra prediction modes. However, the two chroma CBs share the same intra prediction mode.

When the prediction mode of the CB is indicated to be inter prediction in the bitstream 910, a motion compensation module 934 produces a block of inter-predicted samples, represented as 938. The block of inter-predicted samples 938 are produced using a motion vector, decoded from the bitstream 143 by the entropy decoder 920, and reference frame index to select and filter a block of samples 998 from the frame buffer 996. The block of samples 998 is obtained from a previously decoded frame stored in the frame buffer 996. For bi-prediction, two blocks of samples are produced and blended together to produce samples for the decoded PB 952. The frame buffer 996 is populated with filtered block data 992 from an in-loop filtering module 988. As with the in-loop filtering module 768 of the video encoder 614, the in-loop filtering module 988 applies any of the DBF, the ALF and SAO filtering operations. Generally, the motion vector is applied to both the luma and chroma channels, although the filtering processes for sub-sample interpolation in the luma and chroma channel are different.

Not shown in FIGS. 7 and 9 is a module for preprocessing video prior to encoding and postprocessing video after decoding to shift sample values such that a more uniform usage of the range of sample values within each chroma channel is achieved. A multi-segment linear model is derived in the video encoder 614 and signalled in the bitstream for use by the video decoder 804 to undo the sample shifting. The linear-model chroma scaling (LMCS) tool provides compression benefit for particular colour spaces and content that have some nonuniformity, especially utilisation of a limited range, in their utilisation of the sample space that may result in higher quality loss from application of quantisation.

Figure 10A:
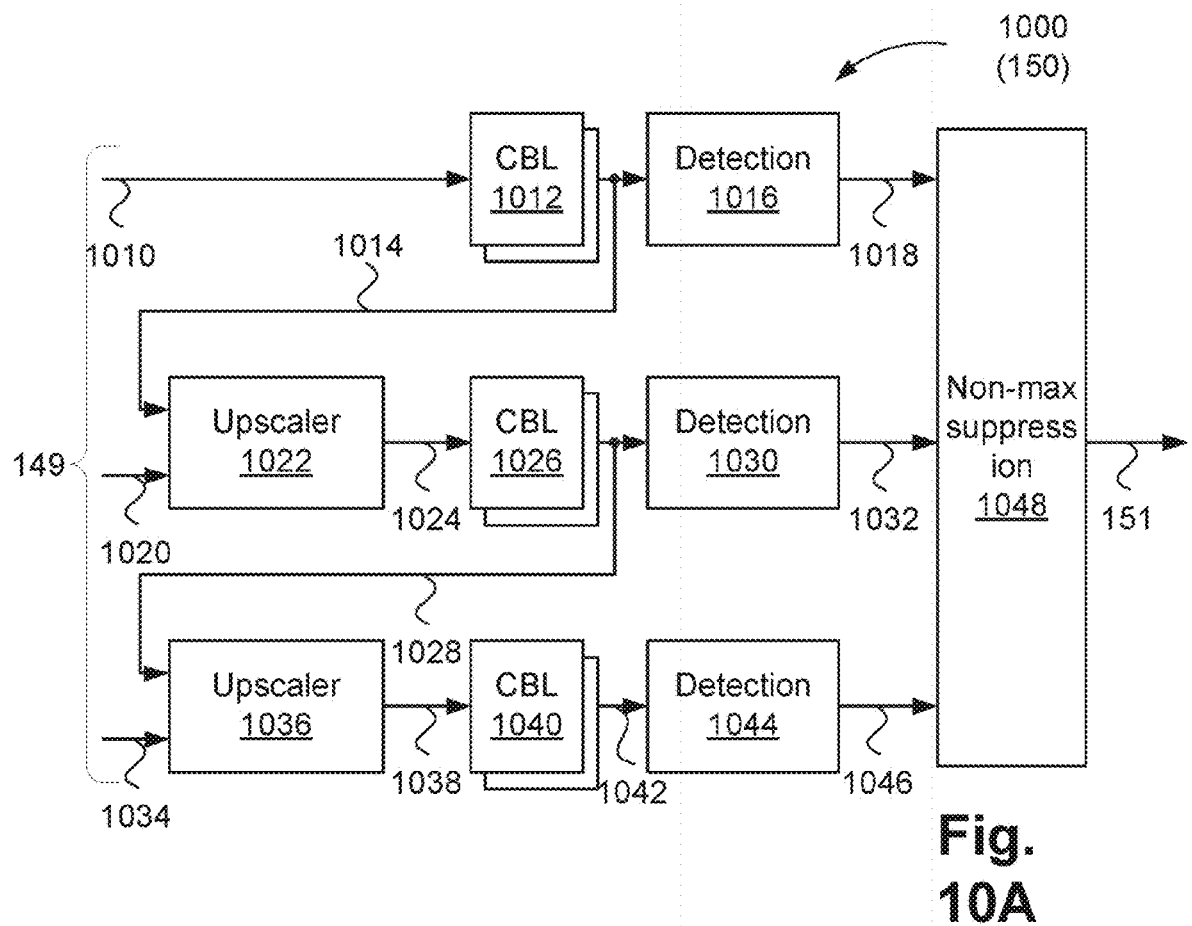
FIG. 10A is a schematic block diagrams showing a head portion of a CNN.

FIG. 10A is a schematic block diagrams showing an example implementation 1000 of the head portion 150 of a CNN for object detection, corresponding to a portion of a "YOLOv3" network excluding the "DarkNet-53" backbone portion. The implementation 1000 can be used when the CNN backbone is implemented as in FIG. 3A for example. Depending on the task to be performed in the destination device 140, different networks may be substituted for the CNN head 150. Incoming tensors 149 are separated into the tensor of each layer (i.e., tensors 1010, 1020, and 1034). The tensor 1010 is passed to a CBL module 1012 to produce tensor 1014. The tensor 1014 is passed to a detection module 1016 and an upscaler module 1022. The detection module outputs bounding boxes 1018, in the form of a detection tensor. The bounding boxes 1018 are passed to a non-maximum suppression (NMS) module 1048.

Figure 10B:
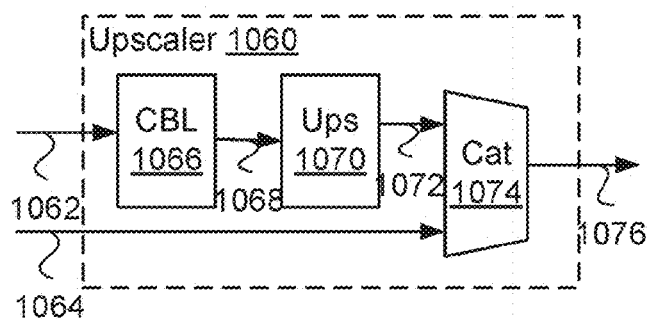
FIG. 10B is a schematic block diagram showing an upscaler module of FIG. 10A.

To produce bounding boxes addressing co-ordinates in the original video data 113, prior to resizing for the backbone portion of the network 114, scaling by the original video width and height is performed at the upscaler module 1022. The upscaler module 1022 receives the tensor 1014 and the tensor 1020 and produces an upscaled tensor 1024, which is passed to a CBL module 1026. The CBL module 1026 produces a tensor 1028 as output. The tensor 1028 is passed to a detection module 1030 and an upscaler module 1036. The detection module 1030 produces a detection tensor 1032, which is supplied to the NMS module 1048. The upscaler module 1036 is another instance of the module 1020. The upscaler module 1036 receives the tensor 1028 and the tensor 1034 and outputs an upscaled tensor 1038. The upscaled tensor 1038 is passed to a CBL module 1040, which outputs a tensor 1042 to a detection module 1044. The CBL modules 1012, 1026, and 1040 each contain a concatenation of five CBL modules, for example the CBL model 360 shown in FIG. 3D. The upscaler modules 1022 and 1036 are each instances of an upscaler module 1060 as shown in FIG. 10B. The module 1048 receives the tensors 1018, 1032 and 1036 and outputs the task result 151.

As shown in FIG. 10B, the upscaler module 1060 accepts a tensor 1062 (for example the tensor 1014 of FIG. 10A) as an input. The tensor 1062 is passed to a CBL module 1066 to produce a tensor 1068. The tensor 1068 is passed to an upsampler 1070 to produce an upsampled tensor 1072. A concatenation module 1074 produces a tensor 1076 by concatenating the upsampled tensor 1072 with a second input tensor 1064 (for example the tensor 1020 input to the upscaler 1022 in FIG. 10A).

Figure 10C:
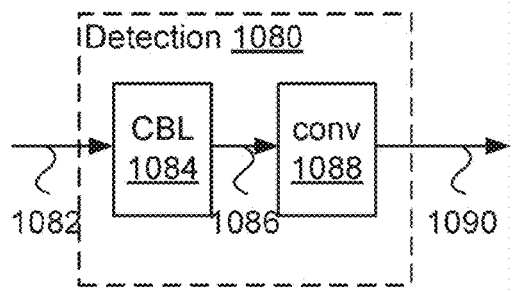
FIG. 10C is a schematic block diagram showing a detection module of FIG. 10A.

The detection modules 1016, 1030, and 1044 are instances of a detection module 1080 as shown in FIG. 10C. The detection module 1080 receives a tensor 1082. The tensor 1082 is input to a CBL module 1084. The CBL module 1084 generates a tensor 1086. The tensor 1086 is passed to a convolution module 1088, which implements a detection kernel. In some arrangements, the detection kernel applies a 1×1 kernel to produce the output on feature maps at each of the three layers of the tensor. The detection kernel is 1×1×(B×(5+C)), where B is the number of bounding boxes a particular cell can predict, typically three (3), and C is the number of classes, which may be eighty (80), resulting in a kernel size of two-hundred and fifty five (255) detection attributes (i.e. tensor 1090). The constant "5" represents four boundary box attributes (box centre x, y and size scale x, y) and one object confidence level ("objectness"). The result of a detection kernel has the same spatial dimensions as the input feature map, but the depth of the output corresponds to the detection attributes. The detection kernel is applied at each layer, typically three layers, resulting in a large number of candidate bounding boxes. A process of non-maximum suppression is applied by the NMS module 1048 to the resulting bounding boxes to discard redundant boxes, such as overlapping predictions at similar scale, resulting in a final set of bounding boxes as output for object detection.

Figure 11:
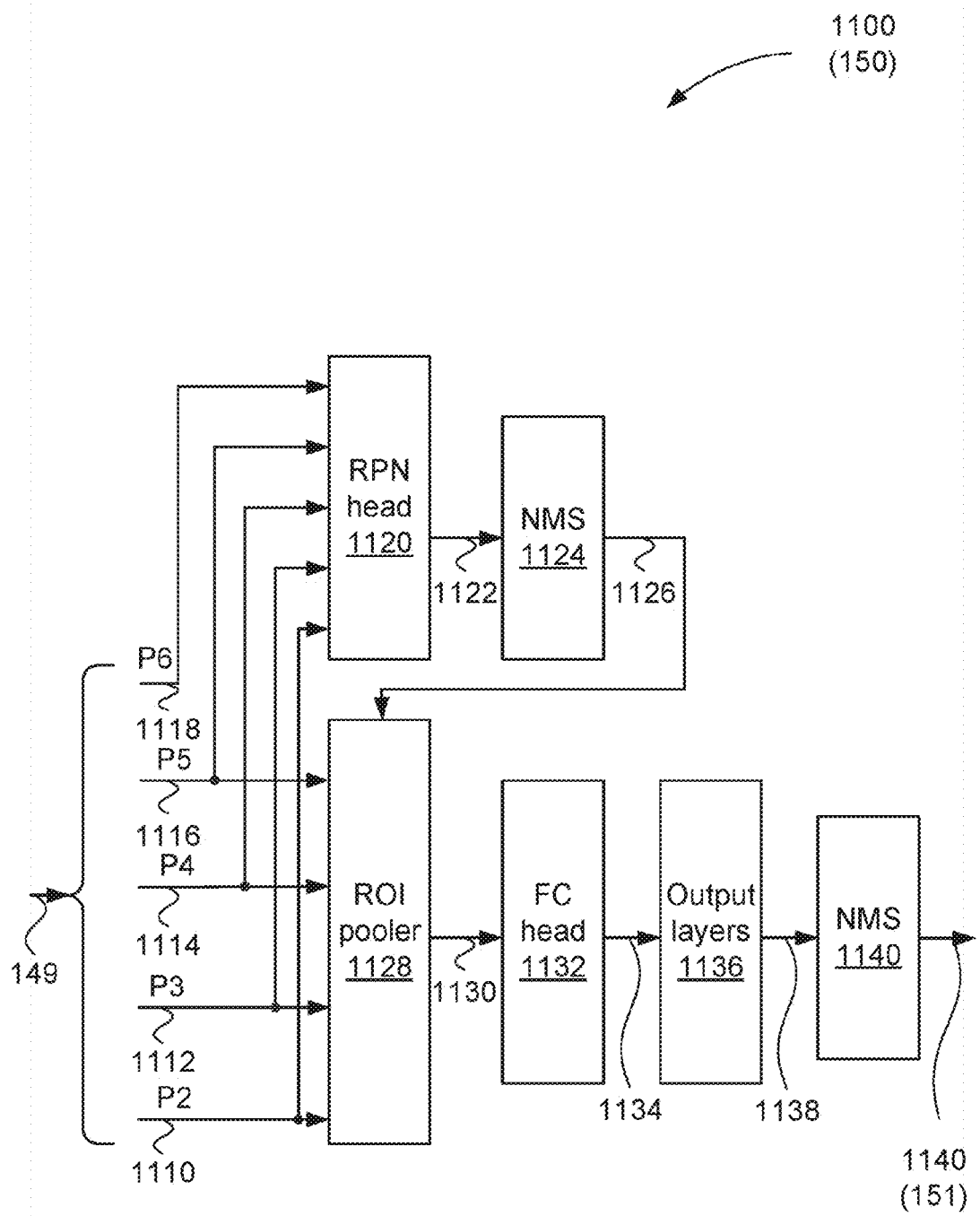
FIG. 11 is a schematic block diagram showing an alternative head portion of a CNN.

FIG. 11 is a schematic block diagram showing an alternative head portion 1100 of a CNN. The head portion 1100 can be implemented as the CNN head 150 where the CNN backbone 114 is implemented as the backbone 400 for example. The head portion 1100 forms part of an overall network known as 'faster RCNN' and includes a feature network (i.e., backbone portion 400), a region proposal network, and a detection network. Input to the head portion 1100 are the tensors 149, which include the P2-P6 layer tensors 1110, 1112, 1114, 1116, and 1118. The P2-P6 layer tensors 1110, 1112, 1114, 1116, and 1118 correspond to the P2 to P6 outputs 477, 475, 473, 471 and 429 of FIG. 4. The P2-P6 tensors 1110, 1112, 1114, 1116, and 1118 are input to a region proposal network (RPN) head module 1120. The RPN head module 1120 performs a convolution on the input tensors, generating an intermediate tensor. The intermediate tensor is fed into two subsequent sibling layers, (i) one for classifications and (ii) one for bounding box, or 'region of interest' (ROI), regression. A resultant output is classification and bounding boxes 1122. The classification and bounding boxes 1122 are passed to an NMS module 1124. The NMS module 1124 prunes out redundant bounding boxes by removing overlapping boxes with a lower score to produce pruned bounding boxes 1126. The bounding boxes 1126 are input to a region of interest (ROI) pooler 1128. The ROI pooler 1128 uses some of the layer tensors of the tensor 149 (described further hereafter) and the bounding boxes 1126 to produce fixed-size feature maps from various input size maps using max pooling operations. In the max pooling operations a subsampling takes the maximum value in each group of input values to produce one output value in the output tensor.

In an arrangement of the CNN backbone 400 and the CNN head 1100, the 'P6' layer tensor 429 is omitted from the output tensors 115 (received as tensors 149). In arrangements where the P6 tensor is omitted, the CNN head 1100 produces the P6 input tensor 1118 by performing a 'Maxpool' operation with stride equal to two on the P5 tensor 1116. Since the P6 layer can be reconstructed from the P5 layer, there is no need to separately encode and decode the P6 layer as an explicit FPN layer in the PCA encoder 160 an the PCA decoder 170.

Input to the ROI pooler 1128 are the P2-P5 feature maps 1110, 1112, 1114, and 1116, and region of interest proposals 1126. Each proposal (ROI) from 1126 is associated with a portion of the feature maps (1110-1116) to produce a fixed-size map. The fixed-size map is of a size independent of the underlying portion of the feature map 1110-1116. One of the feature maps 1110-1116 is selected such that the resulting cropped map has sufficient detail, for example, according to the following rule: floor(4+log 2(sqrt(box_area)/224)), where 224 is the canonical box size. The ROI pooler 1128 operates to crop incoming feature maps according to the proposals 1126 producing a tensor 1130.

The tensor 1130 is fed into a fully connected (FC) neural network head 1132. The FC head 1132 performs two fully connected layers to produce class score and bounding box predictor delta tensor 1134. The class score is generally an 80-element tensor, each element corresponding to a prediction score for the corresponding object category. The bounding box prediction deltas tensor is a 80×4=320 element tensor, containing bounding boxes for the corresponding object categories. Final processing is performed by an output layers module 1136, receiving the tensor 1134 and performing a filtering operation to produce a filtered tensor 1138. Low-scoring (low classification) objects are removed from further consideration. A non-maximum suppression module 1140 receives the filtered tensor 1138 and removes overlapping bounding boxes by removing the overlapped box with a lower classification score, resulting in an inference output tensor 1140, corresponding to the tensor 151.

FIGS. 12A and 12B are schematic block diagrams showing a division of a picture 1200 into subpictures 1210, 1212, 1214, and 1216, as implemented by the subpicture bitstream combiner 580 for example. Each subpicture is packed by a packer 610 of the corresponding one of encoders 514, 532, 556 and 572. Each subpicture includes information arranged in a two-dimensional array of samples. Referring to FIG. 12B, subpicture 1210 holds mean feature maps, such as a mean feature map 1220 for a tensor in the tensors of a FPN. The mean feature map 1220 corresponds to bitstream 515 of the subpicture encoder 514 in the arrangement of FIG. 5. Subpicture 1212 holds mean coefficients 1222 corresponding to 533 of FIG. 5. The mean coefficients 1222 are arranged in rows of values, with one row per coded layer or FPN layer and one value per channel of the corresponding tensor. The number and dimensionality of coded layers may differ from that of the FPN layers based on tensor resampling and/or concatenation, as described with reference to FIGS. 18A, 18B, 19, and 20. Subpicture 1216 holds basis vectors, corresponding to 557 of FIG. 5. In the example of FIG. 12B the basis vectors include basis vector 1226 amongst others, with the basis vectors packed into the area of the subpicture 1216 in a non-overlapping manner. Basis vectors may be packed adjacently or may include spacing of, for example, one or two samples between each set of basis vectors. Basis vectors for each coded layer or FPN layer are packed into the subpicture 1216. Area in the picture 1200 that is not used to store any data, such as 1208, may be occupied by sample values corresponding to the value '0' after application of inverse quantisation to convert from sample values back to the floating-point domain. Similarly, area in the subpictures 1210, 1212, 1214 and 1216 that is not used to store any data, may be occupied by sample values corresponding to the value '0' after application of inverse quantisation to convert from sample values back to the floating-point domain. The subpicture 1214 holds coefficients corresponding to 572 of FIG. 5, with one coefficient for each basis vector for each channel in a tensor in the tensors of the FPN. For example, with 256 channels in a tensor, 25 basis vectors, coefficients for one tensor are arranged as a 256×25 sample array.

Where multiple tensors are encoded in the picture 1200, the corresponding sample arrays are stacked in the subpicture 1214. As quantised feature maps are two-dimensional arrays of samples and coefficients are also mapped into one- or two-dimensional arrays of samples, use of a monochrome format for the picture 1200 is sufficient. When the CNN backbone 114 has produced tensors 115 for a frame 113, the PCA encoder 160 can determine the sizes of the subpictures 1210, 1212, 1214, and 1216 based on the dimensionality of the tensors 115. Subpictures 1210, 1212, and 1216 can be specified in width and height as an integer number of CTUs, i.e., in multiples of 128 luma samples. The width of subpicture 1216 is equal to the sum of the widths of subpictures 1210, 1212, and 1214, which are arranged horizontally. The height of subpicture 1216, placed below subpictures 1210, 1212, and 1216, is set to provide sufficient area for the packed basis vectors, e.g. basis vector 1226.

In the example of FIGS. 12A and 12B, the subpictures 1210, 1212, 1214, corresponding to the quantised coefficients 513, 530, and 568 respectively, are arranged horizontally, defining the width of the picture 1200. The subpicture 1216, corresponding to the quantised coefficients 554, is located below the first, second, and third units, spanning the width of the subpictures 1210, 1212, 1214 and extending to the bottom of the picture 1200. In another implementation, the quantised coefficients can be arranged in format other than subpictures. For example, for VVC or HEVC the quantised coefficients may be arranged or packed as slices or tiles. In yet other implementations, the quantised coefficients may be arranged differently, depending on factors such as encoding type (e.g. VVC or HEVC) and expected data characteristics. For example, quantised coefficients may be arranged in the scan order of a small block with a transform skip applied, so that residual coding is applied to the ordered set of quantised coefficients when transforms are not used. For example, when the quantised coefficients are compressed using HEVC, transform skip may be applied to 4×4 blocks and quantised coefficients may be arranged in a diagonal scan pattern in 4×4 blocks to exploit residual coding without application of a transform to the 4×4 block. Where the number of basis vectors are 16 or fewer, quantised coefficients for each feature map may be stored in separate 4×4 blocks. Within each 4×4 block, compression efficiency of the quantised coefficients benefits from application of adaptive Rice parameter coding within the 4×4 block. Instead of separate subpictures, a single picture could be used in other implementations with separate slices corresponding to each set of quantised coefficients or each subpicture could be arranged differently with the picture 1200.

In an arrangement of the picture 1200, packing of coefficients 1222 into subpicture 1212 modifies the array from a N×1 array, where N is the number of channels, to a W×H array, where WXH is equal to N, and are chosen to achieve adjust an aspect ratio of the subpicture to be as close to a square (1:1) or rectangle such as 2:1 ratio as possible, but avoid the extremely elongated ratio of N×1. Aspect ratios closer to a square result in fewer samples adjacent to the edge of the packed coefficient samples, that are not used by the unpacker but still are coded with relatively high fidelity and hence contribute to residual coding cost without having any benefit on tensor reconstruction.

In another arrangement of the picture 1200, packing of coefficients 1222 or 1224 into subpicture 1212 or 1214 is performed such that each coefficient is packed into more than one sample. For example, a coefficient may be packed into a 2×2 set of samples by the packer 610. The unpackers 620 or 832 or 812 read the 2×2 set of samples and perform a filtering operation to recover the coefficient. Packing into more than one sample provides a mechanism to compensate for error introduced into coefficient values due to the use of lossy coding in the video encoder 614. Other arrangements of sets of samples are also possible, including as 2×4, 4×2, 4×4.

Figure 13:
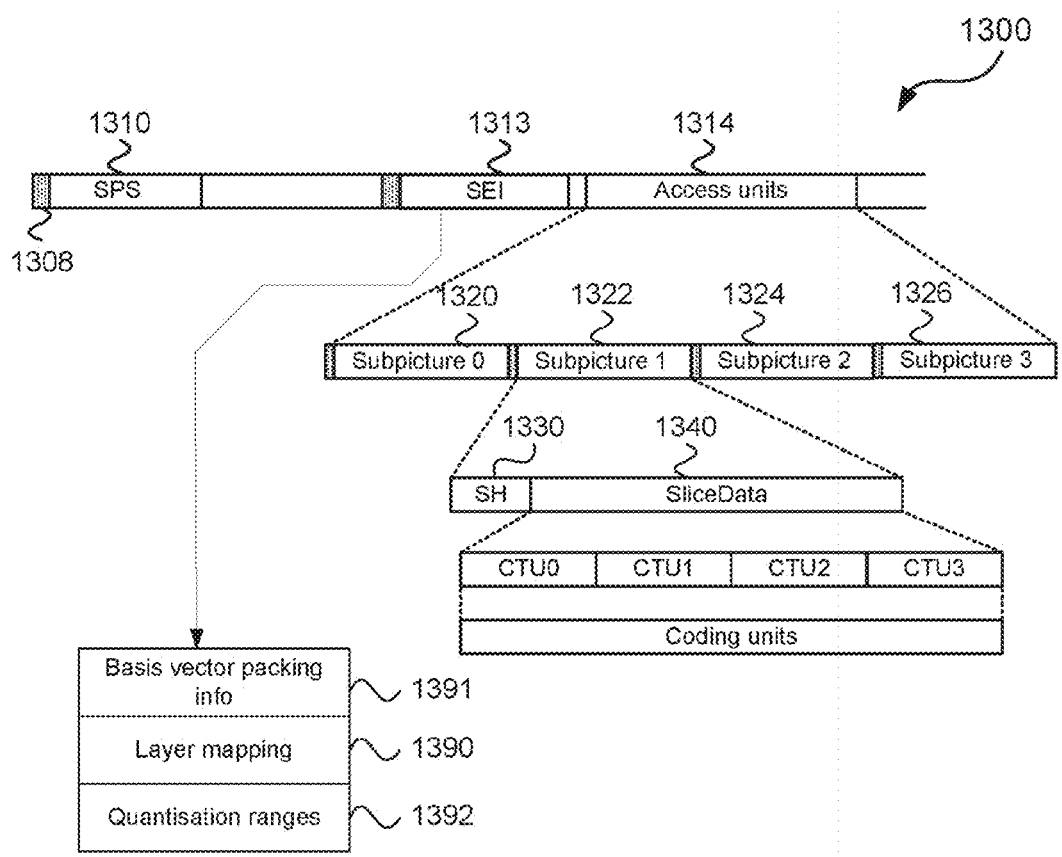
FIG. 13 is a schematic block diagram showing a bitstream holding encoded inter-channel decorrelated feature maps and associated metadata.

FIG. 13 is a schematic block diagram showing a bitstream 1300 holding encoded packed feature maps and associated metadata. The bitstream 1300 corresponds to the bitstream 121 produced by the PCA encoder 160 or the bitstream 143 decoded by the PCA decoder 170. The bitstream 1300 contains groups of syntax prefaced by a 'network abstraction layer' unit header. For example, a NAL unit header 1308 precedes a sequence parameter set (SPS) 1310. The SPS 1310 may include a 'profile level tier' (PLT) unit of syntax which specifies the profile (sets of coding tools) and level and tier (jointly specifying the operating point, e.g., in terms of maximum sample rate and compressed bit rate). The PLT unit of syntax may include a 'general constraint info' (GCI) unit of syntax which further constrains the set of available tools compared to the selected profile. The SPS 1310 specifies the layout of the picture 1200, including the positions and sizes of subpictures 1210, 1212, 1214, and 1216. The GCI includes a set of flags with each flag constraining a particular coding tool to not be used in the bitstream 1300. The PLT may signal a specific set of tools may be used in the bitstream 1300, the specific set of tools known as a 'profile'. An example of a profile is "Main 10", offering 8- to 10-bit video with either a 4:0:0 or a 4:2:0 chroma format and targeting widespread deployment. The GCI may indicate a further constraint on the set of tools of a profile into a subset of the tools, known as a 'subprofile'. The PCA encoder 160, in encoding feature maps packed into frames (i.e., operating in accordance with FIG. 5), certain tools of the VVC standard do not provide compression benefit. Tools that do not provide compression benefit for packed feature maps do not need to be tried by the video encoder 614 and may be signalled in the GCI as not being used in the bitstream 1300. The SPS 1310 also indicates the chroma format, the bit depth, the resolution of the frame data represented by the bitstream 1300.

The packing format used by the PCA encoder 160 may be encoded in an SEI message 1313, using an index to select one feature packing format from an enumeration of all available feature packing formats. The particular CNN backbone that was used to produce the feature maps may also be indicated in the SEI message 1313 using an index to select one CNN backbone from an enumeration of a set of predetermined CNN backbones, some or all of which are available to the source device 110. From the CNN backbone type index, the number of layers and number of channels in each layer and resolution of each feature map in each layer may be determined. The size (i.e., width and height) of the basis vectors 550, a maximum number of basis vectors 550 (i.e., the maximum number of each layer of an FPN, or reduced form of FPN resulting from the tensor combiner 162), and a used number of basis vectors 550 (i.e., resulting from the method 2100) are encoded as basis vector packing info 1391 in the SEI message 1313, described with reference to Appendix A. Operations to be performed in the tensor extractor 172 (as determined by the tensor combiner 162) to recover tensors 149 having the same number and dimensionality as the tensors 115a are described as layer mapping 1390. The layer mapping 1390 is present in the SEI message 1313. The layer mapping 1390 includes layer_update_mapping_info, layer_extraction_flag, layer_upsample_flag, layer_downsampling_flag, resampling_filter_idx, resample_vertical_only_flag, resample_horizontal_only_flag, src_layer_idx, src_channel_offset, dst_layer_idx, described with reference to Appendix A.

A picture 1314 is encoded in the bitstream 1300. Each picture includes one or more subpictures, such as coded subpicture 1320, encoding subpicture 1210. For the first picture of a bitstream and generally for a 'random access point' access unit, intra slices are used to avoid any prediction dependency on other access units in the bitstream 1300. A coded subpicture 1322 encoding subpicture 1212, includes a slice header 1330 followed by slice data 1340. The slice data 1340 includes a sequence of CTUs, providing the coded representation of the frame data. The CTU is square and typically 128×128 in size, which is not well aligned to typical feature map sizes. The alignment of feature maps to a minimum block size, such as a 4×4 grid partially ameliorates this misalignment. To enable conversion from the integer or sample domain back to the floating-point domain, quantisation ranges 1392 are present in the bitstream 1300 and define the floating-point minimum and maximum values, from which samples are mapped in the inverse quantisation process, e.g. as performed in 520, 536, 560, 846, 836, 824, 816. Quantisation ranges are determined in the quantiser modules, i.e., 512, 528, 552, and 568, and are encoded in the bitstream 121 as the quantisation ranges 1392 in the SEI message 1313. A coded subpicture 1324 encodes subpicture 1214 and a coded subpicture 1326 encodes subpicture 1216. The coded subpictures 1220, 1222, 1224, and 1226 correspond to bitstream portions 515, 533, 557, and 573, respectively. Instead of separate subpictures, a single picture could also be used with separate slices corresponding to subpictures 1320, 1322, 1324, and 1326.

Figure 14:
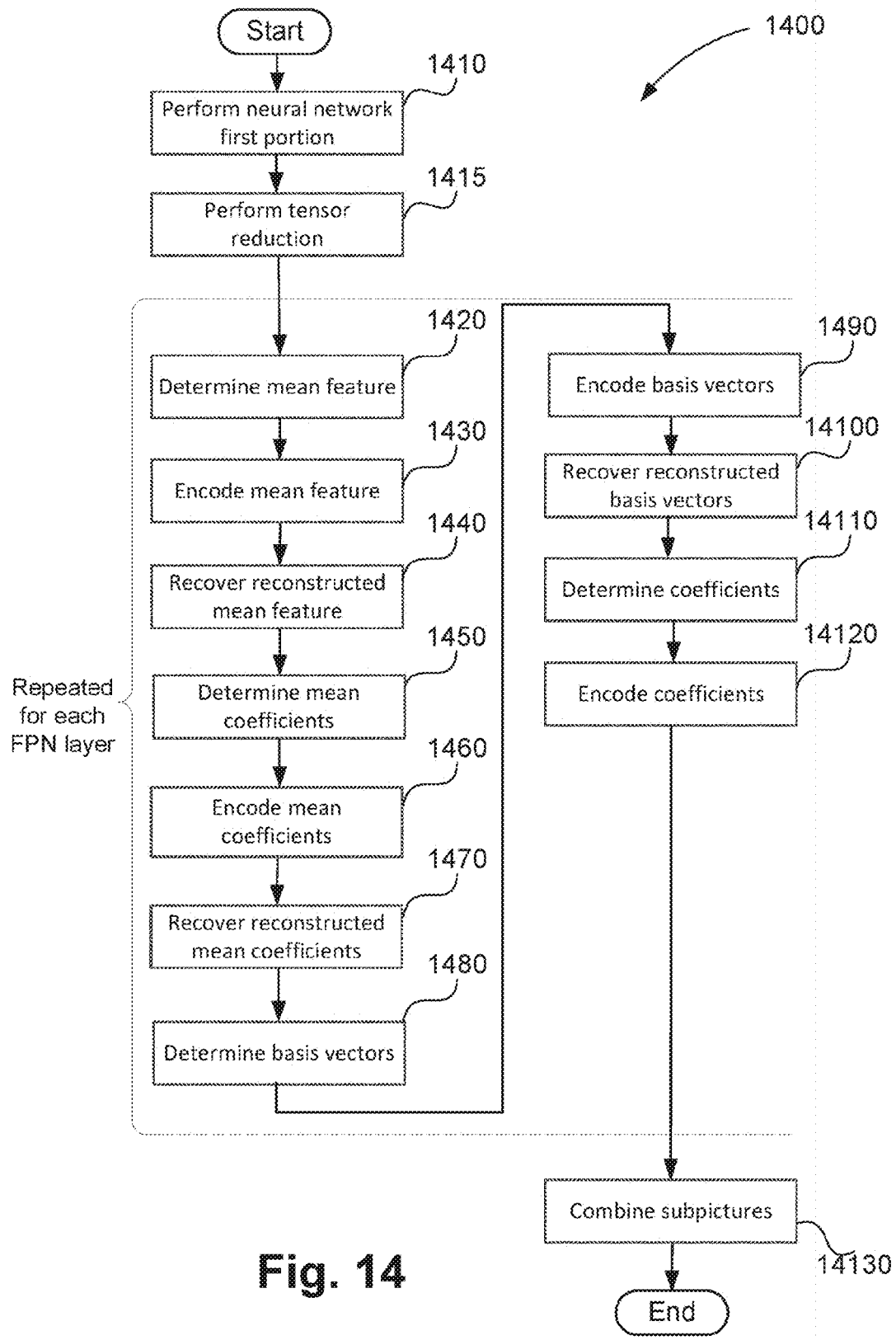
FIG. 14 shows a method for performing a first portion of a CNN, decorrelating, and encoding resulting feature maps.

FIG. 14 shows a method 1400 for performing a first portion of a CNN and encoding the resulting feature maps for a frame of video data. In encoding the feature maps, tensors are encoded into the bitstream. The method 1400 may be implemented using apparatus such as a configured FPGA, an ASIC, or an ASSP. Alternatively, as described below, the method 1400 may be implemented by the source device 110, as one or more software code modules of the application programs 233, under execution of the processor 205. The software code modules of the application programs 233 implementing the method 1400 may be resident, for example, in the hard disk drive 210 and/or the memory 206. The method 1400 is repeated for each frame of video data produced by the video source 112. The method 1400 may be stored on computer-readable storage medium and/or in the memory 206.

The method 1400 begins at a perform CNN first portion step 1410. At the step 1410, the CNN backbone 114, under execution of the processor 205, performs a subset of the layers of a particular CNN to convert an input frame 113 into intermediate tensors 115a. The intermediate tensors 115a may be stored, for example, in the memory 206 and/or hard disk drive 210. An example CNN being 'Faster R-CNN' or 'Mask R-CNN' and the subset of layers corresponding to all layers up to a 'P-layer' split point, as shown in FIG. 4. When multiple tensors are extracted from the CNN backbone 114, e.g., due to use of a FPN, the tensors 115a may contain multiple tensors. The method 1400 operates to encode tensors corresponding to one frame of video data from the video source 112. Control in the processor 205 progresses from the step 1410 to a perform tensor reduction step 1415.

Figure 19:
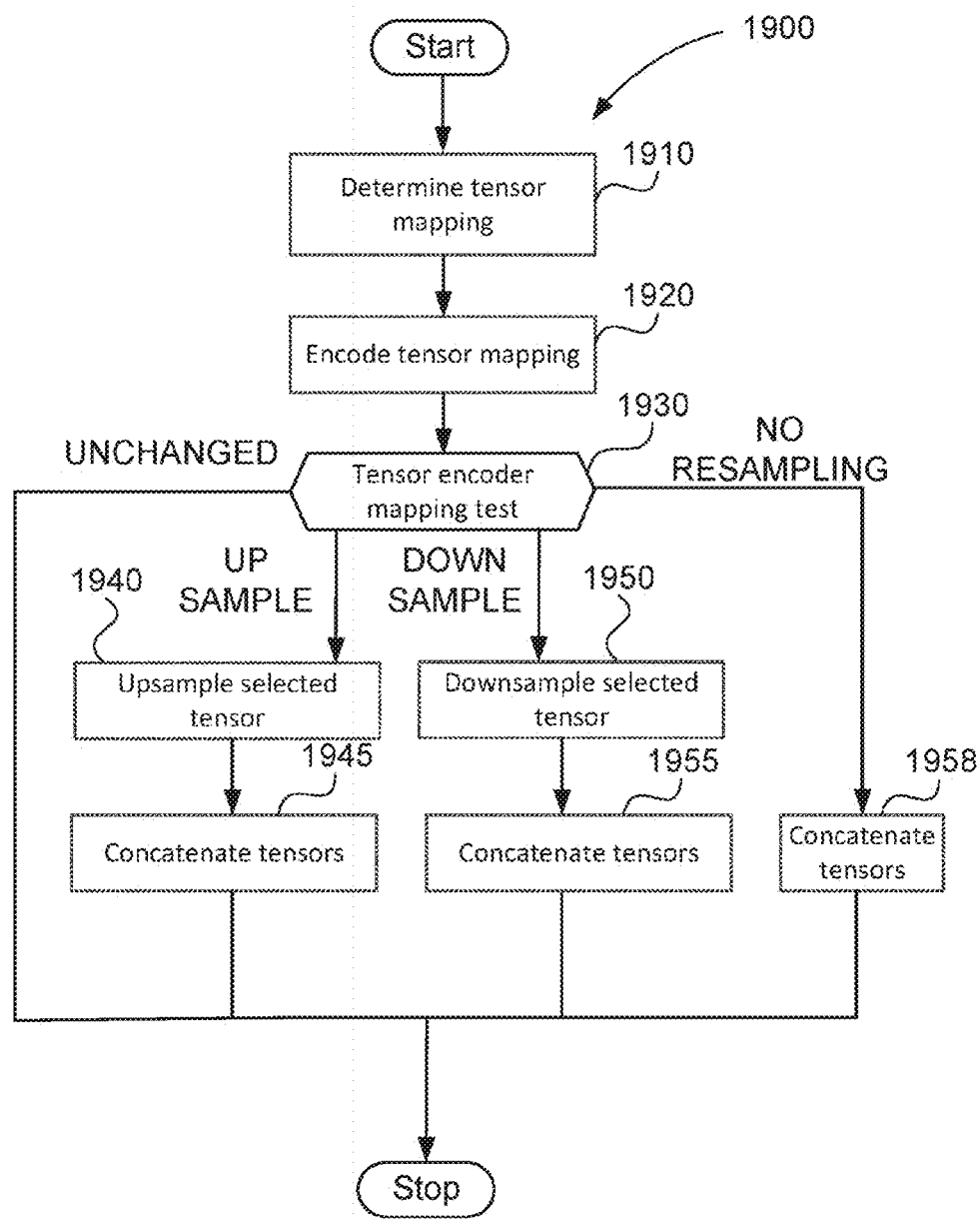
FIG. 19 shows a method for resampling a tensor from a multi-layer first portion of the CNN for decorrelation with another tensor from the multi-layer first portion of the CNN.

At the step 1415 the tensor combiner 162 operates under execution of the processor 205 to resample the number of tensors. FIG. 19 shows a method 1900 implemented at step 1415. As a result of operation of step 1415, the tensors 115a from an FPN may be (i) downsampled (reduced in number), (ii) upsampled (increased in number) or (iii) passed straight through to generate the tensors 115. Upsampling or downsampling is performed such that tensors from two layers are concatenated, with compatible width and height. The decision to upsample or downsample a given tensor of the tensors 115a, or to leave all the tensors 115a unmodified, is encoded in the bitstream 121. Control in the processor 205 progresses from the step 1415 to a determine mean feature map step 1420.

At the determine mean feature map step 1420 the module 510, under execution of the processor 205, averages the tensor 115 across the channel dimension to produce the mean feature 511. The mean feature 511 is quantised by the quantiser 512 under execution of the processor 205 to produce an integer (quantised) mean feature map 513 at step 1420. Control in the processor 205 progresses from the step 1420 to an encode mean feature step 1430.

At the encode mean feature step 1430 the subpicture encoder 514, under execution of the processor 205, packs the integer mean feature map 513 into the subpicture 1210 and encodes the subpicture 1210 to produce bitstream portion 515. Control in the processor 205 progresses from the step 1430 to a recover reconstructed mean feature step 1440.

At the recover reconstructed mean feature step 1440 the subpicture encoder 514, under execution of the processor 205, outputs a reconstructed picture, e.g. 618, within an implementation of the encoder 514, corresponding to a lossy version of the subpicture input for video compression, e.g. 612. Control in the processor 205 progresses from the step 1440 to a determine mean coefficients step 1450.

At the determine mean coefficients step 1450 the inverse quantiser 520, under execution of the processor 205, operate to inverse quantise the integer mean feature map 516, converting the map 516 back to the floating-point domain as the feature map 522. The dot product 524, under execution of the processor 205, uses the tensor 115 and the feature map 522 to generate the set of mean coefficients 526 using a dot product function, with one mean coefficient generated per channel in the tensor 115. Control in the processor 205 progresses from the step 1450 to an encode mean coefficients step 1460.

At the encode mean coefficients step 1460 the quantiser module 528 quantises the mean coefficients 526m under execution of the processor 205, to generate or produce integer mean coefficients 530. The subpicture encoder 532, under execution of the processor 205, packs the integer mean coefficients 530 into the subpicture 1212 and encodes the subpicture 1212 to produce the bitstream portion 533. Control in the processor 205 progresses from the step 1460 to a recover reconstructed mean coefficients step 1470.

At the recover reconstructed mean coefficients step 1470 the subpicture encoder 532, under execution of the processor 205, outputs a reconstructed version of the subpicture 1212, from which reconstructed mean coefficients 534 are generated. The reconstructed mean coefficients 534 are inverse quantised by the module 536 to produce recovered mean coefficients 538. At step 1470, the reconstructed version of the picture corresponds to 618 within an implementation of the encoder 532. Control in the processor 205 progresses from the step 1470 to a determine basis vectors step 1480.

At the determine basis vectors step 1480 the inverse quantiser 536, the dot product module 540, the subtractor 544, and the decomposition module 548, under execution of the processor 205, operate to produce a set of basis vectors for the tensor 115. The inverse quantiser 536 outputs the floating-point mean coefficients 538. The dot product module 540 performs a dot product operation with the recovered mean feature map 522 and the coefficients 538 to produce an offset tensor 542. The tensor 542 has the same dimensionality as the tensor 115 and contains a prediction of the feature map of each channel in the tensor 115, predicted using only mean (average) feature map information. Thus, the tensor 542 enables production of a zero-averaged version of the tensor 115 by subtracting this per-channel mean feature map data. The offset feature map 542 is subtracted by the module 544 from the tensor 115 to produce a zero-centred tensor 546. The decomposition module 548 receives the tensor 546 as an input and generates a set of basis vectors 550. Each basis vector in the set 550 may be referred to as a 'component'. Operation of the decomposition module 548 in producing the basis vectors 550 is described with reference to FIG. 21. The vectors 550 contain fewer basis vectors than there are channels in the tensor 115, corresponding to a reduction in the dimensionality of the tensor 115. The basis vectors in 550 represent the tensor 115 in a subspace that explains the maximum amount of variance in the tensor 115 for the number of components in the basis vectors 550. In other words, the basis vectors 550 enable representation of the tensor 115 with minimal degradation in quality for a given number of components. Control in the processor 205 progresses from the step 1480 to an encode basis vectors step 1490.

At the encode basis vectors step 1490 the quantiser module 552, under execution of the processor 205, operates to quantise the basis vectors 550 into the integer domain. The resultant integers basis vectors 554 are and packed into a subpicture and encoded to produce bitstream portion 557 by the subpicture encoder 556 under execution of the processor 205. Control in the processor 205 progresses from the step 1490 to a recover reconstructed basis vectors step 14100.

At the step 14100 the subpicture encoder 556 generates the reconstructed integer tensor 558, under execution of the processor 205, and operate to obtain a reconstructed version of the subpicture 1316, e.g., 618. The basis vectors 558 are unpacked from the reconstructed subpicture and inverse quantised back into the floating point domain (as the reconstructed basis vectors 562) by the inverse quantiser 560 under execution of the processor 205. Control in the processor 205 progresses from the step 14100 to a determine coefficients step 14110.

Each of the steps 1440, 1470 and 14100 recovers reconstructed coefficients. The reconstructed coefficients generated at each step provide a reconstruction of the features or vectors quantised and encoded in steps 1430, 140 and 1490. Each reconstruction allows modelling of losses due to encoding operations executed by the subpicture encoders to be modelled and accounted for, such that the versions of the features or vectors seen at the decoder side reflect those used in encoding the bitstream 121. The losses incurred by operation of quantising function(s) (for example at 512, 528 and 552) used to generate the encoded bitstream in the implementation 500 are also accounted for.

At the step 14110 the dot product module 564, under execution of the processor 205, performs a dot product of each channel in the tensor 546 against each vector in the reconstructed basis vectors 562 to produce a set of coefficients, i.e. the coefficients 566. The coefficients 566 represent the contribution of each basis vector in reproducing the contents of each feature map. Control in the processor 205 progresses from the step 14110 to an encode coefficients step 14120.

At the step 14120 the quantiser module 568, under execution of the processor 205, quantises the coefficients 566 to produce integer coefficients 570. The integer coefficients 570 are passed to the subpicture encoder 572 for packing into the subpicture 1214. The subpicture 1214 is encoded by the module 572 to produce the bitstream portion 573. Control in the processor 205 progresses from the step 14120 to a combine subpictures step 14130. Where the tensors 115 contain more than one tensor, the steps 1420-14120 are repeated for each tensor in the tensors 115, with the final compressed representation arranged into a single picture at the step 14130.

As described above, the modules 552 to 572 operate in a similar manner to the modules 512 to 532 to generate bitstreams. At the step 14130 the subpicture bitstream combiner 580, under execution of the processor 205, combines the bitstream portions 515, 533, 557, and 573, corresponding to subpictures 1210, 1212, 1216, and 1214, respectively, into a single bitstream, i.e. 121.

The method 1400 completes and processing in the processor 205 proceeds to invoke the method 1400 for the next frame.

Figure 15:
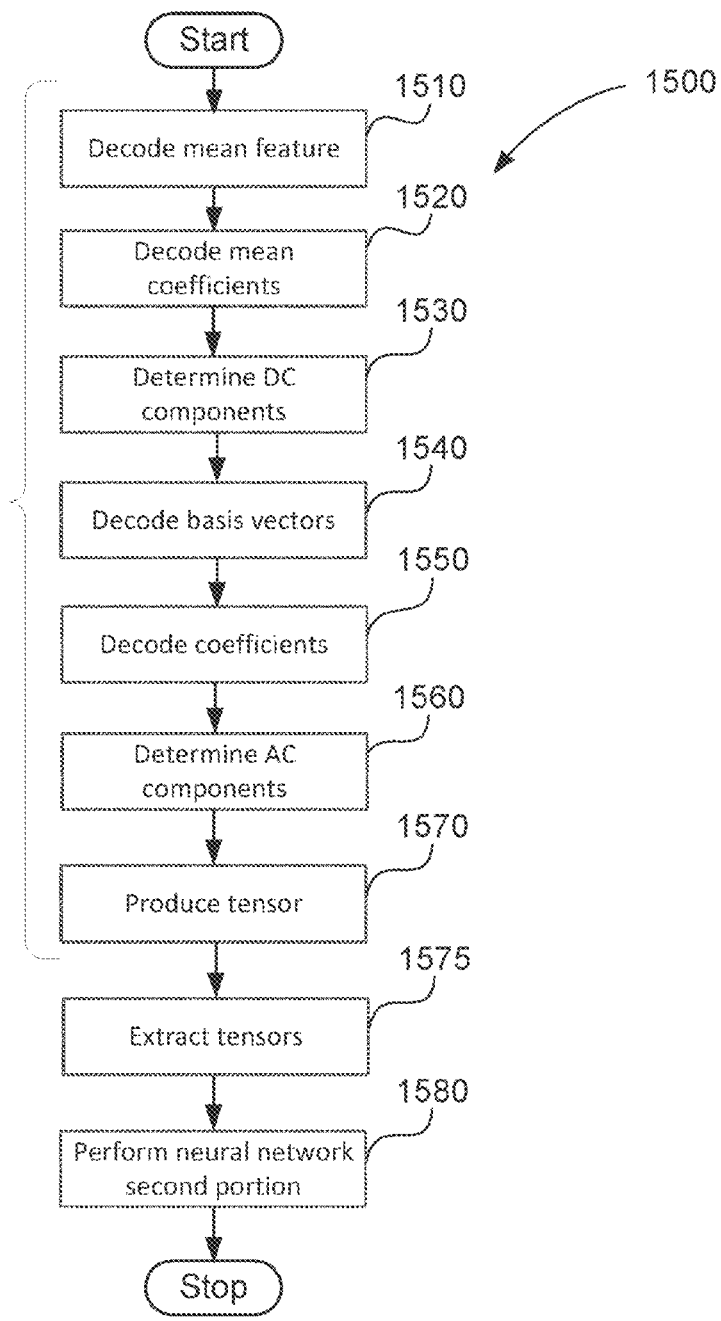
FIG. 15 shows a method for decoding a bitstream, reconstructing decorrelated feature maps, and performing a second portion of the CNN.

FIG. 15 shows a method 1500 for decoding the bitstream 143 to produce the decoded tensor 149 as implemented by the PCA decoder 800 for performing the second portion of the split CNN. The method 1500 may be implemented using apparatus such as a configured FPGA, an ASIC, or an ASSP. Alternatively, as described below, the method 1500 may be implemented by the source device 110, as one or more software code modules of the application programs 233, under execution of the processor 205. The software code modules of the application programs 233 implementing the method 1500 may be resident, for example, in the hard disk drive 210 and/or the memory 206. The method 1500 may be stored on computer-readable storage medium and/or in the memory 206. The method 1500 begins at a decode mean feature step 1510.

At the step 1510 the picture decoder 804, under execution of the processor 205, decodes subpicture 1210 (corresponding to the subpicture 840) from the bitstream 143. Control in the processor 205 progresses from the step 1510 to a decode mean coefficients step 1520.

At the step 1520 the picture decoder 804, under execution of the processor 205, decodes subpicture 1212 (corresponding to the subpicture 830) from the bitstream 143. Control in the processor 205 progresses from the step 1520 to a determine DC components step 1530.

At the step 1530 the unpackers 842 and 832, the inverse quantisers 846 and 836 and the dot product module 850, under execution of the processor 205, generate the tensor 852. The unpackers 842 and 832 unpack the subpictures, each subpicture containing quantised feature maps relating to the mean features 511, as quantised using the quantisation function(s) of the implementation 500. The inverse quantiser 846 inverse quantises the mean feature map unpacked from the subpicture 840 by the unpacker 842 to derive mean feature map 848. The inverse quantiser 836 inverse quantises the mean coefficients unpacked from the subpicture 830 by the unpacker 832 from the integer domain to the floating-point domain using respective quantisation ranges as signalled in the bitstream 143, to produce the mean coefficients 838. The dot product module 850 performs a dot product on the mean feature 848 and the mean coefficients 838 to produce tensor 852. The tensor 852 represents an offset for reconstruction of a non-zero-centred tensor from a zero-centred tensor. Control in the processor 205 progresses from the step 1530 to a decode basis vectors step 1540.

At the step 1540 the picture decoder 804, under execution of the processor 205, decodes subpicture 1216 (corresponding to the subpicture 820) from the bitstream 143. The subpicture 1216 is passed as the decoded subpicture 820 to the unpacker 822. The unpacker 822 which then extracts decoded basis vectors, e.g. 1226 for inverse quantisation at the step 1560. Operation of the destination device 140 in decoding basis vectors from the bitstream 143 is described with reference to FIG. 22. Control in the processor 205 progresses from the step 1540 to a decode coefficients step 1550.

At the step 1550 the picture decoder 804, under execution of the processor 205, decodes subpicture 1214 (corresponding to the subpicture 810) from the bitstream 143. The subpicture 1214 is passed as the decoded subpicture 810 to the unpacker 812. The unpacker 812 extracts decoded coefficients, e.g., 1224 for inverse quantisation at the step 1560. Control in the processor 205 progresses from the step 1550 to a determine AC components step 1560.

At the step 1560 the unpackers 822 and 812, the inverse quantisers 824 and 816, and the dot product module 828, under execution of the processor 205, operate to produce the zero-centred tensor 854. The unpacker 822 extracts basis vectors from the subpicture 820 and passes the basis vectors as integer feature maps 822 to the inverse quantiser 824. The inverse quantiser converts the basis vectors from the integer domain to the floating-point domain, according to a quantisation range obtained from the bitstream 143, producing the basis vectors 826. The unpacker 812 extracts coefficients from the subpicture 810 and passes the coefficients as integer coefficients to the inverse quantiser 816. The inverse quantiser 816 produces floating-point domain coefficients 818. The dot product module 828 performs a dot product of each coefficient of the coefficients 818 with the respective basis vector in the vectors 826 to produce a zero-centred reconstructed tensor, i.e., tensor 854. Control in the processor 205 progresses from the step 1560 to a produce tensor step 1570.

At the step 1570 the summation module 856, under execution of the processor 205, sums the zero-centred reconstructed tensor 854 with the tensor 852 to produce a reconstructed tensor 149. Due to optimal or near optimal dimensionality reduction of the PCA process, the tensor 149 is substantially similar to the tensor 115 and hence suitable for use by the CNN head 150 to perform a given machine task. If an FPN is in use, the steps 1510-1570 are performed for each tensor of the representation of the FPN layers resulting from the method 1900. Control in the processor 205 progresses from the step 1570 to an extract tensors step 1575.

At the step 1575 the processor 205 executes to extract separate FPN layer tensors from any composite tensor by operation of the tensor extractor 172. The tensor extractor 172 performs a method 2000 shown in FIG. 20 to extract separate FPN layer tensors from any composite tensor of the tensors 149a, passing the result along as the tensors 149. Control in the processor 205 progresses from the step 1575 to a perform neural network second portion step 1580.

At the step 1580 the CNN head 150, under execution of the processor 205, performs the latter stages of a neural network using the tensor 149 as input. For example, classification using the network described with reference to FIG. 10A or FIG. 11 may be performed, depending on the dimensionality of the tensor 149 (and number of tensors contained therein, should a FPN be used). Moreover, where several networks have matching architecture and weights in the backbone portion, tensors encoded from such a backbone portion can be used to perform completion of these different networks by running different instances of the CNN head 150. The step 1580 executes to output the task result 151.

Figure 16A:
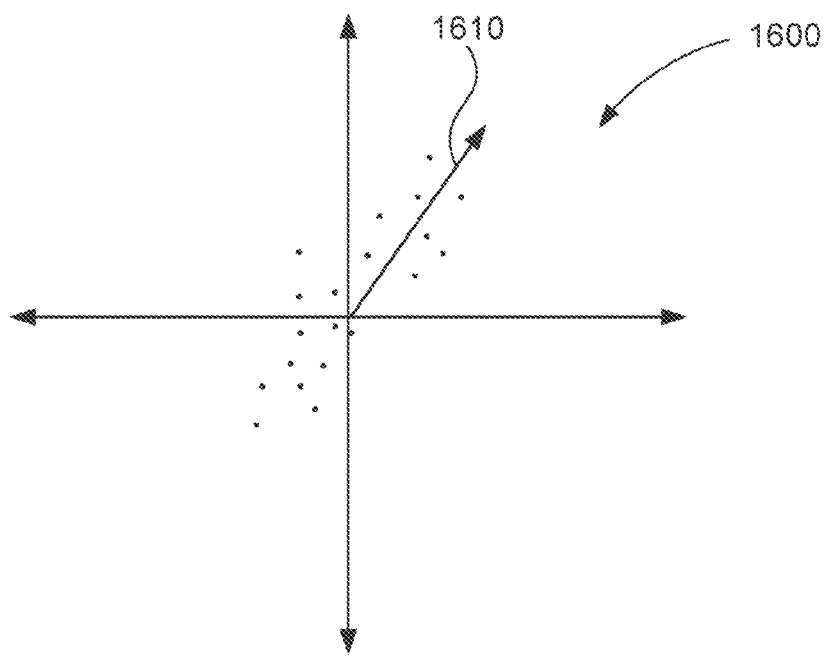
FIGS. 16A and 16B shows two successive datasets and associated eigenvectors.
Figure 16B:
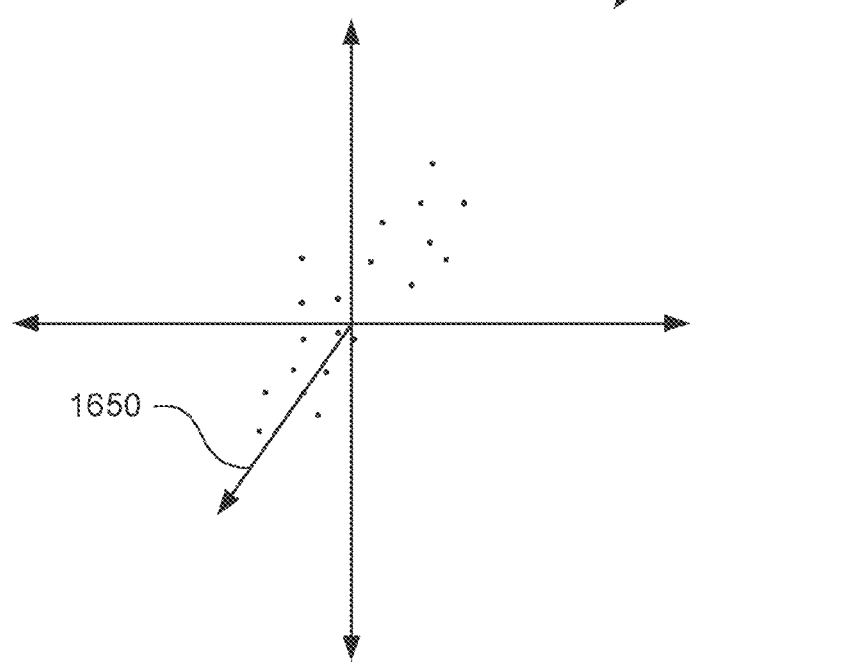

FIGS. 16A and 16B shows two successive datasets and associated eigenvectors to illustrate the notion of eigenvector 'instability', which occurs when a decompositions are repeatedly performed on similar datasets. When decorrelation tensors are generated from a video, successive frames are highly correlated and so the resulting basis vectors are also quite similar. A first dataset 1600 in FIG. 16A shows a two-dimensional dataset and a second dataset 1640 in FIG. 16B shows a later version of the two-dimensional dataset. The datasets 1600 and 1640 are similar but not identical, and could have been derived by performing the CNN backbone 114 operation on a sampling process such as frame capture from the video device 112. Each sample in a feature map forms a separate dimension for the purposes of decomposition in the system 100, however for explanatory purposes two-dimensional datasets are shown in FIGS. 16A and 16B. A single eigenvector is produced, resulting in a reduction from two to one dimensions. For dataset 1600, an eigenvector 1610 is produced and for dataset 1640, an eigenvector 1650 is produced. As the datasets 1600 and 1640 are similar, the eigenvectors 1610 and 1650 have similar absolute slope, where 'slope' reflects the direction of the vector in the two-dimensional vector case, noting that the intercept of a principal component is through the origin. However, due to small differences in the datasets 1600 and 1640, the process for performing the decomposition may 'flip' or invert the direction of the eigenvectors, resulting in the vectors 1610 and 1650 having opposite directions. In other words, the inversion of 1650 represents each element (i.e., x and y components) being the negative of the respective element of the vector 1610. Inversion of the direction of a basis vector corresponds to each element of the vector having the same (or similar) magnitude to a respective element of an earlier-produced basis vector but being opposite in sign. For a basis vector, there are many more dimensions than shown in the example of FIGS. 16A and 16B. For example, a feature map size of 136×72 indicates a basis vector having 9792 elements, or 9792 dimensions. Accordingly, multiplication of the vector 1650 by negative one results in a vector having substantially the same value as the vector 1610.

When decomposition across feature maps of the tensor 115 is performed repeatedly, the same issue of elementwise inversion of resulting basis vectors arises. Individual basis vectors from time to time may invert their direction even though the contents of the basis vector are otherwise substantially similar. This polarity inversion may occur to any basis vector and occurrence for a given basis vector is independent of occurrence for other basis vectors. When compressing successive frames containing packed basis vectors, the inversion reduces the ability of inter-prediction to achieve high coding efficiency, as the inverted regions corresponding to the inverted basis vectors are not easily recognised for efficient tool selection by the video encoder 614.

Figure 17:
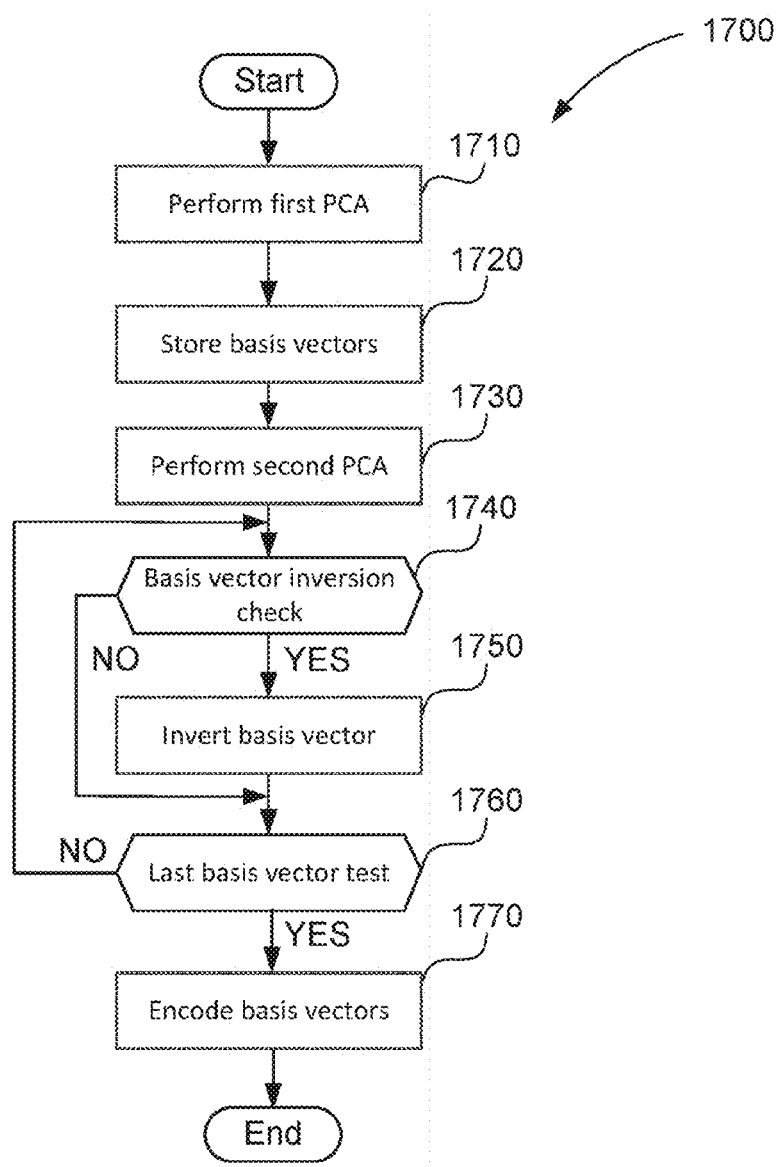
FIG. 17 shows a method for adjusting basis vectors resulting from successive decorrelation operations on tensors produced from the first portion of the CNN.

FIG. 17 shows a method 1700 for encoding successive feature maps from a given layer from the first portion of the CNN, the successive feature maps having the same dimensionality. The method 1700 operates such that the representation in the reduced dimensionality space is stabilised with respect to directionality between invocations of the PCA. The method 1700 is particularly suited to processing video data, where the reduced dimensionality representation needs to be regenerated multiple times, possibly as frequently as once every frame, and there is correlation in successive video frames which leads to correlation in the basis vectors produced by performing PCA on tensors from successive video frames. In such a case, the direction of the resulting basis vectors may invert across all samples of the basis vector from one invocation to the next, even though the magnitude on an overall basis and on a sample-wise basis within the basis vector is relatively unchanged. Such a 'polarity inversion' may be attributed to instability in the basis vector generation process, or sensitivity to small changes in the input tensor. The method 1700 may be implemented by apparatus such as a configured FPGA, an ASIC, or an ASSP. The method 1700 may be implemented by the destination device 140, for example as a function of the PCA encoder 160, as one or more software code modules of the application programs 233, under execution of the processor 205. The method 1700 is repeated for each frame of video data encoded in the bitstream 143. The software code modules of the application programs 233 implementing the method 1700 may be stored, for example, on the hard disk drive 210 and/or in the memory 206. The method 1700 commences at a perform first PCA step 1710.

At the step 1710 the PCA encoder 160, under execution of the processor 205, generates a first set of basis vectors for a first tensor, the first tensor being produced from the CNN backbone 114 processing a given frame from the video source 112. For example the decomposition module 548 may receive the tensor 546. Control in the processor 205 progresses from the step progresses from the step 1710 to a store basis vectors step 1720.

At the step 1720 the PCA encoder 160, under execution of the processor 205, stores the first set of basis vectors in the memory 206 for use in a subsequent invocation of the decomposition module 548. Control in the processor 205 progresses from the step 1720 to a perform second PCA step 1730.

At the step 1730 the PCA encoder 160, under execution of the processor 205, generates a second set of basis vectors for a second tensor, the second tensor being produced from the CNN backbone 114 processing a subsequent frame to the given frame of the step 1710 from the video source 112. The step 1730 operates in a similar manner to he step 1720, that is using the decomposition module 548. The subsequent frame may be the next frame provided by the video source 112, or may be a later frame. The basis vectors generated at step 1730 provide components of a current tensor, whereas basis vectors stored at step 1720 relate to a preceding tensor. If generation of basis vectors is performed less frequently that on every frame, the generation may be periodic (every N frames) or driven by some criteria relating to content of the frames, such as when frame contents are deemed to contain significant new information. For example, further generation of basis vectors may be performed due to detection of large motion or other significant change compared to earlier frames provided by the video source 112. Due to correlation in the video frames from the video source 112 the first and second sets of basis vectors have a degree of correlation making the basis vectors amenable to compression using inter-prediction tools in the packed representation of FIGS. 12A and 12B. However, noise or other small variations between the first and second frames can result in various basis vectors of the second set of basis vectors being generated in the opposite 'direction' (or inverted) compared to the respective basis vector of the first set of basis vectors. Control in the processor 205 progresses from the step 1730 to a basis vector inversion check step 1740.

The basis vectors generated at step 1730 provide components of a current tensor, whereas the basis vectors generated at step 1710 provide components of a preceding tensor, representing an earlier frame in the video data 113. At the step 1740, the current basis vector is tested to check for polarity inversion. Checking for polarity inversion involves testing the current (step 1730) and earlier or preceding (step 1710) generated basis vectors for a given coded layer or layer of the FPN to determine if the vectors have remained substantially similar except for swapping or inverting the sign of each element in the basis vector. For a given basis vector (starting with the first or preceding vector of step 1710), a sum is determined. The sum is the result of firstly performing an element-wise addition of the respective vector from the first and second sets of basis vectors. A sum of the absolute values of the resulting sims from the element-wise addition is determined for each basis vector to produce a similarity score, the similarity score being a single scalar value per basis vector.

Low values of the similarity score for a given basis vector are indicative of the second basis vector of the set being substantially similar but opposite in polarity to the corresponding basis vector in the first set of basis vectors. Low values of the similarity score are thus an indication of polarity inversion in the basis vector between successive performances of the decomposition. Where the sum is below a threshold value, polarity inversion is detected ("YES" at step 1740) and control in the processor 205 progresses from the step 1740 to an invert basis vector step 1750. Where the sum is not below a threshold value, polarity inversion is not detected ("NO" at step 1740) and control in the processor 205 progresses from the step 1740 to a last basis vector test step 1760. The similarity threshold is typically predetermined. In some embodiments, the similarity threshold is linearly related to at least one of a width and a height of the current tensor, for example 0.8 or 0.9 of the width and/or height. In other arrangements the similarity threshold may be equivalent to log 2 of area of one channel of the tensor. The similarity threshold value may be determined based on factors such as a filtered similarity score, representative of the non-inverted case. A median filter may be applied to the similarity score to exclude outliers (e.g., low scores indicative of a polarity inversion). The median-filtered similarity score may then be scaled and compared with the similarity score for a given frame to detect polarity inversion. The filtering may be performed on a per basis vector and per-layer granularity, to account for differing statistics between basis vectors and layers. Allowance for variation in similarity score as a result of changes in expected content and content variance may be made. Allowance in setting the threshold may also be based on decomposition methods used or the like.

At the invert basis vector step 1750 the PCA encoder 160, under execution of the processor 205, inverts the polarity of the basis vector currently being processed, e.g., by multiplying the vector by −1 (negative one) to produce an updated basis vector. Effectively, an updated set of components from the current basis vector is generated, such that a component in the updated set of components is an inverse of a respective component in the basis vectors generated at step 1730. As a result of this inversion, the current basis vector becomes substantially similar to the corresponding basis vector from the first set of basis vectors. Once inversion has taken place, provided no further polarity inversion occurs at the next decomposition operation, it is necessary to continue to invert the basis vector from a subsequent decomposition operation in order to maintain matching polarity with the inverted basis vector of the current decomposition operation. A set of flags, with one flag per basis vector, is used to indicate the inversion status of each basis vector for future basis vector generation operations, e.g., to provide persistence of the basis vector inversion step for subsequent frames. A flag for the current basis vector is toggled or changed in the set of flags to indicate that polarity inversion has taken place, enabling handling of the case of beginning inversion when a polarity inversion is first detected and ceasing inversion when a second polarity inversion is detected. The set of flags provide basis of whether components generated using the decomposition function for any subsequent tensors are to be inverted. Control in the processor 205 progresses from the step 1750 to the last basis vector test step 1760.

At the step 1760 the processor 205 tests if the current vector being processed is the last one in the set of basis vectors. If not ("NO" at step 1760), processing progresses to the next basis vector in the set of basis vectors and control in the processor 205 progresses from the step 1760 to step 1740. If so ("YES" at step 1760), processing progresses from the step 1760 to a encode basis vector step 1770.

At the step 1770 the encoder 160, under execution of the processor 205, operates upon a final basis vector, comprising updated basis vectors, for the vectors where inversion has been performed at the step 1750, and basis vectors from the second set of basis vectors, for vectors where inversion has not been performed. This final set of basis vectors is stored as the reference point for subsequent invocations of the method 1700, i.e. as the 'first set of basis vectors'. The final set of basis vectors is passed to the quantiser module 552 as the basis vectors 550 and encoded by the subpicture encoder 556. Moreover, where inversion is performed once, a flag for each component indicates that on subsequent invocations of the method 1700 inversion needs to be performed for the respective component to ensure the polarity matches that of the previous invocation of the method 1700. Where inversion is detected a second time on a subsequent invocation of the method 1700, the flag is toggled, resulting in a cessation of inversion of the respective component on further invocations of the method 1700. The method 1700 then terminates for the current frame, and may be invoked again for the next frame, or later frame where the PCA encoder 160 is performed less frequently than upon every frame.

Figure 18A:
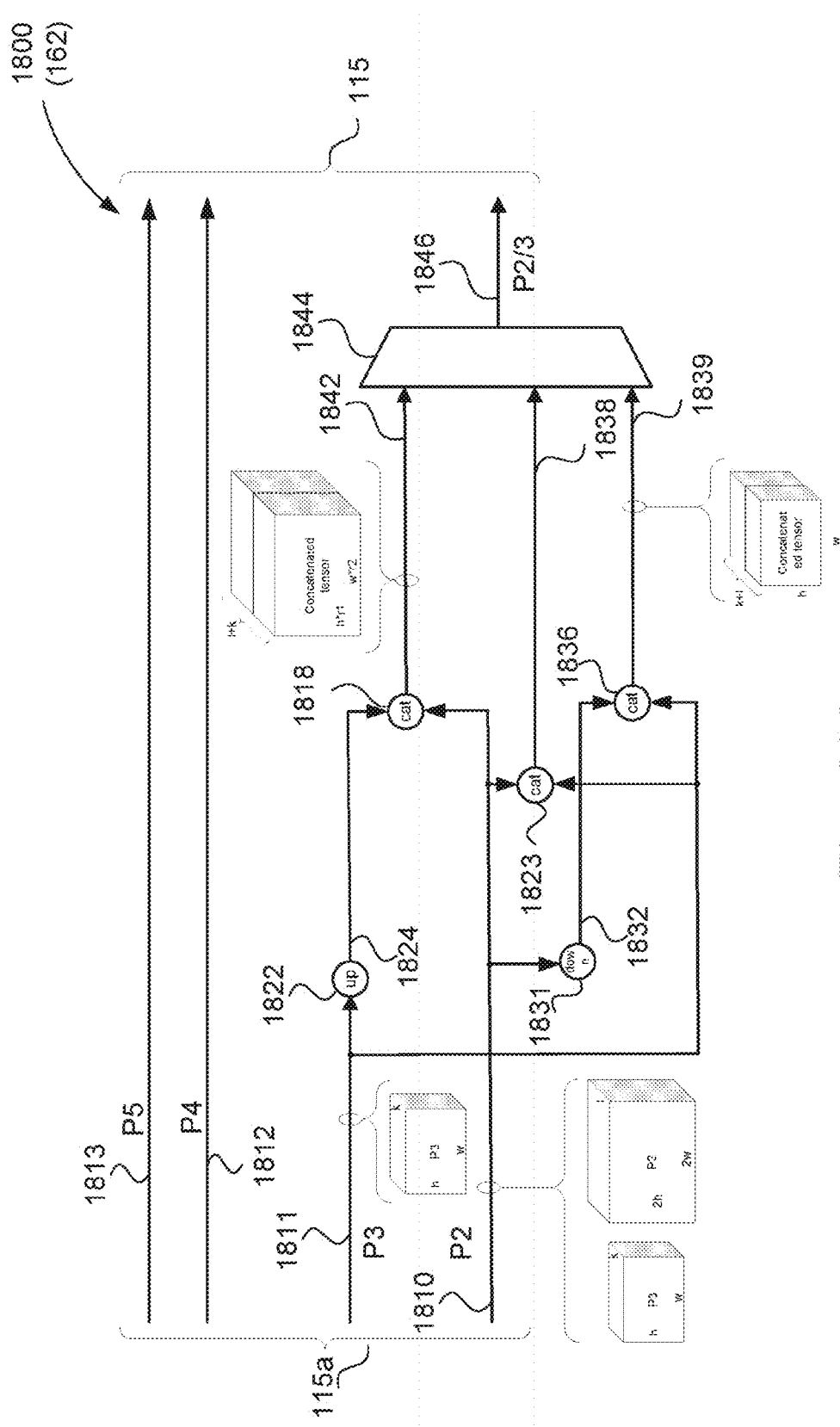
FIG. 18A is a schematic block diagram showing a tensor reduction module for combining tensors from different layers in an FPN before compression using decomposition.

FIG. 18A is a schematic block diagram showing an example implementation 1800 of the module 162 for combining tensors from different FPN layers using either upsampling or downsampling operations. The example of FIG. 18A uses the P2-P5 layers from CNN backbone portion 400. The layer P6 429 is omitted from consideration as the PCA decoder 170 is able to reconstruct the P6 layer from the decoded P5 layer. The examples shown in FIG. 18A relate to resampling one of P2 or P3 and are described with reference to FIG. 19 below.

Figure 18B:
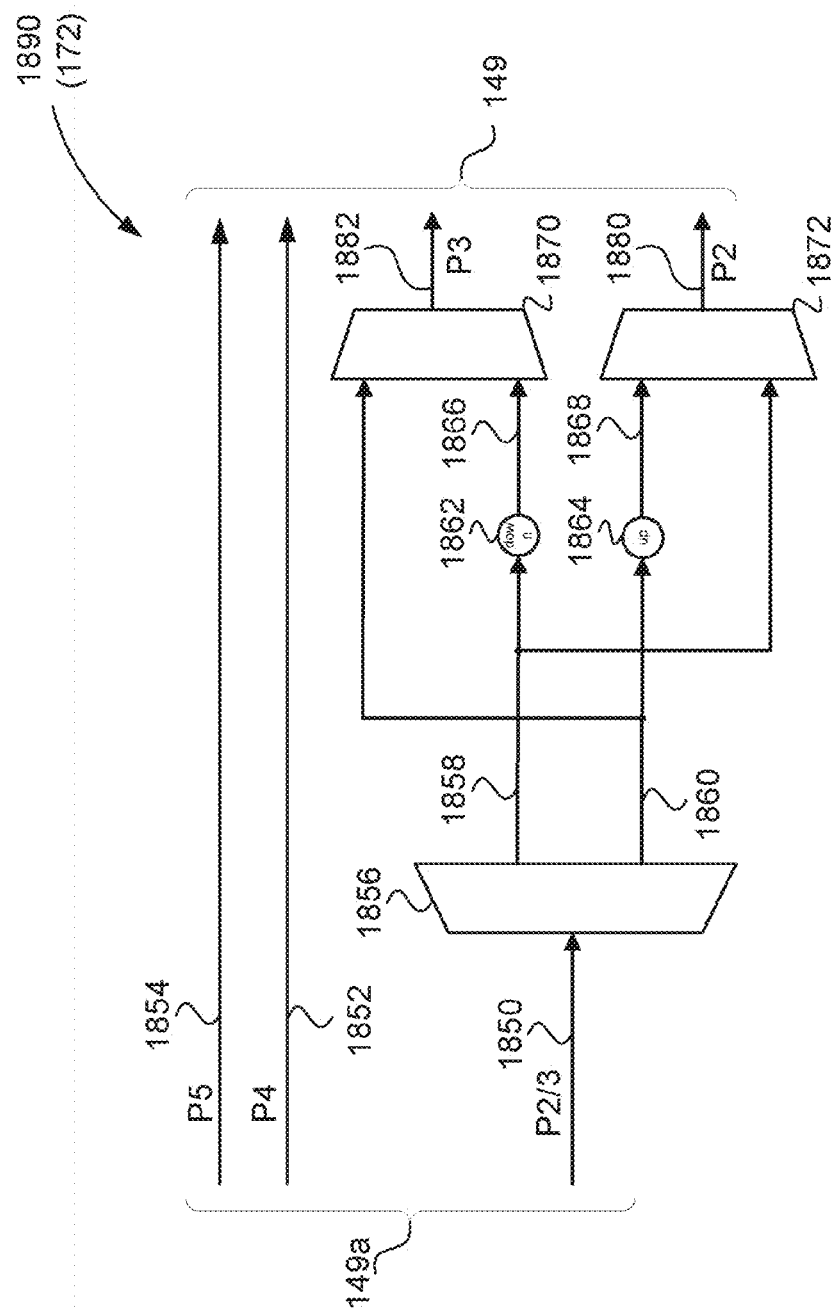
FIG. 18B is a schematic block diagram showing a tensor separator module for extracting tensors of different FPN layers from a combined tensor after decompression.

FIG. 18B is a schematic block diagram showing an implementation 1890 of the module 172 for extracting tensors from a combined representation back into separate tensors corresponding to FPN layers using either upsampling or downsampling operations. Tej example of FIG. 18B provides the example P2-P5 layers for CNN head 1100. Layer P6 1118 is derived by performing a max pooling operation on Layer P5 1116 and so does not need to be compressed or decompressed. The examples shown in FIG. 18B relate to the cases shown in FIG. 18A where P2 and P3 have been combined are described with reference to FIG. 20 below.

FIG. 19 shows a method 1900 for resampling a tensor from a multi-layer first portion of the CNN for decorrelation with another tensor from the multi-layer first portion of the CNN. The method 1900 may be implemented by apparatus such as a configured FPGA, an ASIC, or an ASSP. Alternatively, as described below, the method 1900 may be implemented by the source device 110, as one or more software code modules of the application programs 233, under execution of the processor 205. The method 1900 is repeated for each frame of video data encoded in the bitstream 143. The software code modules of the application programs 233 implementing the method 1900 may be stored, for example, on the hard disk drive 210 and/or in the memory 206. The method 1900 commences at a determine tensor mapping step 1910.

At the step 1910, the tensor combiner 162, under execution of the processor 205, determines whether tensors (of the tensors 115*a*) from two different layers of an FPN are to be combined or not. Combination typically occurs if the tensor 115*a* has at least a first set of feature maps with a first size and a second set of feature maps with a second size different to the first size. If not combined the tensors 115*a* are to be passed through unmodified. If tensors are to be combined, the tensor combiner 162 determines whether the tensors are to be combined by executing downsampling of a larger tensor, or upsampling of a smaller tensor, or combined without resampling. The options of upsampling and downsampling are available when the tensors 115*a* include at least two tensors, with width and height of two tensors related by a factor of two, i.e. generated from a layered network with a stride equal to two operation included. An option of concatenating without resampling is available when the tensors 115*a* include at least two tensors, with two of the tensors having the same width and height. Since the dimensionality of the tensors 115*a* is set by the network architecture and split point, the options available to the tensor combiner 162 are constrained by the choice of network architecture and split point. In the case where the tensors 115*a* contain one tensor only there is no scope for combining tensors and the only option for the tensor combiner 162 is to pass the tensor 115*a* unchanged as the tensor 115. Where downsampling or upsampling to a tensor of the same width but half or double the height is to be evaluated, a resample_vertical_only_flag syntax element indicates application of resampling in a vertical direction only. Where downsampling or upsampling to a tensor of the same height but half or double the width is to be evaluated, a resample_horizontal_only_flag syntax element indicates application of resampling in a horizontal direction only. Options for resampling only vertically or only horizontally allow for tensor combining in different layers where a stride equal to two is applied only vertically or horizontally, as may be encountered in some CNN architectures.

If a larger tensor is downsampled, detail in the larger tensor is lost. Accordingly, downsampling is more suited to data that lacks fine detail, such as frame data 113 containing mainly large objects. If the frame data 113 is determined to contain more smaller detail the processor 205 does not select downsampling the larger tensor. Whether downsampling or upsampling, the result of combining tensors from two different layers before applying compression based on cross-channel decomposition is an ability to uncover redundancy across layers. If each layer is independently encoded by the PCA encoder 160, although redundancy across the channels of each tensor is uncovered, redundancy across layers is not able to be uncovered. If redundancy across layers is identified, the total number of basis vectors needed to encode a tensor that combines two different FPN layers can be lower than the number of basis vectors that would be allocated to the tensor of each FPN layer, where tensors are not combined into a single layer. Where a smaller tensor is to be upsampled, a benefit in terms of exploiting inter-layer redundancy is seen, resulting in little or no need to increase the number of basis vectors for the combined tensor. For layered networks where the width and height are the same between two layers (the channel count may differ), the tensor combiner 162 can attempt to uncover cross-layer redundancy without resampling tensors from two layers having the same width and height. The processor 205 may try the options of combining without resampling, upsampling, or downsampling, and leaving the tensors unmodified and select the option which results in the lowest coding cost of the resulting tensors 115. In other arrangements, the step 1910 may set a predetermined default operation of whether resampling is to be implemented. The mapping determined at the step 1910 can be a predetermined mapping or can be determined on a more regular basis, such as on every frame. When the mapping is predetermined, the mapping need only be signalled at the start of the bitstream. A layer_update_mapping_info syntax element in the SEI message 1313 permits signalling instances of the SEI message 1313 where a mapping is to be communicated to the destination device 140. For a predetermined mapping, signalling once instance of the mapping with the first picture 1200 of the CLVS is sufficient. Control in the processor 205 progresses from the step 1920 to an encode tensor mapping step 1920.

At the step 1920 the tensor combiner 162, under execution of the processor 205, encodes the determination resulting from operation of step 1920 into the bitstream 121. The encoded determination represents the operation needed to be performed in the tensor separator 172 to reverse the operation performed in the tensor combiner 162. The decision to upsample, downsample, or leave the FPN layers unmodified is encoded in the SEI message 1313 using either flags or a variable-length codeword. Syntax for encoding the decision made at the step 1910 into the bitstream 121 is described with reference to Appendix A. The syntax encodes the operations to be performed in the tensor separator 172 so that the tensors 149 have the same number, dimensions, and channel count as the tensors 115a, i.e., prior to operation of the tensor combiner 162. Where a tensor was upsampled and combined with another tensor by the tensor combiner 162, signalling indicates the tensor separator 172 is to extract two tensors from the decoded combined tensor. One of the extracted tensors is output as one of the tensors 149 and the extracted tensor is downsampled to produce an additional tensor included in the tensors 149. Where a tensor was downsampled and combined with another tensor by the tensor combiner 162, signalling indicates the tensor separator 172 is to extract two tensors from the decoded combined tensor. One of the extracted tensors is output as one of the tensors 149 and the other is upsampled to produce an additional tensor included in the tensors 149. Where a tensor was not resampled but was combined with another tensor by the tensor combiner 162, signalling indicates the tensor separator 172 is to extract two tensors from the decoded combined tensor, both of which are output as tensors among the tensors 149. Indexes to obtain the combined tensor, i.e., src_layer_idx, and to insert the resampled tensor, i.e., dst_layer_idx. Signalling of the source and destination layer indices is flexible, e.g., to support cases where concatenated layers are non-adjacent among the tensors 115a or where the layer having half the spatial resolution of another layer appears earlier among the tensors 115a or later among the tensors 115a. Encoding that upsampling is implemented specifies that the feature maps upsampled at encoding are to be downsampled at decoding and vice versa. Control in the processor 205 progresses from the step 1920 to a tensor encoder mapping test step 1930.

At the step 1930 if the determination made at the step 1910 is to not combine tensors from different FPN layers of the tensors 115a, the method 1900 terminates. Control in the processor 205 returns to the determine mean feature step 1420 of the method 1400, where all tensors 115a are passed along as tensors 115 for the remaining steps. If the determination made at the step 1910 is to perform an upsampling in the tensor combiner 162 of a tensor from an FPN layer of the tensors 115a, control in the processor 205 progresses from the step 1930 to an upsample selected tensor step 1940. If the determination made at the step 1910 is to perform a downsampling in the tensor combiner 162 of a tensor from an FPN layer of the tensors 115a, control in the processor 205 progresses from the step 1930 to a downsample selected tensor step 1950. If the determination made at the step 1910 is to perform a concatenation in the tensor combiner 162 of tensors among the tensors 115a without applying a resampling filter, control in the processor 205 progresses from the step 1958.

Referring to FIG. 18A, the implementation 1800 receives inputs P3-P5 (1810-1813 respectively). The implementation 1800 includes a tensor upsampler 1822, a tensor downsampler 1831, concatenation modules 1818 and 1836 and a mutiplexer 1844.

Upsampling occurs for a first tensor where the second size of the second set of feature maps (or tensor) is larger than the first size, or vice versa. At the step 1940 the tensor upsampler 1822, under execution of the processor 205, upsamples a tensor, e.g., P3 tensor 1811 from the tensors 115a to produce upsampled P3 tensor 1824. The upsampled tensor 1824 can also be referred to as an upsampled set of feature maps 1824. The P3 tensor 1811 has width w and height h. The upsampled P3 tensor 1824 has width $2d$ and height $2h$. Upsampling may be performed using an interpolation filter, a nearest neighbour filter, or other filter to produce the intermediate samples needed for upsampled P3 tensor 1824. Control in the processor 205 progresses from the step 1940 to a concatenate tensors step 1945.

At the step 1945 the concatenation module 1818, under execution of the processor 205, concatenates the upsampled P3 tensor 1824 and the P2 tensor 1810 along the channel dimension to produce a concatenated tensor 1842. The concatenated tensor 1842 has width $2w$ and height $2h$, and a channel count equal to the sum of the channel counts of tensors 1824 and 1810. The multiplexer 1844 selects the tensor 1842 as concatenated output tensor 1846. The tensors

1846, 1812, and 1813 are output as the tensors 115 for the remaining encoding steps. The method 1900 then terminates and control in the processor 205 resumes at the step 1420 of the method 1400.

At the step 1950 the tensor downsampler 1831, under execution of the processor 205, downsamples a tensor, e.g., P2 tensor 1810 from the tensors 115a to produce downsampled P2 tensor 1832. P2 tensor 1810 has width 2w and height 2h. Downsampled P2 tensor 1832 is spatially downsampled to have half of the width and half of the height of the P2 tensor 1810, resulting in dimensions w, h. Downsampling may be performed using subsampled bilinear, bicubic, or other filtering operations. No downsampling or other filtering is applied in the channel dimension of the P2 tensor 1810, so the channel count of the downsampled P2 tensor 1832 is unchanged. Control in the processor 205 progresses from the step 1950 to a concatenate tensors step 1955.

At the step 1955 a concatenation module 1836, under execution of the processor 205, concatenates the P3 tensor 1811 and the downsampled P2 tensor 1832 along the channel dimension to produce a concatenated tensor 1839. The concatenated tensor 1839 has width w and height h, and a channel count equal to the sum of the channel counts of tensors 1811 and 1832. The multiplexer 1844 selects the tensor 1839 as the concatenated output tensor 1846. The tensors 1846, 1812, and 1813 are output as the tensors 115 for the remaining encoding steps. If resampling was implemented the output tensor 1846 includes a resampled set of feature maps and a set of feature maps that has not been resampled, as described in FIG. 18A with respect to P2 and P3 and operation of concatenators 1818 and 1836. The method 1900 then terminates and control in the processor 205 resumes at the step 1420 of the method 1400.

At the step 1958 a concatenation module 1823, under execution of the processor 205, concatenates a tensor 1811 and a tensor 1832 (in this case both having the same width and height) to produce a concatenated tensor 1838. The multiplexor 1844 passes the tensor 1838 along as concatenated output tensor 1846. The tensors 1846, 1812, and 1813 are passed along as the tensors 115 for the remaining encoding steps. The method 1900 then terminates and control in the processor 205 resumes at the step 1420 of the method 1400.

The method 1400 continues to execute through steps 1420 to 14120, for example determining basis vectors using the tensors output at step 2070 at step 1480, deriving coefficients associated for both feature maps in the concatenated tensor using the basis vectors at step 14110 and encoding the coefficients and basis vectors at steps 1490 and 14120.

As a result of operation the method 1900, a combined tensor is passed along as one of the tensors 149 combining two separate layers of the FPN. The combined tensor is compressed using decomposition methods such as PCA. The decomposition method is able to also decorrelate along two layers of the FPN where upsampling/downsampling has occurred, rather than decorrelation being confined to each layer of the FPN. Moreover, where detail needs to be preserved, the source device 110 has the option to upsample a tensor from a smaller FPN layer, e.g. P3, for the purpose of basis vector derivation and compression. The number of basis vectors generated for the concatenation of upsampled P3 and P2 layers need not be increased compared to the number of basis vectors generated purely for the P2 layer. Accordingly, additional area of basis vectors in the picture 1200 for the P3 layer is not needed.

Figure 20:
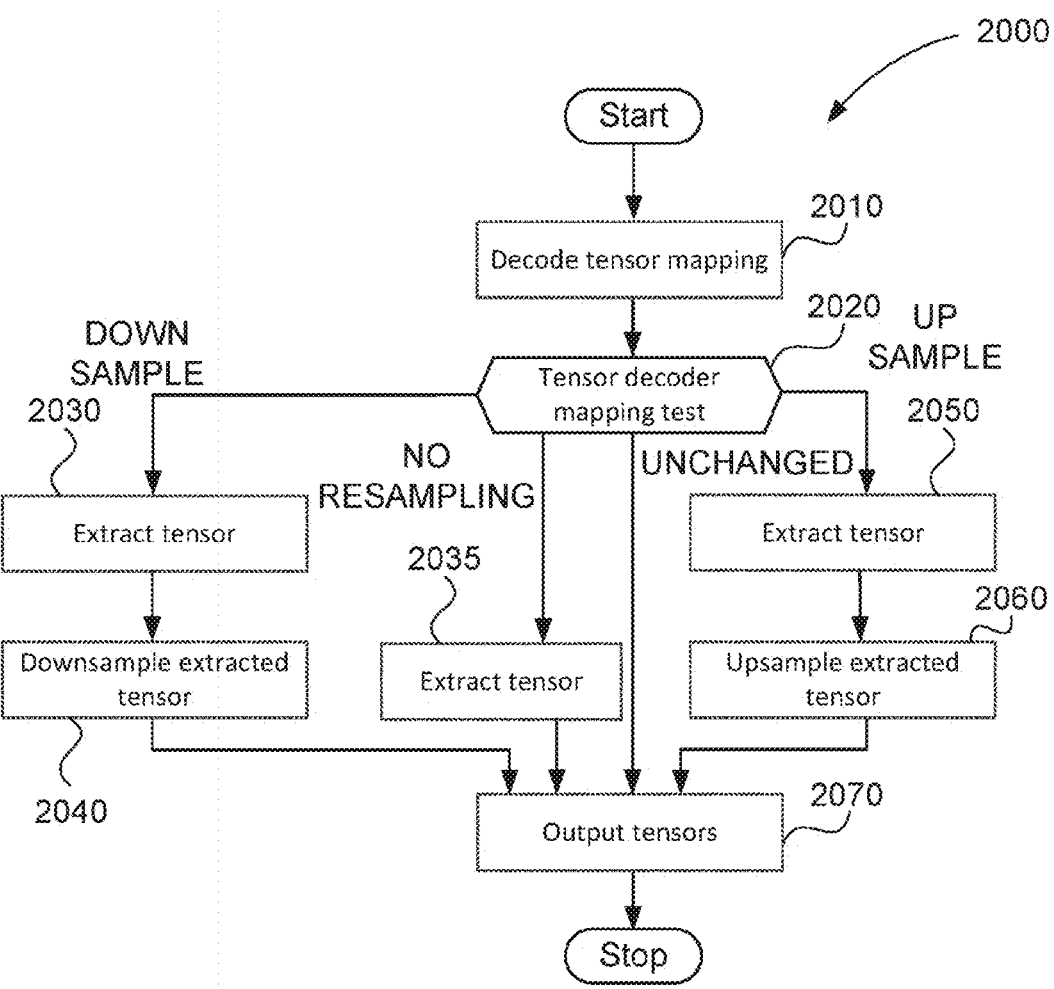
FIG. 20 shows a method for resampling a tensor reconstructed from a bitstream to an original resolution for the second portion of the CNN.

FIG. 20 shows the method 2000 for resampling a tensor from a decoded combined representation, i.e., the tensors 149a, to produce output tensors 149 for providing to the CNN head 150. The method 2000 is used in decoding a tensor from encoded data. The method 2000 may be implemented by apparatus such as a configured FPGA, an ASIC, or an ASSP. Alternatively, as described below, the method 2000 may be implemented by the destination device 130, as one or more software code modules of the application programs 233, under execution of the processor 205. The method 2000 is repeated for each frame of video data encoded in the bitstream 143. The software code modules of the application programs 233 implementing the method 2000 may be stored, for example, on the hard disk drive 210 and/or in the memory 206. The method 2000 commences at a decode tensor mapping step 2010.

At the step 2010 the entropy decoder 920, under execution of the processor 205, decodes syntax elements from the SEI message 1313 contained in the bitstream 143 indicating whether the tensors 149a include a combined resampled tensor. The decoder determines whether resampling is to be executed, for example based on decoding information specifying whether resampling occurred at encoding or based on a default setting. That is, the entropy decoder decodes whether one of the tensors is a concatenation of a tensor from one FPN layer with resampled (upsampled or downsampled) version of a tensor from another FPN layer as implemented at encoding in FIG. 19. The method 2000 is executed when decoding of basis vectors and coefficients at steps 1540 and 1550 has already occurred and tensor derived at step 1570. The combined tensor may be a concatenation of tensors having the same final width and height, or there may be no concatenated tensors present in the tensors 149a.

Signalling in the SEI message 1313 indicates the operations needed to be performed by the tensor separator 172 to recover the tensors 149, i.e., to produce a set of tensors having the same number and dimensionality as the tensors 115a suitable for use by the CNN head 150. Where the tensor combiner 162 has downsampled a tensor to produce the concatenated tensor, signalling in the bitstream 143 instructs the tensor separator 172 to upsample a portion of the concatenated tensor to recover the tensor. Where the tensor combiner 162 has upsampled a tensor to produce the concatenated tensor, signalling in the bitstream 143 instructs the tensor separator 172 to downsample a portion of the concatenated tensor to recover the tensor. Where the tensor combiner 162 has not resampled a tensor to produce the concatenated tensor, signalling in the bitstream 143 instructs the tensor separator 172 to extract a portion of the concatenated tensor to recover the tensor, without applying a resampling filter. Extraction of a tensor from a concatenated tensor is determined from a decoded layer_extraction_flag syntax element. Application of a downsampling filter to the extracted tensor is signalled via a layer_downsample_flag syntax element. Application of an upsampling filter to the extracted tensor is signalled via a layer_upsample_flag. Which tensor among the tensors 149a is the concatenated tensor is signalled via a src_layer_idx syntax element. The offset at which the extracted tensor is to be inserted to produce the tensors 149 is signalled via the dst_layer_idx syntax element. The channel index that delineates the boundary within the concatenated tensor between the two layers is signalled via the src_channel_offset syntax element. Control in the processor 205 progresses from the step 2010 to a tensor decoder mapping test step 2020.

At the step 2020, if the result of the step 2010 indicates that no remapping is to be applied, control in the processor 205 progresses from the step 2010 to an output tensors step 2070. If the result of the step 2010 indicates that tensor downsampling is to be applied, control in the processor 205 progresses from the step 2020 to an extract tensor step 2030. If the result of the step 2010 indicates that tensor upsampling is to be applied, control in the processor 205 progresses from the step 2020 to an extract tensor step 2050. If the result of the step 2010 indicates that tensor extraction without resampling is to be applied, control in the processor 205 progresses from the step 2020 to an extract tensor step 2035.

The implementation 1890 of FIG. 18B receives inputs P2/3, P4 and P5 (1850, 1852 and 1854 respectively). The input P2/3 is a combined tensor generated by upsampling or downsampling at the encoding side, for example by operation of the method 1900. The implementation 1890 includes a tensor slicer 1856, a downsampler 1862, an upsampler 1864 and selectors 1870 and 1872.

At the step 2030 the tensor slicer 1856, under execution of the processor 205, slices a combined P2/P3 tensor 1850 along the channel dimension (at an index according to src_channel_offset) into two tensors, each having a channel count corresponding to the channel count of P2 and P3 layers, i.e., 256 channels. The tensor slicer 1856 outputs a first sliced tensor 1858 and a second sliced tensor 1860. Control in the processor 205 progresses from the step 2030 to a downsample extracted tensor step 2040.

At the step 2035 the tensor slicer 1856, under execution of the processor 205, slices a combined P2/P3 tensor 1850 along the channel dimension (at an index according to src_channel_offset into two tensors. The tensor slicer 1856 outputs the first sliced tensor 1858 to a selector 1870 and the and the second sliced tensor 1860 to a selector 1872. Control in the processor 205 progresses from the step 2035 to the output tensors step 2070.

At the step 2040 the downsampler 1862, under execution of the processor 205, downsamples the tensor 1858 to derived a rescaled tensor 1866. The rescaled tensor provides a set of feature maps used to decode the combined tensor Downsampler 1862 may use decimation, or subsampled bilinear or bicubic or other filter to produce the rescaled tensor 1866. Control in the processor 205 progresses from the step 2040 to the output tensors step 2070.

At the step 2050 the tensor slicer 1856, under execution of the processor 205, slices a combined P2/P3 tensor 1850 along the channel dimension into two halves, each having a channel count corresponding to the channel count of P2 and P3 layers, i.e., 256 channels. The tensor slicer 1856 outputs the first sliced tensor 1858 and the second sliced tensor 1860. Control in the processor 205 progresses from the step 2050 to an upsample extracted tensor step 2060.

At the step 2060 the upsampler 1864, under execution of the processor 205, upsamples the tensor 1860 to produce a rescaled tensor 1868. Upsampling may use bilinear, bicubic, nearest neighbour, or other filter methods to derive the interpolated samples needed to populate the rescaled tensor 1868. Control in the processor 205 progresses from the step 2060 to the output tensors step 2070.

The steps 2040 and 2060 operate to derive a first set of feature maps by resampling (downsampling and upsampling respectively) a first part of the tensor derived in step 2030 or 2050 to decode the tensor 149a.

At the step 2070 output tensors 149 are provided for use by the CNN head 150. A P5 tensor 1854 and a P4 tensor 1852 are passed from the tensors 149a to the tensors 149. If no remapping or resampling operation took place, tensors corresponding to P2 and P3 layers are passed along from the tensors 149a to the tensors 149. If a remapping operation took place, a P3 tensor 1882 and a P2 tensor 1880 are output as corresponding FPN layers of the tensors 149. If downsampling took place, the selector 1870 outputs the downsampled tensor 1866 as tensor 1882 and the selector 1872 outputs tensor 1858 as tensor 1880. If upsampling took place, the selector 1870 outputs tensor 1860 as tensor 1882 and the selector 1872 outputs tensor 1868 as tensor 1880. If resampling was implemented one of the output tensors 1880 and 1882 includes a resampled set of feature maps and a set of feature maps that has not been resampled, as described in FIG. 18B with respect to P2 and P3 and operation of selectors 1870 and 1872. If no resampling took place, the selector 1870 outputs tensor 1860 as tensor 1882 and the selector 1872 outputs tensor 1858 as tensor 1880. The method 2000 terminates, with control in the processor 205 returning to the method 1500.

In an arrangement of the methods 1900 and 2000, the step 1910 also decides which layers among P2-P5 are to be upsampled or downsampled, selecting a pair of adjacent layers, i.e., P2 and P3, P3 and P4, or P4 and P5. The selected pair of adjacent layers is encoded into the bitstream 121 at the step 1920. At the step 2010, the selected pair of adjacent layers is decoded from the bitstream 143, and the indicated tensors are restored from the concatenated tensor.

Figure 21:
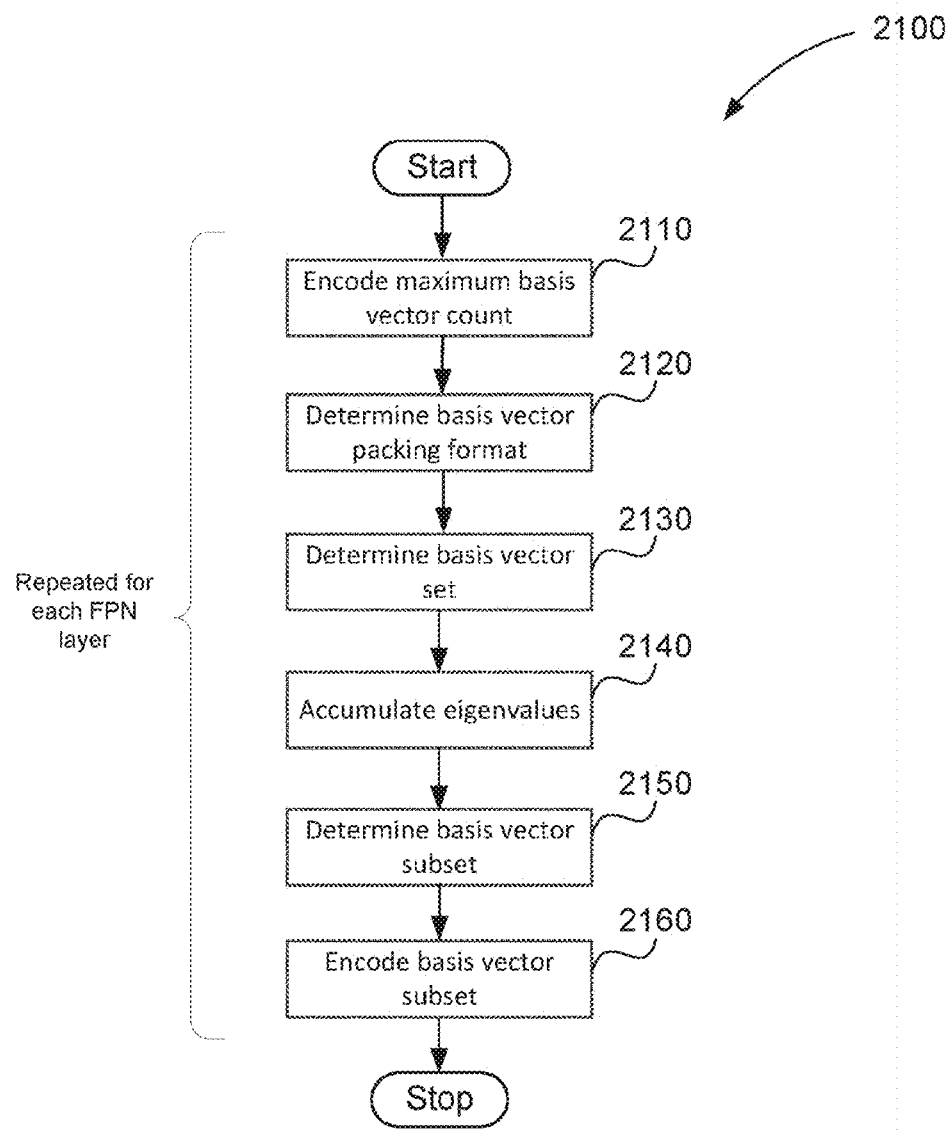
FIG. 21 shows a method for determining basis vectors for encoding a tensor from the first portion of the CNN.

FIG. 21 shows a method 2100 for determining basis vectors by the decomposition module 548 for encoding tensors 115 from the CNN backbone 114. The method 2100 may be implemented by apparatus such as a configured FPGA, an ASIC, or an ASSP. The method 2100 is described with reference to a basis vector packing format info SEI message syntax, present in Appendix A. Alternatively, as described below, the method 2100 may be implemented by the source device 110, as one or more software code modules of the application programs 233, under execution of the processor 205. The method 2100 is repeated for each frame of video data encoded in the bitstream 121. The software code modules of the application programs 233 implementing the method 2100 may be stored, for example, on the hard disk drive 210 and/or in the memory 206. The method 2100 commences at an encode maximum basis vector count step 2110.

At the step 2110 the entropy encoder 738, under execution of the processor 205, encodes a value bv_max_cnt into the SEI message 1313. The value bv_max_cnt is encoded into the SEI message 1313 as part of basis vector packing info 1391, that corresponds to a number of basis vectors to be generated by the decomposition module 548 into the bitstream 121. The value bv_max_cnt indicates the maximum number of basis vectors able to be used in the decomposition of a tensor among the tensors 115. If no layer reduction occurred in the tensor combiner 162 then one instance of bv_max_cnt is encoded for each FPN layer of the tensors 115. If the number of layers was reduced as a result of the tensor combiner 162, one bv_max_cnt value is encoded for each of the resulting layers in the reduced format, i.e., for each coded layer. The step 2110 only needs to be performed as an initialisation step and hence the one or more bv_max_cnt values only need to be encoded at initialisation, or random-access points, in the bitstream 121. In addition, the width and height of the basis vector for each layer are encoded as bv_width and bv_height in the SEI message 1313 at step 2110. A frame size is effectively determined for the encoded data using the maximum number of basis vectors decoded at step 2110, the frame size being applicable to at least one frame of the encoded data. Control in the processor 205 progresses from the step 2110 to a determine basis vector packing format step 2120.

At the step 2120 the packer 610 for the subpicture encoder 556 determines a packing format for the subpicture 1216 and a size for the subpicture 1216. The packing format and size are determined such that basis vectors of specified size and count bv_max_cnt for each tensor in the tensors 115 are able to be packed into the subpicture 1216, for example, as shown with reference to FIG. 12B. Subsequent pictures (i.e., 1200) containing packed basis vectors have the same size as determined at the first invocation of the method 2100, even if fewer basis vectors are used for a given picture. Accordingly, the subpicture encoders (i.e., 514, 532, 556 and 572) encode consecutive sets of compressed tensors 115 using frames of the same size and do not need to send new instances of the SPS 1310 to signal a change in picture resolution. Changing picture resolution requires a reset of the frame buffer 772 which prevents subsequent pictures from referencing earlier pictures in the frame buffer 772, as needed for inter-prediction methods to be used. Determining the size of picture 1200 and packing format based on the maximum basis vector count allows inter-prediction to be performed when the number of utilised basis vectors changes, as the frame buffer 772 does not need to be reset to accommodate pictures of incompatible resolutions. Accordingly, maintaining a fixed-size of the picture 1200 even when the number of basis vectors to be packed varies, improves compression efficiency since inter-prediction is able to be used across the resulting packed pictures. Control in the processor 205 progresses from the step 2120 to a determine basis vector set step 2130.

At the step 2130 the decomposition module 548, under execution of the processor 205, produces a set of M basis vectors for each tensor of the tensors 115, where M corresponds to the value bv_max_cnt ('M') for the respective tensor of the tensors 115. The value M may be set to a fixed value 25 for layers containing 256 channels, such as P3 and P4. Where two layers were concatenated at the combiner 162, such as P2 and P3, the value M may be set to 50, corresponding to maintaining 25 basis vectors per layer of the tensors 115a, i.e., prior to any layer reduction from the tensor combiner 162. The M basis vectors for a tensor are an ordered set of principal components, each of the set capturing a maximum amount of variance in the tensor that has not already been captured by the preceding principal components of the M basis vectors. Variance is 'captured' or explained across the channel dimension of the tensor. Accordingly, the M basis vectors define a space in which each channel of the tensor can be expressed with fewer values than the number of samples (i.e., width×height) in a given channel of the tensor. The amount of variance explained by each basis vector is an eigenvalue. The M basis vectors have a corresponding set of M eigenvalues, the eigenvalues forming a strictly decreasing array of numbers. Control in the processor 205 progresses from the step 2130 to an accumulate eigenvalues step 2140.

At the step 2140 the decomposition module 548, under execution of the processor 205, produces accumulated 'explained variance' values for each value n, where n ranges from 1 to M. An accumulated explained variance value is equal to the sum of the eigenvalues from the first eigenvalue to the nth eigenvalue. The accumulated explained variance value indicates how much variance is explained by that subset of the total set of eigenvectors or principal components produced at the step 2130. Control in the processor 205 progresses from the step 2140 to a determine basis vector subset step 2150.

At the step 2150 the decomposition module 548, under execution of the processor 205, selects a subset of the basis vectors M that corresponds to an 'explained variance threshold'. The explained variance threshold determines the number of basis vectors to be used and can be selected to adequately deconstruct the tensors according to a desired trade-off between accuracy, area and coding efficiency. The explained variance threshold can be set based on the data in the basis vectors themselves or set based on a desired area or coding efficiency, or a minimum desired accuracy. Selection of a subset of basis vectors results in selecting the first N basis vectors of the M basis vectors, that is selecting basis vectors among available (maximum) basis vectors. The explained variance threshold can determined on a per-frame basis, that is for each frame of the data to be encoded. Selection of a subset causes basis vectors that make less contribution to reconstructing a tensor, by virtue of their smaller contribution to accumulated explained variance, to be omitted. Selection of a subset improves compression efficiency as the subpicture 1216 has a less populated area. The unpopulated area of the subpicture 1216 can be occupied by a constant sample value. The constant sample value is highly compressible due to the flexible block structure of VVC. Control in the processor 205 progresses from the step 2150 to an encode basis vectors subset step 2160.

At the step 2160 the entropy encoder 738, under execution of the processor 205, encodes a value bv_cnt for each tensor of the tensors 115 into the bitstream 121. The value bv_cnt indicates the selected subset resulting from execution of the step 2150. The value bv_cnt may indicate that basis vectors 0 to N, i.e., the number of used basis vectors may vary from one to M for a given tensor. The step 2160 encodes the number of basis vector used to encode the tensor. Information specifying a number of basis vectors to be used can be considered to include a maximum number of basis vectors to be used as determined at step 2110 and an actual number of basis vectors to be used as determined at step 2150. The method 2100 terminates, with control in the processor 205 progressing from the step 2160 back to the step 1490, where the subset of basis vectors is encoded in the bitstream at step 1490.

Figure 22:
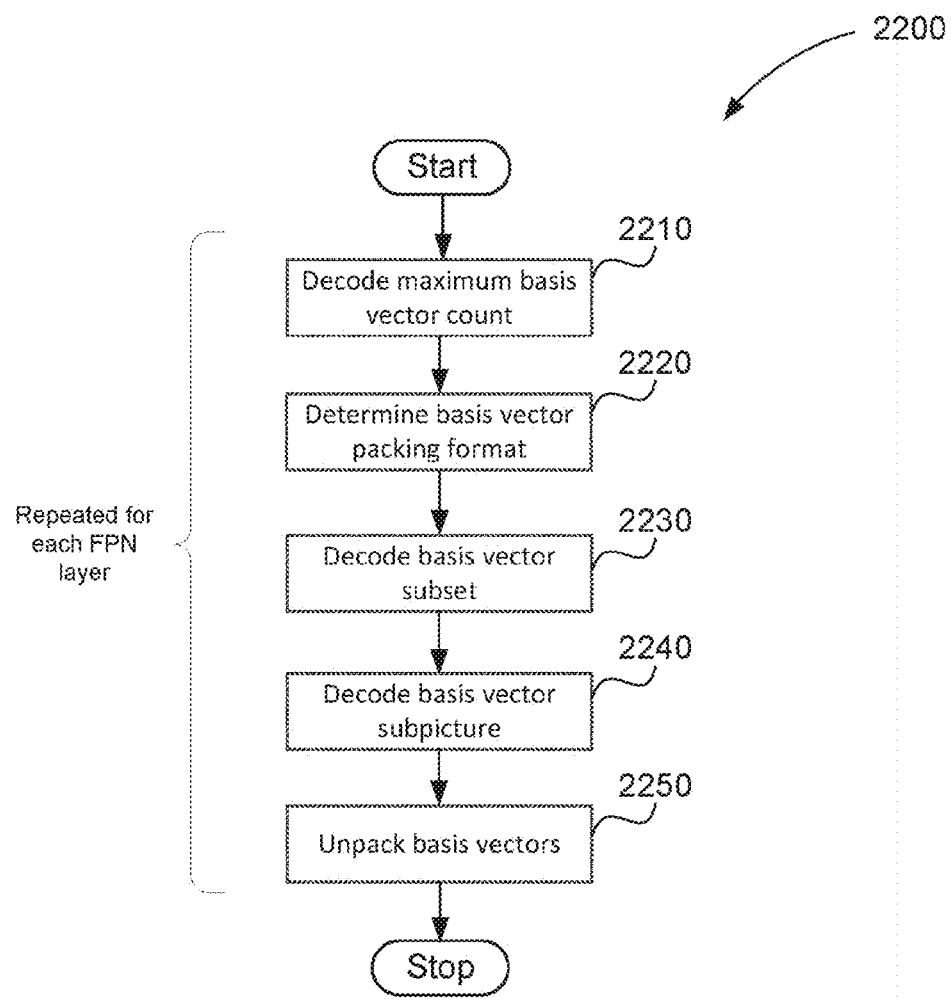
FIG. 22 shows a method for decoding basis vectors used for encoding a tensor from the first portion of the CNN.

FIG. 22 shows a method 2200 for decoding basis vectors used for encoding a tensor from the first portion of the CNN. The method 220 is used in decoding a tensor from the data encoded by the PCS encoder 160. The method 2200 may be implemented by apparatus such as a configured FPGA, an ASIC, or an ASSP. The method 2100 is described with reference to the basis vector packing format info SEI message syntax, present in Appendix A. Alternatively, as described below, the method 2200 may be implemented by the destination device 140, as one or more software code modules of the application programs 233, under execution of the processor 205. The method 2200 is repeated for each frame of video data encoded in the bitstream 143. The software code modules of the application programs 233 implementing the method 2200 may be stored, for example, on the hard disk drive 210 and/or in the memory 206. The method 2200 commences at a decode maximum basis vector count step 2210.

At the step 2210 the entropy decoder 920, under execution of the processor 205, decodes a bv_max_cnt syntax element from the SEI message 1313. The bv_max_cnt syntax element provides information specifying or indicating the maximum number of basis vectors able to be used in packing the picture 1200. A separate maximum may be decoded for each tensor in the combined representation resulting from the tensor combiner 162. The width and height of the basis vectors of each combined representation are also decoded from the SEI message 1313 at step 2210. The bv_max_cnt syntax element is decoded for the first picture of a sequence of pictures and the value retained for use by subsequent pictures, until another instance of bv_max_cnt is indicated to be decoded from the bitstream 143. Another instance of bv_max_cnt can be indicated via a basis vector dimensions update flag for example. Control in the processor 205 progresses from the step 2210 to a determine basis vector packing format step 2220.

At the step 2220 the unpacker 822, under execution of the processor 205, determines the spatial location of each basis vector when packed in the subpicture 1216 according to the basis vector width, height, and maximum number as determined at the step 2210. Basis vectors are packed generally firstly in a left-to-right manner, and secondly in a top-to-bottom manner, progressing through the ordered list of basis vectors. Basis vectors are generally packed adjacently and in a non-overlapping manner. Where multiple layers exist, e.g., due to use of an FPN, the spatial locations of the basis vectors of the respective layers are determined for the subpicture 1216. The step 2220 needs to be performed whenever bv_max_cnt is decoded from the bitstream 143, i.e., when indicated by the basis_vector_dimensions update flag. When bv_max_cnt is not decoded from the bitstream 143, the packing arrangement determined from performing the step 2220 in an earlier invocation of the method 2200 may be reused. Control in the processor 205 progresses from the step 2220 to a decode basis vector subset step 2230.

At the step 2230 the entropy decoder 920, under execution of the processor 205, decodes a bv_cnt syntax element from the SEI message 1313. The bv_cnt syntax element is decoded when a basis_vector_cnt_update, also decoded from the SEI message 1313 indicating an update of the used basis vector count needs to be conveyed to the destination device 140. Step 2230 operates to decode information indicating the number of basis vectors to be used in decoding. Information specifying the number of basis vectors to be used can be considered to include both the maximum number of vectors as derived at 2210 and the actual amount to be used decoded at step 2230. Each layer in the tensors 115 may have a separate basis vector count. The signalled basis vector count indicates a value N, where N defines a subset being the first N basis vectors out of M basis vectors selected to adequately reconstruct the tensors according to a defined threshold value. Use of a threshold to establish the number of basis vectors to be used allows for adaptation to the statistics of the tensors 115. The bv_cnt syntax element be can determined or decoded on a per-frame basis, that is for each frame of the encoded data.

Where fewer basis vectors are needed to reach a specified quality level, i.e., a given explained variance threshold, additional basis vectors may be omitted, improving compression efficiency. For retention of the majority of the basis vectors, threshold values such as 98% or 99% may be used. In most cases all M basis vectors are retained, that is N is equal to M, but the value N may be reduced in a data-dependent manner. Where lower quality is acceptable, a better bit-rate or performance trade-off is achieved by preferentially reducing the threshold over further increasing the quantisation step size, i.e. increasing the quantisation parameter. For example, a threshold of 85% reduces bit-rate while degrading task performance relatively less severely than increasing QP to higher levels (QP greater than 45 for example), can be suitable where very bit compressed rate is desired. A threshold of 95% reduces bit-rate at a moderate reduction in achievable task performance, suited to use cases requiring performance in between near-lossless compression and that of a very low bit-rate operating point. The threshold and QP may be jointly optimised to produce a 'Pareto front', i.e., a bit-rate or task performance frontier curve that consists of optimal threshold and QP values. Exhaustively testing various threshold values and QP values to derive this Pareto front would generally be prohibitively costly for the source device 110 and heuristic rules to indicate suitable values are desirable. Experiments show that for lower bits per pixel (BPP), threshold is preferably reduced instead of increasing QP. Moreover, the threshold may be varied for different coded layers, e.g., of the FPN or a combined representation of the FPN resulting from the tensor combiner 162. Experiments show that the more decomposed layers can be given a slightly higher threshold, achieving an improvement in the task performance at relatively limited increase in bit-rate. For example, thresholds of 90%, 94%, and 98% for the P2/P3 concatenated layer, P4, and P5 layers of the tensors 115 provides better performance than fixed thresholds such as 90% of 95% applied across all layers. More decomposed layers (e.g. P4 and P5) have smaller area compared to less decomposed layers (e.g. P2 or P3). Accordingly the incremental increase in packed area in the subpicture 1216 is less than a similar additional basis vector count for the less-decomposed layers. The maximum basis vector count may be similarly varied on a per-layer basis. Control in the processor 205 progresses from the step 2230 to a decode basis vector subpicture step 2240.

At the step 2240 the picture decoder 804, under execution of the processor 205, decodes the subpicture 1216 containing the packed basis vectors. Step 2240 effectively derives basis vectors from the encoded data according to at least the information decoded on step 2230. Control in the processor 205 progresses from the step 2240 to an unpack basis vectors step 2250.

At the step 2250 the unpacker 822, under execution of the processor 205, unpacks a number bv_cnt basis vectors from the subpicture 1216, according to the number of basis vectors signalled as used in the picture 1200 at the step 2230. The number of basis vectors signalled as used in the picture 1200 may be less than the maximum number of basis vectors afforded by the packing arrangement determined at the step 2220. The step 2250 deriving basis vectors from the encoded data according to at least the information specifying the number of basis vectors to be used. Where multiple layers are packed into the subpicture 1216, the unpacking operates on each layer according to a respective basis vector count bv_cnt[layer_idx] value obtained from the SEI message 1313. The method 2200 terminates and control in the processor 205 returns to the method 1500, resuming processing at step 1550.

Figure 23:
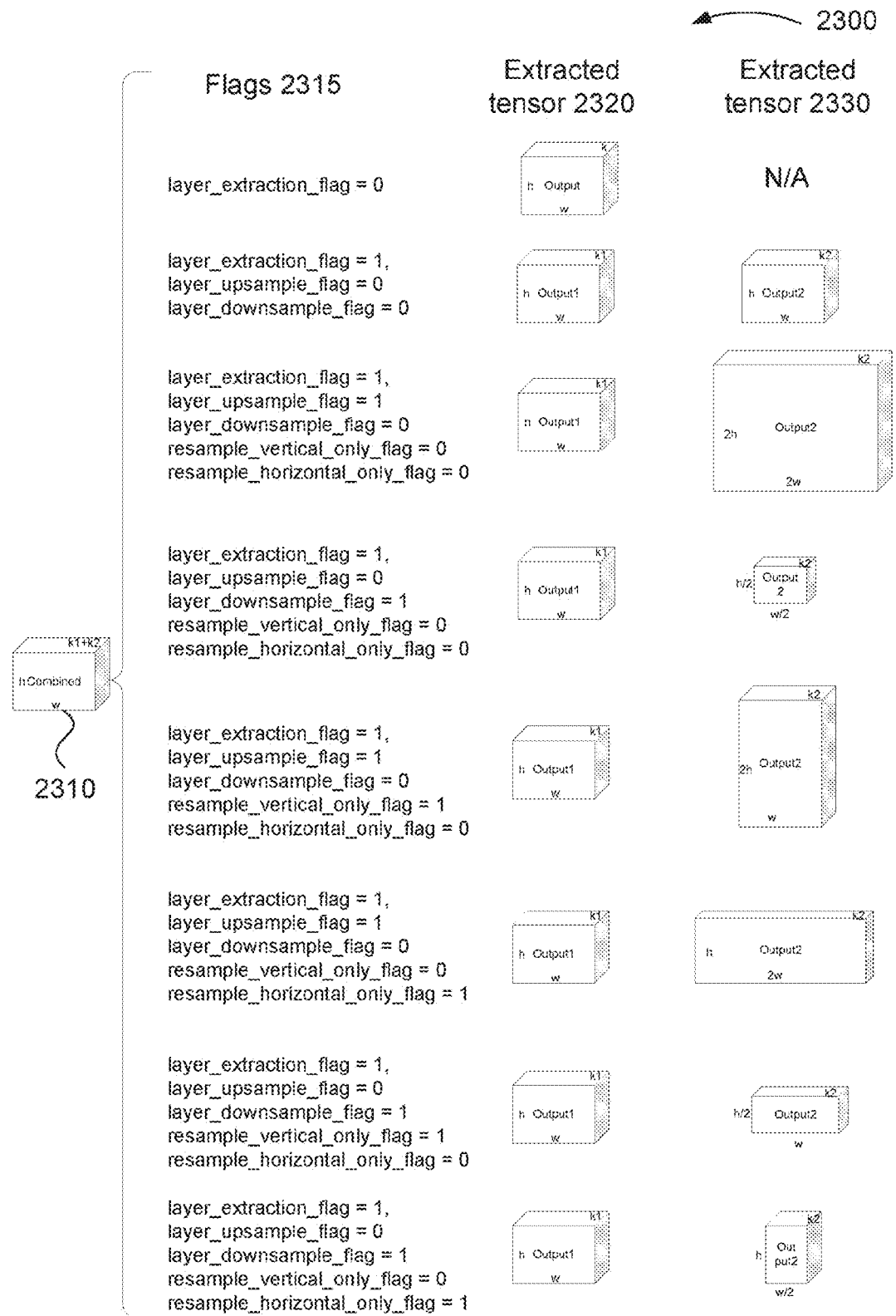
FIG. 23 is a schematic block diagram showing relationships between tensors of different layers at a split point in a network and resulting options for reproducing coded tensors from a tensor combiner; and Appendix A shows a SEI message format and associated semantics for representing metadata associated with basis vector packing in a bitstream.

FIG. 23 is a schematic block diagram 2300 showing relationships between tensors of different layers at a split point in a network and the resulting options for reproducing from coded tensors from a tensor combiner such as the tensor combiner 162. Combined tensor 2310 is a tensor of the tensors 149a identified bv_src_layer_idx. From combined tensor 2310, either one or two output tensors, i.e., tensors 2320 and 2330 are output as part of the tensors 149. Tensor 2320 remains at position src_layer_idx in the tensors 149 and tensor 2330, if present, is inserted at position dst_layer_idx in the tensors 149. FIG. 23 shows the spatial relationship of the tensor 2330, if present, compared with the width and height of the tensor 2320 based on flags 2315 (i.e., layer_extraction_flag, layer_upsample_flag, layer_downsample_flag, resample_vertical_only_flag, resample_horizontal_only_flag) decoded from the SEI message and described with reference to Appendix A. The flags 2315 are determined at the step 1910 and encoded as the layer mapping 1390 at the step 1920. The flags 2315 are decoded at the step 2010 for generating the tensor 2320 and, if present, the tensor 2330. Combined tensor 2310 has k1+k2 channels, where k1 corresponds to the channels of the tensor 2320 and k2 corresponds to the channels of the tensor 2330, with the boundary signalled using src_channel_offset. The flags 2315 provide signalling to allow various resampling options for the extracted tensor. As the tensors 149 need to have the same dimensionality as the tensors 115a, the available combinations of flags 2315 that may be used are dependent on the dimensionality of the tensors 115a, which depends on the network and split point.

In an arrangement of the source device 110 and the destination device 140, the number of basis vectors to be packed or unpacked, i.e., bv_cnt, is expressed relative to the maximum number of basis vectors afforded by the packing arrangement, i.e., relative to bv_max_cnt. Generally, a majority of the maximum available basis vectors (i.e., bv_max_cnt) may be used, so the difference between bv_max_cnt and bv_cnt may be relatively small. When the difference between bv_max_cnt and bv_cnt is small compression efficiency may be improved by coding a difference between bv_max_cnt and bv_cnt using an exponential Golomb syntax element In an arrangement of the PCA encoder 160, subpicture encoders 532 and 572, for the mean coefficients and the coefficients applicable to the basis vectors, respectively, are configured by the QP controller 790 to apply a lower quantisation parameter than is applied for coding the mean feature or the basis vectors by subpicture encoders 514 and 556, respectively. The respective instances of the QP controller module 790 in subpicture encoders 532 and 572 may apply an offset to a base QP, the base QP being applied elsewhere, such as to CUs encoding the basis vectors. The QP offset may have a value such as minus 6 or minus 12, minus 18, or minus 24 or other value, to reduce the quantisation step size used when coding residual for mean coefficients or coefficients applicable to basis vectors, such as in subpictures 1212 and 1214. Applying a QP offset to reduce the quantisation step size for subpictures coding coefficients reduces discrepancies between decoded coefficients produced in the PCA decoder 170 compared to coefficients generated by forward transform (e.g., 524 and 564) in the PCA encoder 160. Coefficients have a multiplicative effect on reconstruction of a feature map, by virtue of the coefficients' role in modulating the contribution of the respective mean feature or basis vector on the reconstructed feature map. The impact of lossy coding on coefficients therefore causes substantial loss of fidelity in the reconstructed feature maps, adversely affecting task performance in the CNN head 150. Accordingly, coefficients need to be coded at a higher quality level than basis vectors. It is also possible to apply a fixed, relatively low QP, to the subpictures or slices responsible for representing coefficients. As the coefficients occupy a relatively small area of the overall picture 1200, the increase in bitrate used due to use of a low QP is relatively small, and in any case improves fidelity in the reconstructed feature maps. QP can be altered at a finer granularity than the slice level by specifying an area known as a 'quantisation group' (QG), which corresponds to a maximum granularity of area within each CTU at which the QP may be altered using a 'delta QP' syntax element. Accordingly, should coefficients and basis vectors be coded in the same slice, delta QP provides another mechanism to code coefficients with higher precision than needed for basis vectors.

In an arrangement of the picture 1200 a division into tiles rather than subpictures is used. In the arrangement using tiles, mean feature maps 1220, mean coefficients 1222, basis vectors 1226, and basis vector coefficients 1224 are contained in separate tiles. The tiles can be independently encoded in the PCA encoder 160 and decoded in the PCA decoder 170.

In another arrangement of the PCA encoder 160 and the PCA decoder 170, the mean feature is applied uniformly to all feature maps of the tensor 115. In other words, all mean coefficients are assigned a value of '1' rather than being derived on a per-feature map basis by the dot product module 524. If the mean coefficients are assigned '1', in the PCA encoder 160, the reconstructed mean feature map 522 does not need to be scaled by a mean coefficient and hence modules 524, 528, 532, 536, 540 are not needed and the 522 is passed directly as 542 to the module 544. In the PCA decoder 170, modules 832, 836, and 850 are not needed and the decoded mean feature map 848 is passed to the summation module 856 as 852. When mean coefficients are assigned a value of '1' the subpicture 1212 may be omitted from the picture 1200 as there is no need to code the constant mean coefficient values. When the subpicture 1212 is omitted from the picture 1200, the subpicture 1214, containing coefficients for the basis vectors, may be increased in width compared to the minimum width required to pack the coefficients. Width of the subpicture 1214 may be set at 1.5× the width of the packed coefficients (i.e., the maximum number of channels in the layers of the packed tensors 115). Increasing the width of the subpicture 1214 results in the picture 1200 having a wider aspect ratio, which is more suited to the generally encountered aspect ratio of individual basis vectors and therefore results in less unused area in the picture 1200. Subpictures 1210, 1214, and 1215 may be adjusted in width to maintain a picture structure such that the entirety of the picture 1200 is occupied by subpictures. Use of constant mean coefficients also removes the need for associated quantisation and inverse quantisation. Use of constant mean coefficients still serves the purpose of 'zero-centring' the tensor 115 prior to the forward transform (dot product) against the derived basis vectors, necessary to maintain invertible operation of the forward and inverse transform (projection).

Methods presented herein enable efficient representation of tensors in a format being amenable to compression using contemporary block-based compression standards such as VVC or HEVC. Block-based compression, although not intuitively applicable to data such as coefficients for projecting basis vectors to reconstruct feature maps, uncover additional unexpected redundancy in blocks such as by use of various transforms including trained secondary transforms. Although methods presented herein are described with reference to the 'Faster RCNN' and 'YOLOv3' network architectures and specific divisions of these networks into 'backbone' and 'head' portions, the methods are applicable to any neural network operating on multi-dimensional tensor data, and are applicable to different divisions of such networks into 'backbone' and 'head' portions.

INDUSTRIAL APPLICABILITY

The arrangements described are applicable to the computer and data processing industries and particularly for the digital signal processing for the encoding and decoding of signals such as video and image signals, achieving high compression efficiency.

Arrangements for quantising floating-point tensor data in groups of channels, or feature maps, and packing the resulting integer values into planar frames using a logarithmic quantised domain are also disclosed. Quantisation and inverse quantisation methods employing a logarithmic quantised domain enable greater compression efficiency due to the absence of bits spent encoding precise values for large magnitude tensor values, where such precision does not result in additional improvement in task performance for the network in use.

The foregoing describes only some embodiments of the present invention, and modifications and/or changes can be made thereto without departing from the scope and spirit of the invention, the embodiments being illustrative and not restrictive.

Appendix A

An example SEI message format and associated semantics for representing metadata associated with basis vector packing (i.e., 1391) in a bitstream are as follows:

|  | Descriptor |
|---|---|
| basis_vector_packing_info( payloadSize ) { |  |
|   basis_vector_dimensions_update | u(1) |
|   if(basis_vector_dimensions_update != 0 ) { |  |
|     layer_cnt | u(1) |
|     for( layer_idx = 0; layer_idx < layer_cnt; layer_idx++ ) { |  |
|       bv_max_cnt[ layer_idx ] | ue(v) |
|       bv_width[ layer_idx ] | ue(v) |
|       bv_height[ layer_idx ] | ue(v) |
|     } |  |
|   } |  |
|   basis_vector_cnt_update | u(1) |
|   if(basis_vector_cnt_update ) |  |
|   { |  |
|     for( layer_idx = 0; layer_idx < layer_cnt; layer_idx++ ) { |  |
|       bv_cnt[ layer_idx ] | ue(v) |
|     } |  |
|   } |  |
|   layer_update_mapping_info | u(1) |
|   if( layer_update_mapping_info ) |  |
|   { |  |
|     layer_extraction_flag | u(1) |
|     if( layer_extraction_flag ) |  |
|     { |  |
|       layer_upsample_flag | u(1) |
|       layer_downsampling_flag | u(1) |
|       if( layer_upsample_flag \|\| layer_downsampling_flag ) |  |
|       { |  |
|         resampling_filter_idx | ue(v) |
|         resample_vertical_only_flag | u(1) |
|         resample_horizontal_only_flag | u(1) |
|       } |  |
|       src_layer_idx | ue(v) |
|       src_channel_offset | ue(v) |
|       dst_layer_idx | ue(v) |
|     } |  |
|   } |  |
| } |  |

Basis Vector Packing Info Semantics

The syntax structure above specifies information necessary for unpacking basis vector planar frames and converting to basis vectors for projecting into decoded tensors for performing an inferencing task.

A syntax element with a descriptor u(n) indicates the syntax element is coded using n bits and interpreted as an unsigned integer value. A syntax element with a descriptor ue(v) indicates the syntax element is coded as an exponential Golomb value and interpreted as an unsigned integer value.

The persistence of the basis vector packing info SEI message is from the associated AU until either the next occurrence of a basis vector packing info SEI message or the end of the CLVS. At the next occurrence of the basis vector packing info SEI message, parameters are grouped based on update flags. Parameters that are not updated (i.e., contained within a branch of the above syntax table, with the update flag for that branch set to zero) retain their former values (if any).

basis_vector_dimensions_update equal to one specifies an update of the maximum basis vector count and the basis vector dimensions, applicable to the current and subsequent frames, i.e., until the next occurrence of the basis vector packing info SEI message with basis_vector_dimensions update equal to one. It is a requirement of bitstream conformance that the first instance of the basis vector packing info SEI message in the CLVS has basis_vector_dimensions update equal to one.

NOTE. Ordinarily, the basis vector packing info SEI message with basis_vector_dimensions update equal to one is sent with the first picture of a CLVS.

basis_vector_cnt_update equal to one specifies an update of a used basis vector count, applicable to the current and subsequent frames in a CLVS. The used basis vector count indicates how many basis vectors of the maximum basis vectors are used.

layer_cnt specifies the number of layers present in the frame.

bv_max_ent[layer_idx] specifies the number of maximum number of basis vectors present for layer_idx.

bv_width[layer_idx] specifies the width of basis vectors for layer_idx.

bv_height[layer_idx] specifies the height of basis vectors maps for layer_idx.

bv_cnt[layer_idx] specifies the number of number of basis vectors present for layer_idx. It is a requirement of bitstream conformance that bv_cnt[layer_idx] is less than or equal to bv_max_cnt[layer_idx], for each value layer_idx in the range 0 to layer_cnt−1. When bv_cnt[layer_idx] has not been decoded from the bitstream, the value bv_cnt[layer_idx] is set equal bv_max_cnt[layer_idx] for layer_idx in the range 0 to layer_cnt−1.

layer_update_mapping_info equal to one specifies an update to the configuration of tensor remapping as determined by the tensor combiner 162 and to be performed by the tensor separator 172. When layer_update_mapping_info is equal to zero, no update to the configuration of tensor remapping is made and any earlier configuration of tensor remapping continues to apply.

layer_extraction_flag equal to one specifies that a portion of the tensor corresponding to channels src_channel_offset to the last channel in the tensor, the tensor from layer src_layer_idx will be subject to extraction to produce a new layer, to be inserted into the list of tensors at dst_layer_idx. When layer_extraction_flag is equal to zero, no extraction of a tensor is performed, resulting in the tensors 149 being set equal to the tensors 149a. When not previously parsed from the bitstream layer_extraction_flag is inferred to be zero.

layer_upsample_flag equal to one specifies that the portion of a tensor to be extracted is upsampled to produce a new tensor having a larger, e.g., double width and double height of the input tensor.

layer_downsample_flag equal to one specifies that the portion of a tensor to be extracted is downsampled to produce a new tensor having a smaller, e.g., half the width and half the height of the input tensor.

It is a requirement of bitstream conformance that layer_upsample_flag and layer_downsample_flag are not both equal to one in one instance of the basis vector packing info SEI message.

resampling_filter_idx specifies the type of filtering to be applied in resampling the portion of a tensor when producing a new tensor. Resampling is applied horizontally, or vertically, or horizontally and vertically according to resample_vertical_only_flag and resample_horizontal_only_flag. The following table enumerates available filters:

| resampling_filter_idx | When downsampling | When upsampling |
|---|---|---|
| 0 | Decimation | Bilinear filter |
| 1 | Anti-aliasing, decimation | Bicubic filter |
| 2 | Reserved for future use | Nearest neighbour |
| 3- | Reserved for future use | Reserved for future use | resample_vertical_only_flag equal to one specifies that the resampling operation is to be applied in the vertical direction only.

resample_horizontal_only_flag equal to one specifies that the resampling operation is to be applied in the horizontal direction only.

It is a requirement of bitstream conformance that resample_vertical_only_flag and resample_horizontal_only_flag are not both equal to one in any instance of the basis vector mapping info SEI message.

src_layer_idx specifies from which tensor of the tensors 149a a portion is to be extracted for resampling to produce a new tensor to be included in the tensors 149.

src_channel_offset specifies a channel offset from which the tensor identified bv_src_layer_idx is to be divided. Channels 0 to src_channel_offset−1 of the tensor specified bv_src_layer_idx are retained and output as the corresponding tensor of the tensors 149. Channels src_channel_offset to the last channel of the tensor specified bv_src_layer_idx are subject to resampling, the result of which is output as an additional tensor in the tensors 149.

dst_layer_idx specifies an index at which a resampled tensor is inserted into the tensors 149a to produce the tensors 149. Index value zero specifies insertion at the start, i.e., creating a new first place, and index value equal to layer_cnt specifies insertion after the last place, i.e., appending the new tensor to create a new last place. Index values from 1 to layer_cnt−1 indicate insertion of the resampled tensor into a position between tensors 149a at position dst_layer_idx and dst_layer_idx+1 to create the tensors 149.

The invention claimed is:

1. A method of encoding a tensor into a bitstream, the tensor having a channel dimension, the method comprising:
generating a mean feature of the tensor, the mean feature being an average of the tensor over the channel dimension;
quantising the generated mean feature to generate a quantised mean feature map;
inverse-quantising a reconstruction of the quantised mean feature map to generate a second representation of the mean feature;
determining mean feature coefficients using the second representation of the mean feature map and the channel dimension of the tensor; and
encoding at least the quantised mean feature map and a quantised version of the mean feature coefficients into the bitstream.

2. The method according to claim 1, wherein the encoding step is implemented using VVC encoding and the reconstruction of the quantised mean feature map models losses due to using VVC encoding.

3. The method according to claim 1, wherein the encoding step is implemented using HEVC encoding and the reconstruction of the quantised mean feature map models losses due to using HEVC encoding.

4. A method of decoding a feature map from a bitstream, the bitstream being generated by using a quantisation function, the method comprising:
decoding a quantised mean feature from the bitstream, the quantised mean feature being generated using the quantisation function;
inverse-quantising the quantised mean feature to derive an inverse-quantised mean feature;
decoding mean feature coefficients from the bitstream; and
decoding the feature map using at least the inverse-quantised mean feature and the mean feature coefficients.

5. A method of encoding a tensor into a bitstream, the method comprising:
quantising a set of basis vectors to generate quantised basis vectors;
inverse-quantising a reconstruction of the quantised basis vectors to generate a second representation of the basis vectors;

determining basis vector coefficients using the second representation of the basis vectors and the channel dimension of the tensor; and encoding at least the basis vector coefficients and a quantised version of the basis vectors into the bitstream.

6. The method according to claim 1, wherein the encoding step is implemented using VVC encoding and the reconstruction of the basis vectors models losses due to using VVC encoding.

7. The method according to claim 1, wherein the encoding step is implemented using HEVC encoding and the reconstruction of the basis vectors models losses due to using HEVC encoding.

8. A method of decoding a feature map from a bitstream, the bitstream being generated by using a quantisation function, the method comprising:

decoding a set of quantised basis vectors from the bitstream, the quantised basis vectors being generated using the quantisation function;

inverse-quantising the quantised basis vectors to derive inverse-quantised basis vectors;

decoding basis vector coefficients from the bitstream; and decoding the feature map using at least the inverse-quantised basis vectors and the basis vector coefficients.

9. An encoder for encoding a tensor into a bitstream, the tensor having a channel dimension, the encoder configured to:

generate a mean feature of the tensor, the mean feature being an average of the tensor over the channel dimension;

quantise the generated mean feature to generate a quantised mean feature map;

inverse-quantise a reconstruction of the quantised mean feature map to generate a second representation of the mean feature;

determine mean feature coefficients using the second representation of the mean feature map and the channel dimension of the tensor; and encode at least the quantised mean feature map and a quantised version of the mean feature coefficients into the bitstream.

10. A non-transitory computer-readable storage medium which stores a program for executing a method of encoding a tensor into a bitstream, the method comprising:

quantising a set of basis vectors to generate quantised basis vectors;

inverse-quantising a reconstruction of the quantised basis vectors to generate a second representation of the basis vectors;

determining basis vector coefficients using the second representation of the basis vectors and the channel dimension of the tensor; and encoding at least the basis vector coefficients and a quantised version of the basis vectors into the bitstream.

11. A decoder for decoding a feature map from a bitstream, the bitstream being generated by using a quantisation function, the decoder configured to:

decode a quantised mean feature from the bitstream, the quantised mean feature generated using the quantisation function;

inverse-quantise the quantised mean feature to derive an inverse-quantised mean feature;

decode mean feature coefficients from the bitstream; and decode the feature map using at least the inverse-quantised mean feature and the mean feature coefficients.

12. A non-transitory computer-readable storage medium which stores a program for executing a method of decoding a feature map from a bitstream, the bitstream being generated using a quantisation function, the method comprising:

decoding a set of quantised basis vectors from the bitstream, the quantised basis vectors being generated using the quantisation function;

inverse-quantising the quantised basis vectors to derive inverse-quantised basis vectors;

decoding basis vector coefficients from the bitstream; and decoding the feature map using at least the inverse-quantised basis vectors and the basis vector coefficients.

13. The method according to claim 4, wherein the inverse-quantised mean feature was generated using an inverse of the quantisation function used to generate the bitstream.

14. The method according to claim 8, wherein the inverse-quantised mean feature was generated using an inverse of the quantisation function used to encode the bitstream.

\* \* \* \* \*